US012634214B2

(12) United States Patent
Su et al.

(10) Patent No.: US 12,634,214 B2
(45) Date of Patent: May 19, 2026

(54) QUALITY OF EXPERIENCE (QOE)-AWARE TRANSMISSION OVER MULTI-TRANSPORT

(71) Applicant: Hughes Network Systems, LLC, Germantown, MD (US)

(72) Inventors: Chi-Jiun Su, Rockville, MD (US); Lin-Nan Lee, Potomac, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 167 days.

(21) Appl. No.: 18/470,278

(22) Filed: Sep. 19, 2023

(65) Prior Publication Data

US 2025/0097131 A1 Mar. 20, 2025

(51) Int. Cl.
| | |
|---|---|
| *G06F 15/173* | (2006.01) |
| *H04L 43/0805* | (2022.01) |
| *H04L 43/0829* | (2022.01) |
| *H04L 43/0852* | (2022.01) |
| *H04L 43/0894* | (2022.01) |
| *H04L 47/24* | (2022.01) |

(52) U.S. Cl.
CPC ...... *H04L 43/0805* (2013.01); *H04L 43/0829* (2013.01); *H04L 43/0852* (2013.01); *H04L 43/0894* (2013.01); *H04L 47/24* (2013.01)

(58) Field of Classification Search
CPC ............. H04L 43/0805; H04L 43/0829; H04L 43/0852; H04L 43/0894; H04L 47/24
USPC ....................................................... 709/224
See application file for complete search history.

(56) References Cited

U.S. PATENT DOCUMENTS

| | | |
|---|---|---|
| 7,219,158 B2 | 5/2007 | Border et al. |
| 10,021,034 B2 | 7/2018 | Hong et al. |
| (Continued) | | |

OTHER PUBLICATIONS

3gpp.org; 3GPP TS 23.501, "3rd Generation Partnership Project; Technical Specification Group Services and System Aspects; System architecture for the 5G System (5GS); Stage 2 (Release 18)", Mar. 2023, 667 pages, clause 5.32, pp. 435-461.

(Continued)

*Primary Examiner* — Imad Hussain
(74) *Attorney, Agent, or Firm* — Mannava & Kang, P.C.

(57) ABSTRACT

A system and method for quality of experience (QoE)-aware transmission over multi-transport is disclosed. The system receives requests for transmitting data packets from source node to destination node in wireless communication network. Further, the system determines payload data of the data packet and n-tuple information associated with the data packet. Furthermore, the system analyzes packet level metrics associated with determined payload data of data packet. Additionally, system classifies data packets into a latency class (LC) and a Quality of Service (QoS) class based on the analyzed packet level metrics. Further, the system determines connection identifier (ID) associated with data packet. Further, the system determines appropriate multi-transport access network (MTAN) among plurality of MTANs for transmitting data packet to destination node. Furthermore, the system establishes multi-path (MP) backbone connection with destination node using determined appropriate MTAN. Additionally, the system transmits data packet to destination node through established MP backbone connection.

20 Claims, 32 Drawing Sheets

(56)     References Cited

U.S. PATENT DOCUMENTS

| | | | |
|---|---|---|---|
| 2002/0049854 A1* | 4/2002 | Cox ........................ | H04L 47/10 |
| | | | 709/238 |
| 2015/0195178 A1* | 7/2015 | Bhattacharya ...... | H04L 12/4633 |
| | | | 718/1 |
| 2017/0359272 A1* | 12/2017 | Srinivasan .......... | H04L 43/0876 |
| 2021/0235313 A1* | 7/2021 | Devadoss ............. | H04L 49/555 |
| 2021/0409335 A1 | 12/2021 | Zhu et al. | |
| 2022/0060413 A1* | 2/2022 | Joseph .................. | H04L 41/122 |
| 2022/0124043 A1 | 4/2022 | Zhu et al. | |
| 2022/0386215 A1* | 12/2022 | Dillon ................ | H04B 7/18519 |
| 2024/0267792 A1* | 8/2024 | Zhu ................... | H04W 28/0236 |

OTHER PUBLICATIONS

European Patent Office, "International Search Report and Written Opinion for Application No. PCT/US2024/039177", dated Oct. 14, 2024, 20 pages.
Kanugovi Nokia et al., "Multi-Access Management Services (MAMS)", Internet Engineering Task Force, IETF; Standard, Internet Society (ISOC) 4, rue des Falaises CH- 1205 Geneva, Switzerland, Mar. 2020, 73 pages.

* cited by examiner

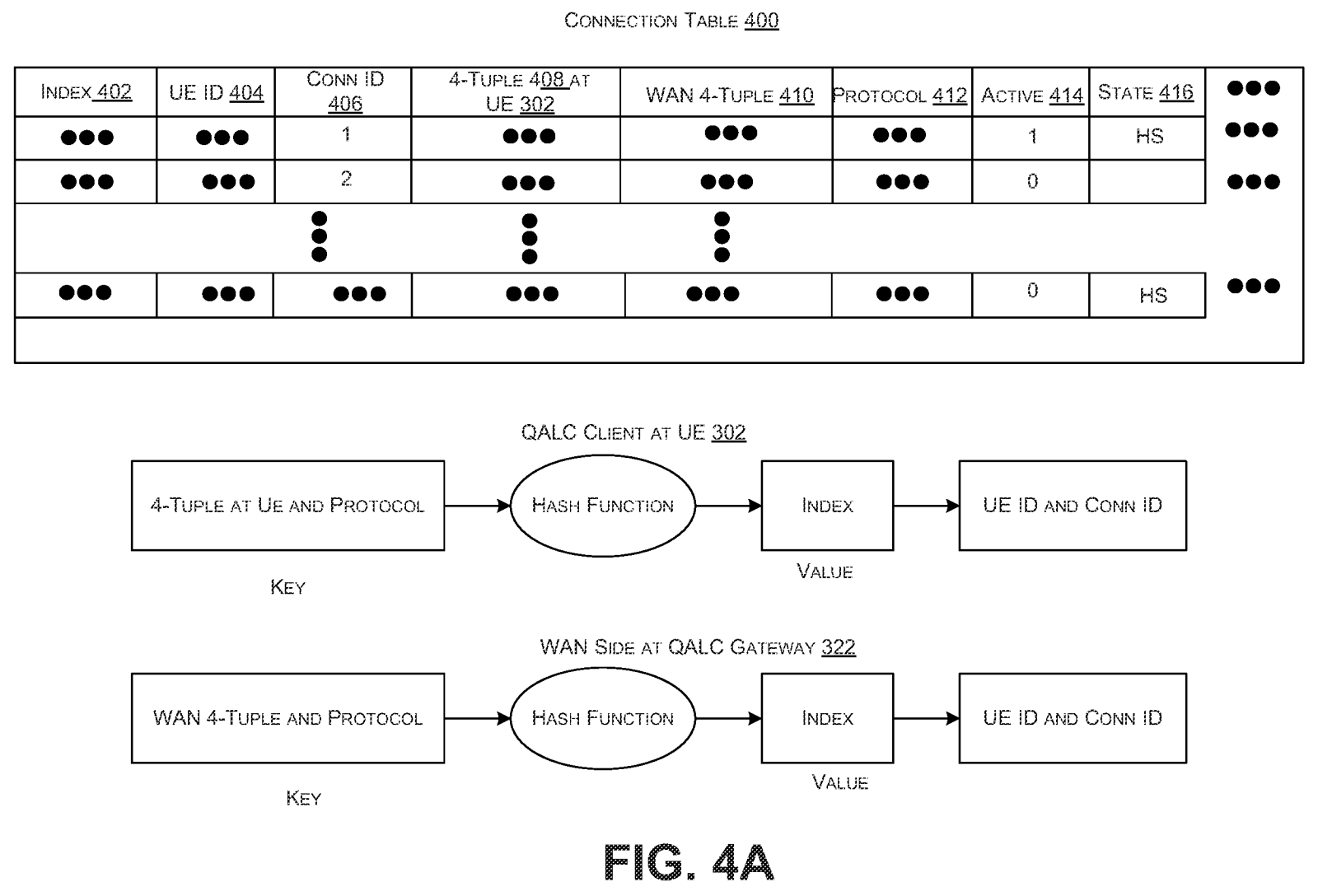

CONNECTION TABLE 400

| INDEX 402 | UE ID 404 | CONN ID 406 | 4-TUPLE 408 AT UE 302 | WAN 4-TUPLE 410 | PROTOCOL 412 | ACTIVE 414 | STATE 416 |
|---|---|---|---|---|---|---|---|
| ••• | ••• | 1 | ••• | ••• | ••• | 1 | HS |
| ••• | ••• | 2 | ••• | ••• | ••• | 0 | |
| ••• ••• | ••• ••• | | ••• ••• | ••• ••• | | | |
| ••• | ••• | ••• | ••• | ••• | ••• | 0 | HS |

QALC CLIENT AT UE 302

4-TUPLE AT UE AND PROTOCOL → HASH FUNCTION → INDEX → UE ID AND CONN ID

KEY → VALUE

WAN SIDE AT QALC GATEWAY 322

WAN 4-TUPLE AND PROTOCOL → HASH FUNCTION → INDEX → UE ID AND CONN ID

KEY → VALUE

FIG. 4A

App Type to QoS Class (QC) Mapping

| App Type of TCP/UDP Payload | QC |
|---|---|
| Realtime Such as VoIP | 1 |
| Interactive | 2 |
| Streaming | 3 |
| Interactive Heavy | 3 |
| Bulk | 4 |

App Type / App Message Type to Latency Class (LC) Mapping

| App Type / App Message Type of TCP/UDP Payload | LC |
|---|---|
| VoIP in RTN Direction | 1 |
| VoIP in FWD Direction | 1 |
| DNS in RTN Direction | 1 |
| DNS in FWD Direction | 1 |
| TLS/QUIC Handshake in RTN Direction | 1 |
| TLS/QUIC Handshake in FWD Direction | 1 |
| HTTP Request in RTN Direction | 2 |
| HTTP Response for Browsing in FWD Direction NoByte <= TH_BResp | 2 |
| HTTP Response for Browsing in FWD Direction NoByte > TH_BResp | 3 |
| HTTP Response for Streaming in FWD Direction NoByte <= TH_SResp | 2 |
| HTTP Response for Streaming in FWD Direction NoByte > TH_SResp | 3 |
| File Upload in RTN Direction | 4 |
| File Download in RTN Direction | 4 |

LC TO MTAN TYPE MAPPING FOR TERRESTRIALS & GEO

| LC | MTAN TYPE |
|----|-----------|
| 1,2 | TERRESTRIAL |
| 3,4 | GEO |

LC TO MTAN TYPE MAPPING FOR LEO & GEO

| LC | MTAN TYPE |
|----|-----------|
| 1,2 | LEO |
| 3,4 | GEO |

RTT OF MTAN TYPE

| MTAN TYPE | RTT (MSEC) |
|-----------|-----------|
| GEO | 800 |
| MEO | 150 |
| LEO | 60 |
| TERRESTRIAL | 40 |

700C

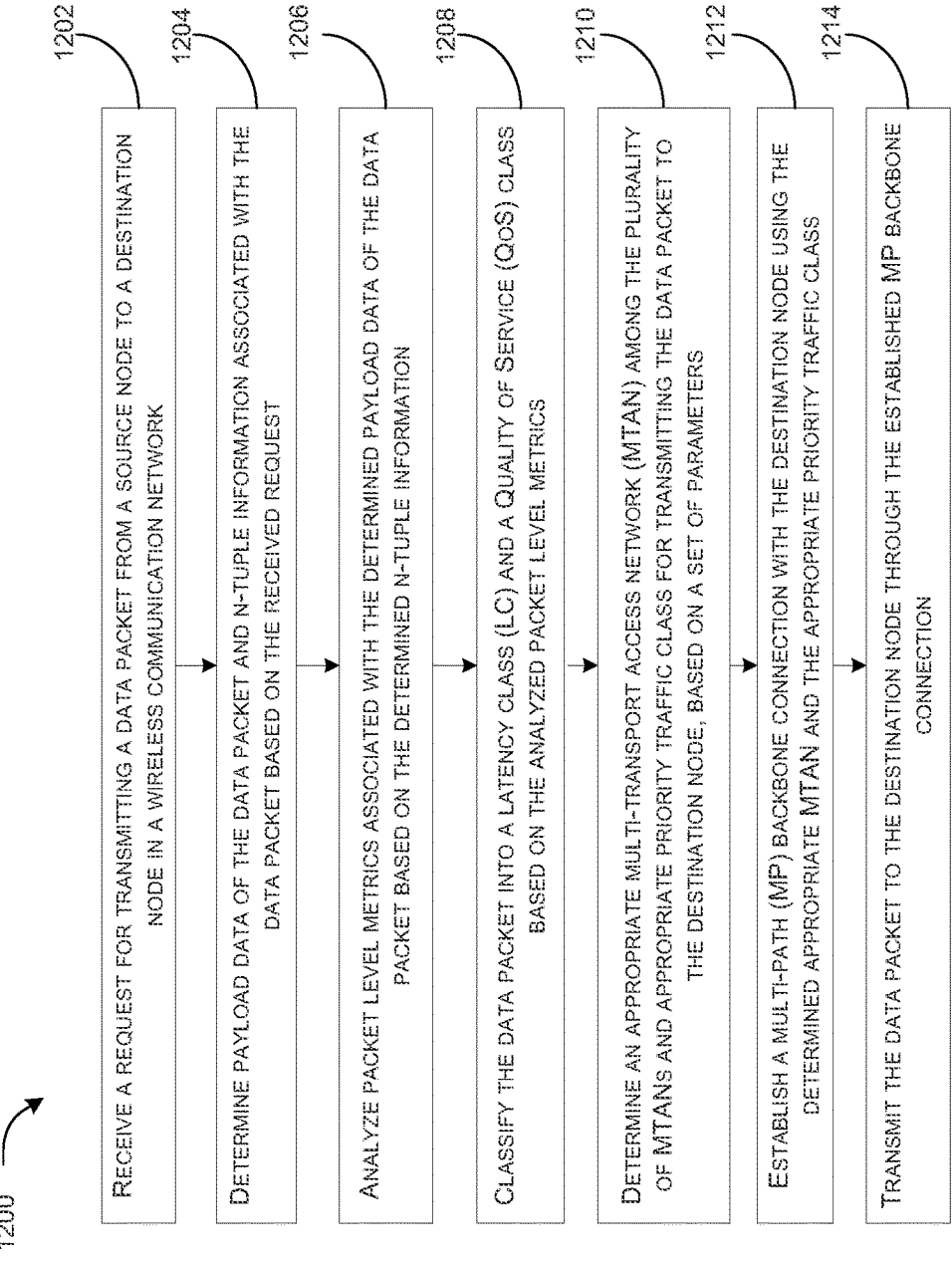

1200

1202 — RECEIVE A REQUEST FOR TRANSMITTING A DATA PACKET FROM A SOURCE NODE TO A DESTINATION NODE IN A WIRELESS COMMUNICATION NETWORK

1204 — DETERMINE PAYLOAD DATA OF THE DATA PACKET AND N-TUPLE INFORMATION ASSOCIATED WITH THE DATA PACKET BASED ON THE RECEIVED REQUEST

1206 — ANALYZE PACKET LEVEL METRICS ASSOCIATED WITH THE DETERMINED PAYLOAD DATA OF THE DATA PACKET BASED ON THE DETERMINED N-TUPLE INFORMATION

1208 — CLASSIFY THE DATA PACKET INTO A LATENCY CLASS (LC) AND A QUALITY OF SERVICE (QoS) CLASS BASED ON THE ANALYZED PACKET LEVEL METRICS

1210 — DETERMINE AN APPROPRIATE MULTI-TRANSPORT ACCESS NETWORK (MTAN) AMONG THE PLURALITY OF MTANS AND APPROPRIATE PRIORITY TRAFFIC CLASS FOR TRANSMITTING THE DATA PACKET TO THE DESTINATION NODE, BASED ON A SET OF PARAMETERS

1212 — ESTABLISH A MULTI-PATH (MP) BACKBONE CONNECTION WITH THE DESTINATION NODE USING THE DETERMINED APPROPRIATE MTAN AND THE APPROPRIATE PRIORITY TRAFFIC CLASS

1214 — TRANSMIT THE DATA PACKET TO THE DESTINATION NODE THROUGH THE ESTABLISHED MP BACKBONE CONNECTION

FIG. 12

QUALITY OF EXPERIENCE (QOE)-AWARE TRANSMISSION OVER MULTI-TRANSPORT

TECHNICAL FIELD

This patent application is directed to wireless communication systems and, more specifically, to a system and a method for efficient data transmission over multiple transport networks.

BACKGROUND

Satellite communication networks utilize spaceborne platforms which include low earth orbiting (LEO) satellites, medium earth orbiting (MEO) satellites, and geosynchronous earth orbiting (GEO) satellites. Further, these spaceborne platforms, also referred to as non-terrestrial network (NTN) satellite systems, are developed as a multi-transport system with hybrid direct satellite access in which a user equipment (UE) may communicate to a plurality of terrestrial networks as well as the NTN satellite systems.

In multi-transport systems with multiple access networks, multiple communication paths are available between two endpoints, such as the UE and a web server. It may be difficult to decide which data packets should be transmitted over which access network. Each access network may exhibit different link characteristics, including availability, a Round Trip Time (RTT), a packet loss rate (PLR), an available bit rate (ABR), a per-byte monetary cost (PBC), and power requirements in the UE. Additionally, different user applications may have varying quality of service (QoS) requirements, and the UE may have multiple applications concurrently running, that share the communication paths to the internet. Therefore, an efficient scheduling mechanism may be needed to balance QoS goals considering the constraints of available communication paths.

Some solutions propose an approach to improve application performance by combining the use of a small amount of usage from a low-latency terrestrial access network and high bandwidth from a high-latency satellite access network in a multi-transport system.

Some of the existing solutions may propose a performance-enhancing proxy (PEP) for transmission control protocol (TCP). The network performance-enhancing functions may include providing local acknowledgments, multiplexing multiple TCP connections over a common backbone connection, and prioritizing TCP connections based on prioritization criteria. The conventional TCP PEP may not function with encrypted transport running over a user datagram protocol (UDP) such as a quick UDP internet connection (QUIC). Further, the conventional TCP PEP may not consider a multi-transport system. Hence, the existing solutions may have limitations in terms of supporting the multi-path transport protocols, extending the ATSSS functionality beyond terrestrial networks, and considering access network parameters for scheduling and preventing congestion caused by traffic sources such as the UEs and the web servers.

Consequently, there is a need to provide an improved system and method for efficient data transmission over multiple transport networks to address at least the aforementioned issues in the prior art.

SUMMARY

This summary is provided to introduce a selection of concepts, in a simple manner, which is further described in the detailed description of the disclosure. This summary is neither intended to identify essential inventive concepts of the subject matter nor to determine the scope of the disclosure.

An aspect of the present disclosure provides a system for the quality of experience (QoE)-aware transmission over multi-transport. The system receives a request for transmitting a data packet from a source node to a destination node in a wireless communication network. The source node is connected to the destination node via a plurality of multi-transport access networks (MTANs). Further, the system determines payload data of the data packet and n-tuple information associated with the data packet, based on the received request. Furthermore, the system analyzes packet-level metrics associated with the determined payload data of the data packet based on the determined n-tuple information. Additionally, the system classifies the data packet into a latency class (LC) and a Quality of Service (QoS) class based on the analyzed packet level metrics. Further, the system determines an appropriate multi-transport access network (MTAN) among the plurality of MTANs and an appropriate priority traffic class for transmitting the data packet to the destination node, based on a set of parameters. Furthermore, the system establishes a multi-path (MP) backbone connection with the destination node using the determined appropriate MTAN and the appropriate priority traffic class. Additionally, the system transmits the data packet to the destination node through the established MP backbone connection.

An aspect of the present disclosure provides a method for quality of experience (QoE)-aware transmission over multi-transport. The method includes receiving a request for transmitting a data packet from a source node to a destination node in a wireless communication network. The source node is connected to the destination node via a plurality of multi-transport access networks (MTANs). Further, the method includes determining payload data of the data packet and n-tuple information associated with the data packet based on the received request. Furthermore, the method includes analyzing packet-level metrics associated with the determined payload data of the data packet based on the determined n-tuple information. The method further includes classifying the data packet into a latency class (LC) and a Quality of Service (QoS) class based on the analyzed packet level metrics. Moreover, the method includes determining an appropriate multi-transport access network (MTAN) among the plurality of MTANs and an appropriate priority traffic class for transmitting the data packet to the destination node, based on a set of parameters. Furthermore, the method includes establishing a multi-path (MP) backbone connection with the destination node using the determined appropriate MTAN and the appropriate priority traffic class. Additionally, the method includes transmitting the data packet to the destination node through the established MP backbone connection. Yet another aspect of the present disclosure provides a system. The system includes a plurality of web servers configured to communicate with a plurality of user equipment (UEs) using a wide area network (WAN) and multi-transport access networks (MTANs). The system further includes a traffic routing device communicatively coupled to the plurality of web servers and the plurality of UEs. The traffic routing device is connected to a plurality of web servers using the WAN. Further, the traffic routing device is connected to the plurality of UEs using the MTANs. The traffic routing device is configured to route a plurality of data packets between the plurality of UEs and the plurality of web servers, using MTANs and the WAN. Further, the system includes the plurality of UEs communicatively coupled to the plurality of web servers via the traffic routing device. The plurality of UEs is configured to exchange the plurality of data packets with the plurality of web servers via the traffic routing device.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF ACCOMPANYING DRAWINGS

Features of the disclosed embodiments are illustrated by way of example and not limited in the accompanying figures, in which like numerals indicate like elements, in which:

FIG. 4A illustrates an example tabular form representation of a connection table stored by a connection manager module at a UE and at a traffic routing device, according to an example;

FIG. 7B illustrates a tabular diagram representation of a mapping of application types or application message types to respective latency classes (LC) and respective quality-of-service classes (QC), according to an example;

FIG. 12 illustrates an example flow diagram representation of a method of quality of experience (QoE)-aware transmission over multi-transport, according to an example.

Figure 1A:
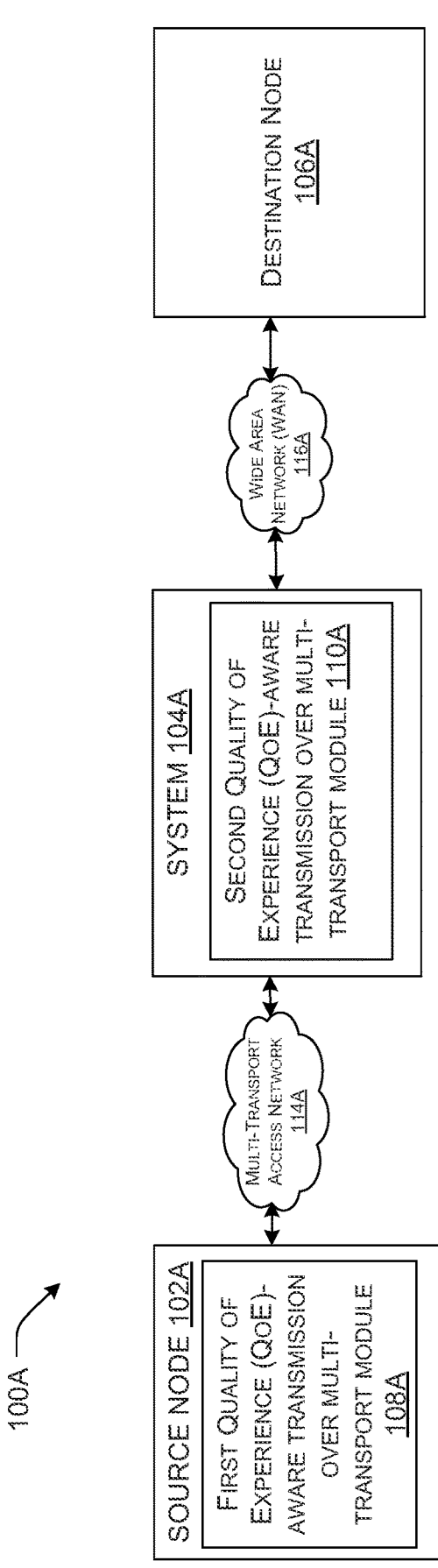
FIG. 1A illustrates an example block diagram representation of a network architecture implementing a system for the quality of experience (QoE)-aware transmission of data packets over multi-transport access network(s) (MTANs), according to an example.

Further, those skilled in the art will appreciate those elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one of a particular element. The terms "a" and "an" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to. The term "relevant" means closely connected or appropriate to what is being performed or considered.

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration". Any embodiment or implementation of the present subject matter described herein as "exemplary" is not necessarily to be construed as preferred or advantageous over other embodiments. The terms "comprise", "comprising", or any other variations thereof, are intended to cover a non-exclusive inclusion, such that one or more devices or subsystems or elements or structures or components preceded by "comprises . . . a" does not, without more constraints, preclude the existence of other devices, sub-systems, additional sub-modules. Appearances of the phrase "in an embodiment", "in another embodiment", "in an exemplary embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting. A computer system (standalone, client, server, or computer-implemented system) configured by an application may constitute a "module" (or "subsystem") that is configured and operated to perform certain operations. In one embodiment, the "module" or "subsystem" may be implemented mechanically or electronically, so a module includes dedicated circuitry or logic that is permanently configured (within a special-purpose processor) to perform certain operations. In another embodiment, a "module" or a "subsystem" may also comprise programmable logic or circuitry (as encompassed within a general-purpose processor or other programmable processor) that is temporarily configured by software to perform certain operations. Accordingly, the term "module" or "subsystem" should be understood to encompass a tangible entity, be that an entity that is physically constructed permanently configured (hardwired), or temporarily configured (programmed) to operate in a certain manner and/or to perform certain operations described herein.

The present disclosure employs techniques based on the quality of experience (QoE)-Aware transmission over multi-transport with varying Link availability, characteristics, and cost (QALC). These techniques may improve the user's QoE. Further, some of the techniques disclose identification of latency-sensitive traffic flows such as domain name system (DNS) lookups and latency-sensitive messages in a flow such us connection setups, and transmission of them over low latency transport in 3GPP standard-based systems are employed. One example of a user's QoE improvement may be the accelerated page load time of secure web pages in hypertext transfer protocols (HTTP).

Additionally, the present disclosure may be implemented with an "over-the-top (OTT)" approach without modifying the standard or making the standard QALC-capable. The 3GPP standard provides access traffic steering, switch, and splitting (ATSSS) functionality to employ multiple transport paths to transmit user's traffic. A system for implementing a standard-based ATSSS QALC-capable architecture is disclosed. The system may be implemented in an end user's equipment which implements multi-transport interfaces connected to multiple access networks.

Further, a system for a traffic classification considering application layer messages and employing application message-based classification is disclosed. The system may employ access network parameters such as satellite ephemeris data in link monitoring to determine the link availability and condition for scheduling over multi-transport access paths. The system further provides a scheduling method to select access network and QoS class, based on latency requirements of application layer messages in a flow, QoS requirements, link quality, usage status, and system configuration. Further, the system provides a multiplexed transport for the efficient use of network resources and multiple priorities for the QoE of different user applications. Examples of improvement in users' QoE may include accelerated web access and better quality in video streaming.

Referring now to the drawings, and more particularly to FIG. 1A through FIG. 12, where similar reference characters denote corresponding features consistently throughout the figures, there are shown preferred embodiments and these embodiments are described in the context of the following example system and/or method.

FIG. 1A illustrates an example block diagram representation of a network architecture 100A implementing a system 104A for quality of experience (QoE)-aware transmission of data packets over multi-transport access network(s) (MTANs) 114A, according to an example. In some examples, the network architecture 100A may depict a wireless/satellite communication system capable of providing quality of experience (QoE)-aware transmission of data packets. In some examples, the wireless/satellite communication system may be a third-generation partnership project (3GPP) standard-based terrestrial system, and non-terrestrial systems such as, but are not limited to, low earth orbiting (LEO) satellites, medium earth orbiting (MEO) satellites, geosynchronous earth orbiting (GEO) satellites, and/or other satellite types. In one example embodiment, the network architecture 100A may include a source node 102A, the system 104A, and a destination node 106A. The source node 102A and the system 104A may be communicatively connected through MTAN 114A. Further, the system 104A and the destination node 106A may be communicatively connected through a wide area network 116A. The system 104A acts as an intermediate node.

The MTAN 114A may include, but are not limited to, a multi-service access network (MSAN) (such as a digital subscriber line (DSL), a passive optical network (PON), or ethernet), a wireless mesh network (such as wireless fidelity (Wi-Fi), worldwide interoperability for microwave access (WiMAX), or cellular), a hybrid fiber-coaxial (HFC) network, a multi-access edge computing (MEC) network (such as cellular, Wi-Fi, and wired connections), a software-defined wide area network (SD-WAN) (such as multiprotocol label switching (MPLS), broadband internet, and cellular networks). Further, the MTAN 114A may include, but is not limited to, an Internet of things (IoT) network (cellular, low-power wide-area network (LPWAN), Wi-Fi, or Ethernet), a hybrid Network (such as a mixture of fiber optics, DSL, cable, and wireless connectivity options), a campus network (such as ethernet, fiber optics, wireless technologies (e.g., Wi-Fi)), a metropolitan area network (MAN) (such as fiber optics, ethernet, MPLS, and wireless connections), a carrier-grade network (such as fiber optics, DSL, cable, wireless (such as 4G/5G cellular networks), and satellite), a mobile network operators (MNOs) (such as 2G, 3G, 4G LTE, 5G, new radio (NR) and 6G), a power line communication (PLC) network, any other network, and a combination thereof. Further, the WAN 116A may include, but is not limited to, an internet, multiprotocol label switching (MPLS), leased lines, virtual private networks (VPNs), wireless WAN (WWAN), satellite networks, frame relay and asynchronous transfer mode (ATM) networks, any other network, and a combination thereof.

Further, the source node 102A may include, but is not limited to, user equipment, an electronic device, a video streaming client a user-initiated voice call originating from a voice-over-internet protocol (VoIP) application or device, and the like. The destination node 106A may include, but is not limited to, a web server, a cloud server, a monitoring station, user equipment, an electronic device, a VoIP application, or device, and the like. The user equipment and the electronic device may include, but are not limited to, a smartphone, a mobile phone, a personal digital assistant, a tablet computer, a phablet computer, a wearable device, a computer, a laptop computer, an augmented/virtual reality device (A/VR), internet of things (IoT) device, a camera, and any other combination thereof.

In an example embodiment, the system 104A may be implemented as a standalone device such as a networking apparatus or device. In an example embodiment, each of the source nodes 102A, and the destination node 106A may be implemented as a standalone device. In another example, embodiment, each of the source node 102A, the system 104A, and the destination node 106A may be implemented and integrated into an existing network device/network apparatus such as a mobile terminal, user equipment (UE), and/or web/cloud server.

The network architecture 100A may include other system elements or components, and is not limited to the components shown in FIG. 1A. For example, the source node 102B may include an application (not shown), a performance-enhancing proxy (PEP) module, (not shown), a user equipment (UE), and a web server, as shown in FIGS. 2A, and 2B, a processor, and a memory comprising modules as shown in FIG. 2C. The present disclosure may be implemented in different ways as shown in FIGS. 1A-2C (system 104A, system 104B, system 204A, system 204B, and system 204C).

It should be appreciated that the network architecture 100A and the system(s) 104A are depicted in FIGS. 1A-2C may be a few examples of implementations. Hence, the network architecture 100A may or may not include additional features, and some of the features described herein may be removed and/or modified without departing from the scope of the network architecture 100A outlined herein.

In some examples, the network architecture 100A may also include a private network and/or public network (not shown in FIGS. 1A-2C). The private network and/or public network may include any variations of networks. For example, the private network may be a local area network (LAN), and the public network may be a wide area network (WAN). Also, the private network and/or public network may each be a local area network (LAN), wide area network (WAN), the Internet, a cellular network, a cable network, a satellite network, or other networks that facilitate communication between the components of network architecture 100A as well as any external element or system connected to the private network and/or public network. The private network and/or public network may further include one, or any number, of the example types of networks mentioned above operating as a stand-alone network or in cooperation with each other. For example, the private network and/or public network may utilize one or more protocols of one or more clients or servers to which they are communicatively coupled. The private network and/or public network may facilitate the transmission of data according to a transmission protocol of any of the devices and/or systems in the private network and/or public network. Although each of the private network and/or public networks may be a single network, it should be appreciated that in some examples, each of the private network and/or public networks may include a plurality of interconnected networks as well.

Further, the network architecture 100A may include user terminals (not shown in FIGS. 1A-2C) which may be used by but are not limited to, a user, a customer, an administrator, a network operator, a media content operator, an over-the-top (OTT) operator, any other operator, and/or type of users. Although the terminals may typically remain in the same location once mounted, the terminals may be removed from their mounts, relocated to another location, and/or may be configured to be mobile terminals. For example, the terminals may be mounted on mobile platforms that facilitate transportation thereof from one location to another. Such mobile platforms may include, for example, any number of mobile vehicles, such as airplanes, cars, buses, boats, trucks, troop carriers, or other vehicles, and/or other types of vehicles/commuting means. It should be appreciated that such terminals may generally be operational when still and not while being transported. That said, there may be scenarios where the terminals may be transportable (mobile) terminals that remain operational during transit. As used herein, the terms "terminal," "customer terminal," "satellite terminal," "very small aperture terminal (VSAT)", and/or "user terminal", may be used interchangeably to refer to these terminal types.

Further, the network architecture 100A may include a satellite (not shown in FIGS. 1A-2C) which may be an object intentionally placed into orbit. In some examples, the satellite may be an artificial satellite that may be configured to transmit and receive data signals. For example, the satellite may form one or more beams (e.g., spot beams) and provide connectivity between the source node 102A and the destination node 106A. More specifically, the satellite may communicate data signals using these beams with the terminals via a terminal return channel and a terminal forward channel, and with the gateway via a gateway return channel and a gateway forward channel (not shown). It should be appreciated that the satellite may from any number of beams to communicate data signals with any number of components, even beyond the terminals or the gateway.

In some examples, the network architecture 100A may include airborne or spaceborne vehicles (not shown in FIGS. 1A-2C). For example, the non-terrestrial networks (NTN) refer to networks, or segments of networks, using an airborne or spaceborne vehicle for transmission. In some examples, the airborne vehicles refer to High Altitude Platforms (HAPs) encompassing Unmanned Aircraft Systems (UAS). The UAS may include for example, a tethered UAS, a Lighter than Air UAS and a Heavier than Air UAS. Each of these UASs operate at altitude; between an example range of 8 km and 50 km, quasi-stationary.

In some examples, the satellite may include, but is not limited to, a transponder satellite, a regenerative satellite, and/or other similar satellite. Furthermore, in some examples, the satellite may operate in geosynchronous, mid-earth, low-earth, elliptical, or some other orbital configuration. For example, a geostationary earth orbit (GEO)

satellite, a low-earth orbit (LEO) satellite, a terrestrial satellite, a non-terrestrial satellite, a medium earth orbit (MEO) satellite, and/or another type of satellite.

While the processors, components, elements, systems, subsystems, and/or other computing devices may be shown as single components or elements, one of ordinary skill in the art would recognize that these single components or elements may represent multiple components or elements and that these components or elements may be connected via one or more networks. Also, middleware (not shown) may be included with any of the elements or components described herein. The middleware may include software hosted by one or more servers. Furthermore, it should be appreciated that some of the middleware or servers may or may not be needed to achieve functionality. Other types of servers, middleware, systems, platforms, and applications not shown may also be provided at the front-end or back-end to facilitate the features and functionalities of the network architecture 100A, and components, as shown in FIGS. 1A-2C.

The network architecture 100A depicts a scenario where a plurality of UEs acts as a source node 102A and a plurality of web servers acts as a destination node 106A. The system 104A acts as an intermediate node.

In one example embodiment, the source node 102A may include a first quality of experience (QoE)-aware transmission over multi-transport module 108A. In one example embodiment, the system 104A may include a second quality of experience (QoE)-aware transmission over multi-transport module 110A. In one example embodiment, the destination node 106A may include an application (not shown). The application may include, but is not limited to, hypertext transfer protocol (HTTP) components, web application frameworks, content management systems (CMS), server-side scripting languages, authentication and authorization modules, web services, and application programming interfaces (APIs), caching and load balancing mechanisms, e-commerce applications, social media platforms, over-the-top (OTT) applications, any other applications, and a combination thereof.

In an embodiment, the system 104A may be implemented in two modes. For example, a first mode may include an over-the-top (OTT) for a Quality of experience (QoE)-Aware transmission over multi-transport with varying Link availability, characteristics, and cost (QALC). In the first mode, a QALC client in a UE (not shown in FIG. 1A) communicates with a QALC gateway (not shown in FIG. 1A) through the internet over MTANs 114A without using 3GPP standard protocols and support. Further, a second mode may include a QALC capable of access traffic steering, switch, and splitting (ATSSS). In the second mode, an ATSSS protocol and a software residing in the UE, communicate with a QALC-cable protocol data unit (PDU) session anchor (PSA) user plane function (UPF) unit.

In an example embodiment, the system 104A may include a processor (not shown in FIGs.) and a memory (not shown in FIGs.) operatively coupled with the processor. The memory includes processor-executable instructions in the form of the second quality of experience (QoE)-aware transmission over multi-transport module 110A. The processor executes the second quality of experience (QoE)-aware transmission over multi-transport module 110A to perform a plurality of steps described below. In another example, the source node 102A may include a processor (not shown in FIGs.) and a memory (not shown in FIGs.) operatively coupled with the processor. The memory includes processor-executable instructions in the form of the first quality of experience (QoE)-aware transmission over multi-transport module 108A. The processor executes the first quality of experience (QoE)-aware transmission over multi-transport module 108A to perform a plurality of steps described below.

In an example embodiment, the first quality of experience (QoE)-aware transmission over multi-transport module 108A receives a request for transmitting a data packet from the source node 102A to the destination node 106A, in a wireless communication network. The source node 102A may be connected to the destination node 106A through the plurality of multi-transport access networks (MTANs) 114A and the WAN 116A. Based on the received request, the first quality of experience (QoE)-aware transmission over multi-transport module 108A determines payload data of the data packet and n-tuple information associated with the data packet.

In an example embodiment, the source node 102A may execute the first quality of experience (QoE)-aware transmission over multi-transport module 108A to analyze packet level metrics associated with the determined payload data of the data packet based on the determined n-tuple information. Based on the analyzed packet level metrics, the source node 102A may execute the first quality of experience (QoE)-aware transmission over multi-transport module 108A to classify the data packet into a latency class (LC) and a quality of service (QoS) class. In some examples, the data packets are classified in a connection/flow or a flow into application type or application message type. This is achieved by inspecting header fields of the data packets or any may use any other known classification method Further, each of the application type or the application message type are mapped to a respective latency class (LC) and a QoS class. This is achieved by configuring a rule or a dynamic algorithm. An example of configured rule of mapping is given in FIG. 7B.

Examples of QoS classes may include, but are not limited to, an interactive class, a streaming class, a real-time class, a bulk class, and the like. In some examples, the LC may be used to select a MTAN 114A and the QoS class may be used to select a plurality of priority classes for a connection within the MP backbone in the selected MTAN 114A.

In an embodiment, based on a set of parameters, the source node 102A may execute the first quality of experience (QoE)-aware transmission over multi-transport module 108A to determine an appropriate multi-transport access network (MTAN) among the plurality of MTANs 114A and an appropriate priority traffic class for transmitting the data packet to the destination node 106A. In an embodiment, for determining the appropriate multi-transport access network (MTAN) among the plurality of MTANs 114A, the module 108A may obtain a latency class (LC) associated with the determined payload data based on the classification of the data packet. Further, the module 108A may determine the set of parameters including, but not limited to, one of a link availability value, a packet loss rate (PLR), available bit rate (ABR), a user equipment (UE) power, usage level, a per byte monetary cost (PBC), system configuration parameters, and the like. Furthermore, the module 108A may map, the set of parameters with predefined threshold parameters. Additionally, based on the mapping of the set of parameters with the predefined threshold parameters, the module 108A may select the respective MTAN as the appropriate MTAN among the plurality of MTANs 114A.

In an embodiment, the module 108A may receive inputs including, but not limited to, a latency class (LC), a QoS class (QC) of arriving TCP/UDP payloads, a link quality metrics, a Round Trip Time (RTT), a packet loss rate (PLR), an available bit rate (ABR), a per-byte monetary cost (PBC), power requirements, a usage status, system configured rules and the like. Using the received inputs, the module 108A may determine a priority traffic class for transmission over a connection within the established MP backbone connection in the selected MTAN based on the determined QoS class.

In an embodiment, using the determined appropriate MTAN and the appropriate priority traffic class, the source node 102A may execute the first quality of experience (QoE)-aware transmission over multi-transport module 108A to establish a multi-path (MP) backbone connection with the system 104A. In an embodiment, the source node 102A may execute the first quality of experience (QoE)-aware transmission over multi-transport module 108A to transmit the data packet to the system 104A through the established MP backbone connection. Specifically, the module 108A may establish a multiplexed MP backbone connection with a plurality of priority levels between an application of the source node 102A and a performance enhancing proxy (PEP) module or a user datagram protocol (UDP) connection manager module of the source node 102A. Each of the selected MTAN include the plurality of priority levels. The source node 102A may execute the first quality of experience (QoE)-aware transmission over multi-transport module 108A to assign the data packet with a corresponding QoS class based on the plurality of priority levels. Further, the source node 102A may execute the first quality of experience (QoE)-aware transmission over multi-transport module 108A to generate a plurality of multi-path backbone protocol packets with headers based on the payload data of the plurality of data packets.

Furthermore, the source node 102A may execute the first quality of experience (QoE)-aware transmission over multi-transport module 108A to multiplex the generated plurality of multi-path backbone protocol packets with a specific QoS class over the established MP backbone connection. Further, the source node 102A may execute the first quality of experience (QoE)-aware transmission over multi-transport module 108A to determine whether the plurality of multi-path backbone protocol packets are in order for transmission. Furthermore, the source node 102A may execute the first quality of experience (QoE)-aware transmission over multi-transport module 108A to re-order the plurality of multi-path backbone protocol packets upon determining that the plurality of multi-path backbone protocol packets are out-of order for transmission. Additionally, the source node 102A may execute the first quality of experience (QoE)-aware transmission over multi-transport module 108A to transmit the plurality of re-ordered multi-path backbone protocol packets in sequence to the system 104A using the established MP backbone connection. The established MP backbone connection with network impairments are recovered locally. The MP backbone connection queues are controlled to prevent overflow of the multi-path backbone protocol packets In an embodiment, at the system 104A, the system 104A may receive the data packet from the source node 102A through the established MP backbone connection. In an embodiment, the system 104A may retrieve corresponding connection identifier (ID) associated with the data packet, by mapping the connection identifier (ID) with stored local connection information and established MP backbone connection information in a connection table. In an embodiment, the system 104A may determine n-tuple information, and a protocol identifier associated the established MP backbone connection based on a source node identifier, and the retrieved corresponding connection ID from the connection table.

In an embodiment, the system 104A may forward the received data packet from at least one of a performance enhancing proxy (PEP) module and a user datagram protocol (UDP) connection manager module at the system 104A to the application (not shown) of the destination node 106B. The PEP module or the UDP connection manager module at the system 104A may be connected to the application of the destination node 106B using a wide area network connection associated with the WAN 116A.

In an embodiment, the first quality of experience (QoE)-aware transmission over multi-transport module 108A and the second quality of experience (QoE)-aware transmission over multi-transport module 110A may monitor a plurality of link characteristics associated with each of the plurality of MTANs 114A. In an embodiment, based on the monitored plurality of link characteristics, the first quality of experience (QoE)-aware transmission over multi-transport module 108A and the second quality of experience (QoE)-aware transmission over multi-transport module 110A may record a number of data bytes of the data packet transmitted over each of the plurality of MTANs 114A. In an embodiment, the first quality of experience (QoE)-aware transmission over multi-transport module 108A and the second quality of experience (QoE)-aware transmission over multi-transport module 110A may receive estimated acknowledgment (ACK) packets from the destination node 106A. In an embodiment, the estimated acknowledgment (ACK) packets are transmitted by the destination node 106A to the source node 102A. In an embodiment, based on the received estimated ACK packets, the system 104A may modify a number of ACK packets to be transmitted over the plurality of MTANs 114A to the source node 102A.

Figure 1B:
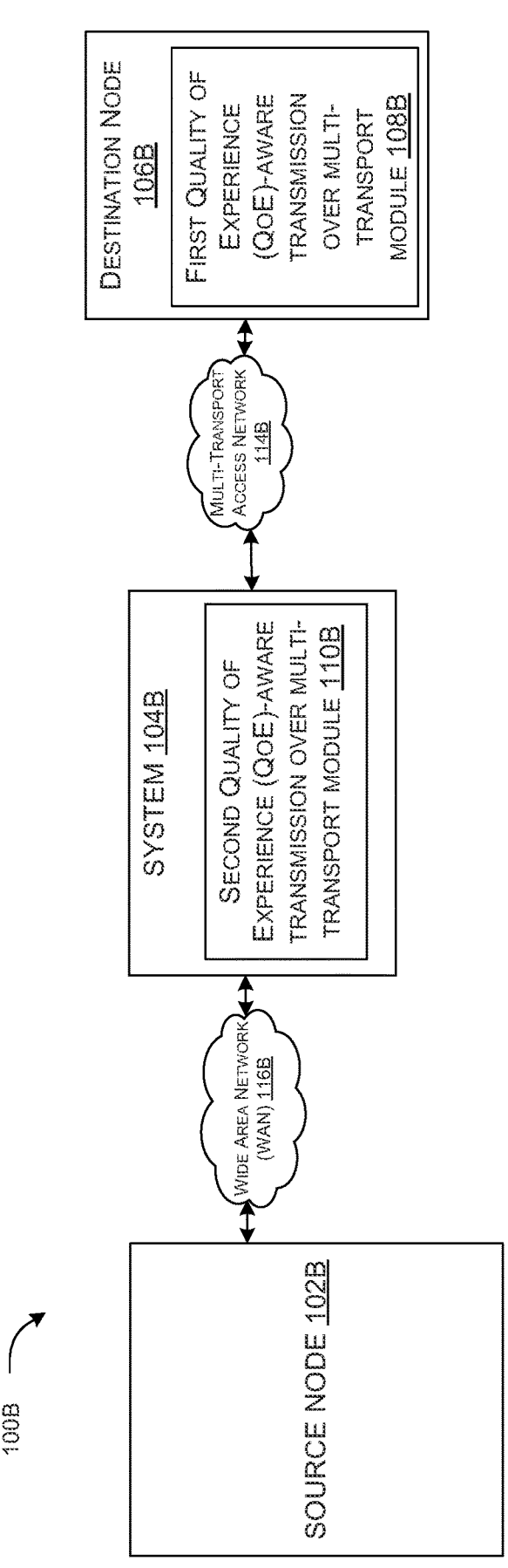
FIG. 1B illustrates an example block diagram representation of a network architecture implementing a system, which includes a first quality of experience (QoE)-aware transmission over multi-transport access networks (MTANs) module in a destination node, according to an example.
Figure 2A:
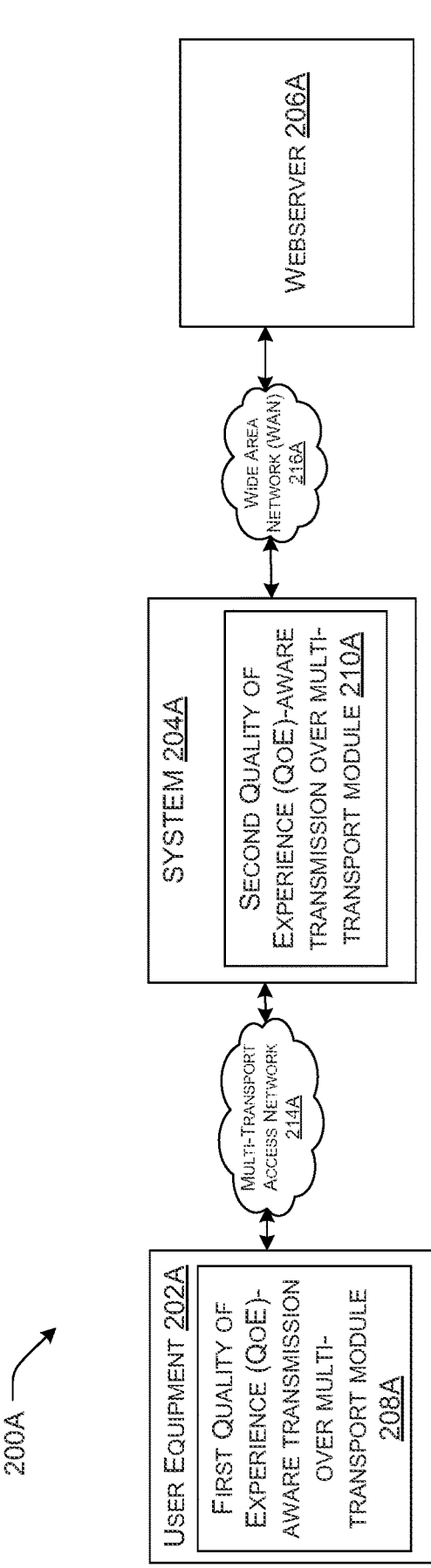
FIG. 2A illustrates an example block diagram representation of a network architecture implementing a system, which includes a user equipment and a web server, according to an example.
Figure 2B:
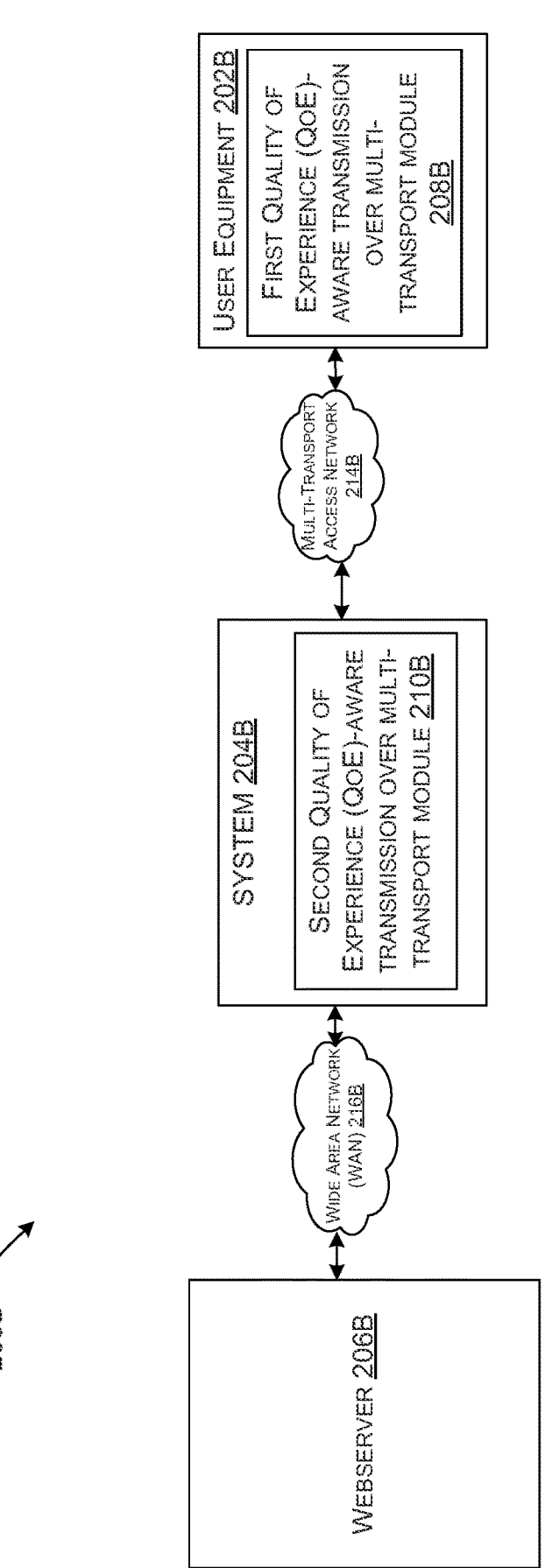
FIG. 2B illustrates an example block diagram representation of a network architecture implementing a system, which includes a first quality of experience (QoE)-aware transmission over multi-transport access networks (MTANs) module in a user equipment (UE), according to an example.
Figure 2C:
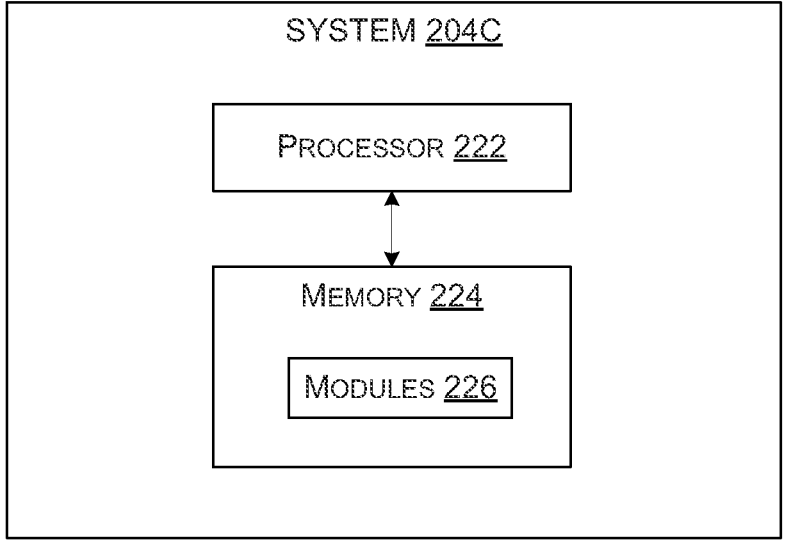
FIG. 2C illustrates an example block diagram representation of a system, which includes a processor and a memory comprising modules, according to an example.

FIG. 1B illustrates an example block diagram representation of a network architecture 100B implementing a system 104B, which includes a first quality of experience (QoE)-aware transmission over multi-transport access networks (MTANs) module 108B in a destination node 106B, according to an example. It should be appreciated that the system 104B is depicted in FIG. 1B may be an example. Hence, the system 104B may or may not include additional features, and some of the features described herein may be removed and/or modified without departing from the scopes of the system 104B outlined herein. The system 104B may be a traffic routing device 104B. The system 104B acts as an intermediate node.

The network architecture 1001B depicts an alternate scenario of FIG. 1A, where a plurality of UEs acts as a destination node 106B and a plurality of web servers acts as a source node 102B. The system 104B acts as the intermediate node.

In an embodiment, the network architecture 1001B may include a plurality of web servers (not shown in FIG. 1B) to communicate with a plurality of user equipment (UEs) (not shown in FIG. 1B) using a wide area network (WAN) 116B and multi-transport access networks (MTANs) 114B. Further, the network architecture 100B may include a traffic routing device 104B (also referred herein as the "system 104B") communicatively coupled to the plurality of web servers and the plurality of UEs. In an embodiment, the plurality of UEs includes the first Quality of Experience (QoE)-aware transmission over multi-transport module 108B. Further, the plurality of UEs functions as the destination node 106B, and the plurality of web servers function as the source node 102B. The traffic routing device 104B may be connected to the plurality of web servers using the WAN 116B, and connected to the plurality of UEs using the MTANs 114B. The traffic routing device 104B may be configured to route a plurality of data packets between the plurality of UEs and the plurality of web servers, using the MTANs 114B and the WAN 116B. Further, the plurality of UEs is communicatively coupled to the plurality of web servers via the traffic routing device 104B. The plurality of UEs may exchange the plurality of data packets with the plurality of web servers via the traffic routing device 104B.

In an embodiment, the first quality of experience (QoE)-aware transmission over multi-transport module 108B and the second quality of experience (QoE)-aware transmission over multi-transport module 110B may determine the multi-transport capabilities of an access traffic steering, switching, and splitting (ATSSS) protocol and a software associated with the plurality of UEs. The multi-transport capabilities support quality of experience (QoE)-aware transmission. In an embodiment, the system 104B may deploy the traffic routing device 104B as a user plane function (UPF) unit (not shown) within a telecommunication network based on the determined multi-transport capabilities of the ATSSS protocol and the software. Further, the traffic routing device 104B may function as an intermediate node between the plurality of UEs and the plurality of web servers. In an embodiment, the traffic routing device 104B may perform a plurality of steering functions for at least one of the transmission control protocol (TCP) applications and user datagram protocol (UDP) applications within the plurality of UEs.

In an embodiment, the system 104B may modify, but is not limited to, a data plane, a control plane, a management plane, and the like, of the telecommunication network to support the multi-transport capabilities for the quality of experience (QoE)-aware transmission. In an embodiment, based on the modified one of a data plane, the control plane, and the management plane, the system 104B may modify scheduling capabilities in the telecommunication network.

In an embodiment, based on the determined multi-transport capabilities of the ATSSS protocol and the software, the system 104B may deploy the traffic routing device 104B as a gateway between the telecommunication network and the plurality of web servers using the WAN 116B.

In an embodiment, the plurality of UEs includes the first Quality of Experience (QoE)-aware transmission over multi-transport module 108B. Further, the plurality of UEs functions as a destination node 106B, and the plurality of web servers function as a source node 102B.

In an embodiment, the second QoE-aware transmission over multi-transport module 110B may determine a payload data of the plurality of data packets and n-tuple information associated with the plurality of data packets.

In an embodiment, the second QoE-aware transmission over multi-transport module 110B may analyze packet-level metrics associated with the determined payload data of the plurality of data packets based on the determined n-tuple information. In an embodiment, the second QoE-aware transmission over multi-transport module 110B may classify the plurality of data packets into a latency class (LC) and a Quality of Service (QoS) class based on the analyzed packet level metrics. In an embodiment, the second QoE-aware transmission over multi-transport module 110B may determine an appropriate multi-transport access network (MTAN) among the plurality of MTANs 114B and an appropriate priority traffic class for transmitting the plurality of data packets to the plurality of UEs based on a set of parameters. In an embodiment, the set of parameters including, but not limited to, one of a link availability value, a packet loss rate (PLR), available bit rate (ABR), a user equipment (UE) power, usage level, a per byte monetary cost (PBC), system configuration parameters, and the like.

In an embodiment, the second QoE-aware transmission over multi-transport module 110B may determine priority traffic class for transmission over a connection within the established MP backbone connection in the selected MTAN based on the determined QoS class.

In an embodiment, using the determined appropriate MTAN and the appropriate priority traffic class, the second QoE-aware transmission over multi-transport module 110B may establish a multi-path (MP) backbone connection with the traffic routing system upon a request from the first Quality of Experience (QoE)-aware transmission over multi-transport module 108B. In an embodiment, the second QoE-aware transmission over multi-transport module 110B may transmit the plurality of data packets to the plurality of UEs through the established MP backbone connection.

In an embodiment, for transmitting the plurality of data packets to the plurality of UEs using the established MP backbone connection, the second QoE-aware transmission over multi-transport module 110B may generate a plurality of multi-path backbone protocol packets with headers based on the payload data of the plurality of data packets. In an embodiment, the module 110B may multiplex the generated plurality of multi-path backbone protocol packets with a specific QoS class over the established MP backbone connection. Furthermore, the module 110B may transmit the plurality of multiplexed multi-path backbone protocol packets to the plurality of UEs using the established MP backbone connection.

In an embodiment, the module 108B at the plurality of UEs end may receive the plurality of data packets from the traffic routing device through the established MP backbone connection. Further, the module 108B may retrieve corresponding connection identifier (ID) associated with the data packet, by mapping the connection identifier (ID) with stored local connection information and established MP backbone connection information in a connection table. Further, the module 108B may determine the n-tuple information, and a protocol identifier associated the established MP backbone connection based on a source node identifier, and the retrieved corresponding connection ID and a connection table. Additionally, the module 108B may forward the received plurality of data packets to an application of the plurality of UEs.

In an embodiment, for determining the payload data of the data packet and the n-tuple information associated with the data packet, the module 108B may establish a local connection between the application (not shown) of the destination node 106B and a performance-enhancing proxy module of the destination node 106B. The module 108B may determine the n-tuple information associated with the data packet based on the received request and a type of connection established between the application of the destination node 106B and the performance-enhancing proxy module. The n-tuple information may include, but is not limited to, a source internet protocol (IP) address, a source application protocol port number, a destination IP address, a destination application protocol port number, a protocol type, and the like.

Further, the PEP module (not shown) may include, but is not limited to, transmission control protocol/internet protocol (TCP/IP) accelerators, hypertext transfer protocol (HTTP) accelerators, wide area network (WAN) optimization controllers, mobile network accelerators, video streaming optimizers, compression performance enhancing proxy (PEP), caching PEP, quality of service (QoS) PEP, proxy server PEP, any other PEP based modules, and a combination thereof.

In an embodiment, for analyzing the packet level metrics associated with the determined payload data of the data packet, the module 110B may monitor bi-directional information on the payload data along with the n-tuple information for an application data flow between the application at the source node 102B and an application at the destination node 106B. Further, the module 110B may analyze the packet level metrics associated with the determined payload data of the data packet based on the n-tuple information and the monitored bi-directional information. The packet level metrics may include, but are not limited to, a payload size, a data packet time stamp, a relative packet position in a plurality of directions, protocol-specific information, and the like.

FIG. 2A illustrates an example block diagram representation of a network architecture 200A implementing a system 204A. The network architecture 200A may include a user equipment 202A and a web server 206A, according to an example. It should be appreciated that the system 204A as depicted in FIG. 2A may be an example. Hence, the system 204A may or may not include additional features, and some of the features described herein may be removed and/or modified without departing from the scopes of the system 204A outlined herein.

In an embodiment, the network architecture 200A may include a plurality of web servers 206A to communicate with a plurality of user equipment (UEs) 202A using a wide area network (WAN) 216A and a multi-transport access networks (MTANs) 214A. Further, the network architecture 200A may include a traffic routing device, such as the system 204A, (also referred to herein as traffic routing device 204A) communicatively coupled to the plurality of web servers 206A and the plurality of UEs 202A. In an embodiment, the plurality of UEs 202A may include the first quality of experience (QoE)-aware transmission over multi-transport module 208A. Further, the plurality of UEs 202A may function as a source node, and the traffic routing device 204A may function as a destination node. The traffic routing device 204A may be connected to the plurality of web servers 206A using the WAN 216A, and connected to the plurality of UEs 202A using the MTANs 214A. The traffic routing device 204A may route a plurality of data packets between the plurality of UEs 202A and the plurality of web servers 206A, using the MTANs 214A and the WAN 216A. Further, the plurality of UEs 202A is communicatively coupled to the plurality of web servers 206A via the traffic routing device 204A. The plurality of UEs 202A may be configured to exchange the plurality of data packets with the plurality of web servers 206A via the traffic routing device 204A.

In an embodiment, the system 204A may determine the multi-transport capabilities of an access traffic steering, switching, and splitting (ATSSS) protocol and a software associated with the plurality of UEs 202A. The multi-transport capabilities support quality of experience (QoE)-aware transmission. In an embodiment, the system 204A may deploy the traffic routing device as a user plane function (UPF) unit (not shown) within a telecommunication network based on the determined multi-transport capabilities of the ATSSS protocol and the software. In an embodiment, the system 204A may perform a plurality of steering functions for at least one of the transmission control protocol (TCP)

applications and user datagram protocol (UDP) applications within the plurality of UEs 202A.

In an embodiment, the plurality of UEs 202A includes the first quality of experience (QoE)-aware transmission over multi-transport module 208A. Further, the plurality of UEs 202A functions as a source node, and the traffic routing device 204A may function as a destination node. The first QoE-aware transmission over multi-transport module 208A may establish a local connection between the application in UE 202A and the performance-enhancing proxy module associated with the plurality of UEs 202A.

In an embodiment, the traffic routing device 204A may include the second QoE-aware transmission over multi-transport module 210A. The plurality of UEs 202A may function as a source node and the traffic routing device 204A functions as a destination node. The module 210A at the traffic routing device end 204A may receive the plurality of data packets from the plurality of UEs 202A through the established MP backbone connection. Further, the module 210A may retrieve corresponding connection identifier (ID) associated with the data packet, by mapping the connection identifier (ID) with stored local connection information and established MP backbone connection information in a connection table. Further, the module 210A may determine the n-tuple information and a protocol identifier associated the established MP backbone connection based on a source node identifier, the retrieved corresponding connection ID, and the connection table. Additionally, the module 210A may forward the received plurality of data packets to an application of the plurality of web servers 206A using the WAN 216A.

FIG. 2B illustrates an example block diagram representation of a network architecture 200B implementing a system 204B. The network architecture 200B includes a web server 206B and a user equipment (UE) 202B, according to an example.

In an embodiment, the network architecture 200B may include a plurality of web servers 206B to communicate with a plurality of user equipment (UEs) 202B using a wide area network (WAN) 216B and a multi-transport access networks (MTANs) 214B. Further, the network architecture 200B may include a traffic routing device, such as the system 204B, communicatively coupled to the plurality of web servers 206B and the plurality of UEs 202B. In an embodiment, the plurality of UEs 202B include the first quality of experience (QoE)-aware transmission over multi-transport module 208B. Further, the plurality of UEs 202B may function as a destination node, and the traffic routing device 204B may function as a source node. The traffic routing device 204B may be connected to the plurality of web servers 206B using the WAN 216B, and connected to the plurality of UEs 202B using the MTANs 214B. The traffic routing device 204B may route a plurality of data packets between the plurality of web servers 206B and the plurality of UEs 202B, using the WAN 216B and the MTANs 214B. Further, the plurality of web servers 206B are communicatively coupled to the plurality of UEs 202B via the traffic routing device 204B. The plurality of web servers 206B may exchange the plurality of data packets with the plurality of UEs 202B via the traffic routing device 204B. The network architecture 200B is an alternate scenario of FIG. 2A, where the plurality of UEs 202B acts as a destination node and the traffic routing device 204B acts as a source node.

FIG. 2C illustrates an exemplary block diagram representation of a system 204C, which includes a processor 222 and a memory 224 comprising modules 226, according to an example.

The system 204C is communicatively connected to a source node 102A or 102B, or 202A, or 202B and a destination node 106A or 106B, or 206B, or 206B through a network. The network may be, for example, a satellite-based network and/or a wireless-based network. The system 204C may include a processor 222, and a memory 224. The memory 224 may include processor-executable instructions in the form of a plurality of modules 226, which on execution, cause the processor 222 to perform one or more operations described herein. The memory 224 may include the plurality of modules 226. The modules 226 may include, a performance-enhancing proxy (PEP) module, a user plane function (UPF) module, a quality of experience (QoE)-aware transmission over multi-transport module, a transmission control protocol (TCP) PEP module, a user datagram protocol (UDP) connection manager module, a connection manager module, a traffic characterization module, a classifier module, a scheduler module, a link monitoring module, a usage tracking module, an acknowledgements (ACK) reduction module, a congestion control module, and/or other modules. Each of these modules when executed by the processor 222 performs one or more functionalities described in the context of the system 104A, 104B, 204A, and 204B. Execution of the machine-readable program instructions by the processor 222 may enable the system 204C to perform one or more functions. The "hardware" may comprise a combination of discrete components, an integrated circuit, an application-specific integrated circuit, a field programmable gate array, a digital signal processor, or other suitable hardware. The "software" may comprise one or more objects, agents, threads, lines of code, subroutines, separate software applications, two or more lines of code or other suitable software structures operating in one or more software applications or on one or more processors. The processor may include, for example, microprocessors, microcomputers, microcontrollers, digital signal processors, central processing units, state machines, logic circuits, and/or any devices that manipulate data or signals based on operational instructions. Among other capabilities, the processor may fetch and execute computer-readable instructions from a memory (not shown) operationally coupled with system 204C for performing tasks such as data processing, input/output processing, attributes extraction, and/or any other functions. Any reference to a task in the present disclosure may refer to an operation being, or that may be, performed on data or input information In an embodiment, the quality of experience (QoE)-aware transmission over multi-transport module, such as 110A, 110B, 210A or 210B may cause the processor 222 to receive a request for transmitting a data packet from a source node such as 102A, 102B, 202A or 202B to a destination node such as 106A, 106B, 206A or 206B in a wireless communication network. The source node such as 102A, 102B, 202A or 202B being connected to the destination node such as 1026A, 106B, 206A or 206B via a plurality of multi-transport access networks (MTANs) such as 114 and 214. Further, the quality of experience (QoE)-aware transmission over multi-transport module, such as 110A, 110B, 210A or 210B may cause the processor 222 to determine payload data of the data packet and n-tuple information associated with the data packet, based on the received request. Furthermore, the quality of experience (QoE)-aware transmission over multi-transport module, such as 110A, 110B, 210A or 210B may cause the processor 222 to analyze packet level metrics associated with the determined payload data of the data packet based on the determined n-tuple information. Further, the quality of experience (QoE)-aware transmission over multi-transport module, such as 110A, 110B, 210A or 210B may cause the processor 222 to classify the data packet into a latency class (LC) and a Quality of Service (QoS) class based on the analyzed packet level metrics.

Additionally, the quality of experience (QoE)-aware transmission over multi-transport module, such as 110A, 110B, 210A or 210B may cause the processor 222 to determine an appropriate multi-transport access network (MTAN) among the plurality of MTANs 114 and 214 and an appropriate priority traffic class for transmitting the data packet to the destination node 106A, 106B, 206A or 206B, based on a set of parameters. Further, the quality of experience (QoE)-aware transmission over multi-transport module, such as 110A, 110B, 210A or 210B may cause the processor 222 to establish a multi-path (MP) backbone connection with the destination node 106A, 106B, 206A or 206B using the determined appropriate MTAN and the appropriate priority traffic class. Furthermore, the quality of experience (QoE)-aware transmission over multi-transport module, such as 110A, 110B, 210A or 210B may cause the processor 222 to transmit the data packet to the destination node 106A, 106B, 206A or 206B through the established MP backbone connection In an embodiment, the quality of experience (QoE)-aware transmission over multi-transport module, such as 110A, 110B, 210A or 210B may cause the processor 222 to receive the data packet from the source node, such as 102A, 102B, 202A or 202B through the established MP backbone connection. Further, the module such as 110A, 110B, 210A or 210B may cause the processor 222 to retrieve corresponding connection identifier (ID) associated with the data packet, by mapping the connection identifier (ID) with stored local connection information and established MP backbone connection information in a connection table. Further, the module such as 110A, 110B, 210A or 210B may cause the processor 222 to determine n-tuple information, and a protocol identifier associated the established MP backbone connection based on a source node identifier, the retrieved corresponding connection ID, and the connection table. Furthermore, the module such as 110A, 110B, 210A or 210B may cause the processor 222 to forward the received data packet to an application of the plurality of web servers such as 206A and 206B using the WAN 216A and 216B.

Figure 3A:
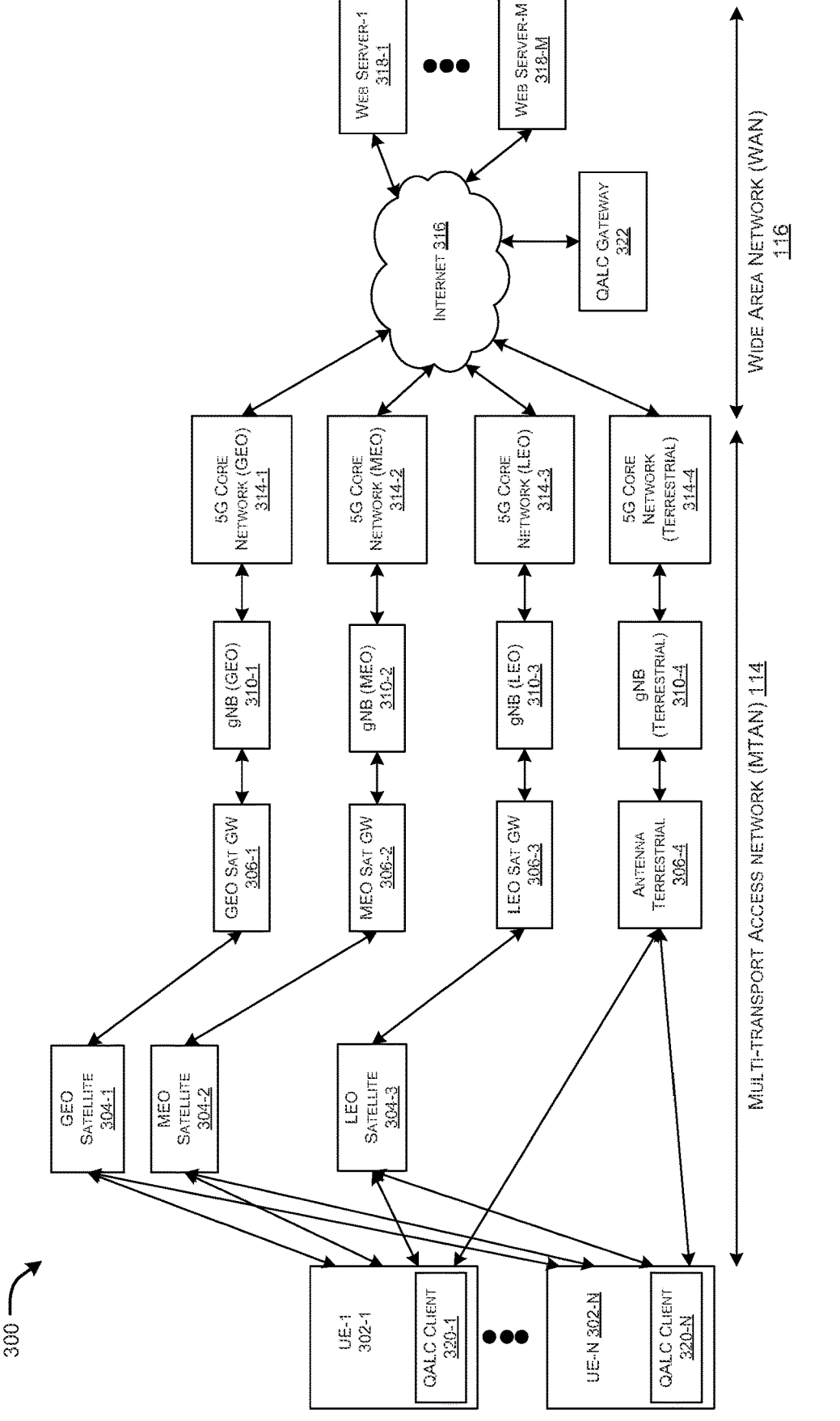
FIG. 3A illustrates an example detailed schematic representation of an over-the-top (OTT) implementation architecture for a Quality of experience (QoE)-Aware transmission over multi-transport with varying Link availability, characteristics, and Cost (QALC) approach, according to an example.

FIG. 3A illustrates an example detailed schematic representation of an over-the-top (OTT) implementation architecture 300 for a Quality of experience (QoE)-Aware transmission over multi-transport with varying Link availability, characteristics, and cost (QALC) approach, according to an example. The OTT implementation architecture 300 may include a plurality of QALC clients 320-1, 320-2, . . . , 320-N (individually referred to as the QALC client 320, and collectively referred to as the QALC clients 320) associated with a plurality of UEs 302-1, 302-2, . . . , 302-N (individually referred to as the UE 302, and collectively referred to as the UEs 302) and a QALC gateway 322. The QALC client 320 may correspond to a first Quality of Experience (QoE)-aware transmission over multi-transport modules 108A, 108B, 208A, and 208B, and a second QoE-aware transmission over multi-transport module 110A, 110B, 210A, and 210B. In one embodiment, the QALC client 320 may be associated with the UE 302. In another embodiment, the QALC client 320 may be associated with the QALC gateway 322. In one embodiment, the QALC gateway 322 may correspond to the system 104A, 104B, 204A, 204B, and 204C.

In an embodiment, the QALC gateway 322 may be in internet 316 independent of MTAN 4G/5G/6G core networks. The QALC gateway 322 may correspond to the traffic routing device. The QALC gateway 322 may be connected to the plurality of web servers 318 using the WAN 116A, and connected to the plurality of UEs 302 using the MTAN 114.

The UE 302 may be associated with a multi-transport capability having multiple access network interfaces. The multiple access network interfaces in each UE 302 are connected to a non-terrestrial network (NTN) 304-1, 304-2, and 304-3, and a terrestrial multi-transport network (MTN) 306-4. Each NTN 304-1, 304-2, and 304-3 comprises a GEO satellite 304-1, the MEO satellite 304-2, the LEO satellite 304-3, a gateway (GW) 306-1, 306-2, and 306-3, a next-generation node B (gNB) 310-1, 310-2, 310-3, and 310-4, and a 5G core network 314-1, 314-2, 314-3, and 314-4. The terrestrial MTN 306-4 includes a radio frequency (RF) antenna 306-4, a gNB 310-4, and a 5G core network 314-4. The 5G core network 314-1, 314-2, 314-3, and 314-4 are connected to a plurality of web servers 318-1, 318-2, . . . , 318-M, (individually referred to as the web server 318 and collectively referred to as the web servers 318) through the internet 316. The UE 302 communicates with the plurality of web servers 318 through the internet 316 via multi-transport access networks (MTANs) 114. The communication path between the UE 302 and the one or more web servers 318 includes a first segment and a second segment. The first segment includes the multiple multi-transport access networks (MTANs) 114 between the UE 302 and the 5G core network 314-1, 314-2, 314-3, and 314-4. The second segment includes a wide area network (WAN) 116 or 216 between the 5G core network 314-1, 314-2, 314-3, and 314-4 and the plurality of web servers 318.

In an embodiment, the OTT implementation architecture 300 may include the QALC gateway 322 for quality of experience (QoE)-aware transmission over multi-transport. In an embodiment, the QALC client 320 may be associated with the QALC gateway 322. The OTT implementation architecture 300 may bypass 3GPP ATSSS functionality for the multi-transport. The OTT implementation architecture 300 may be used, when any other architecture may be infeasible to customize the ATSSS protocol and software QALC-capable.

Figure 3B:
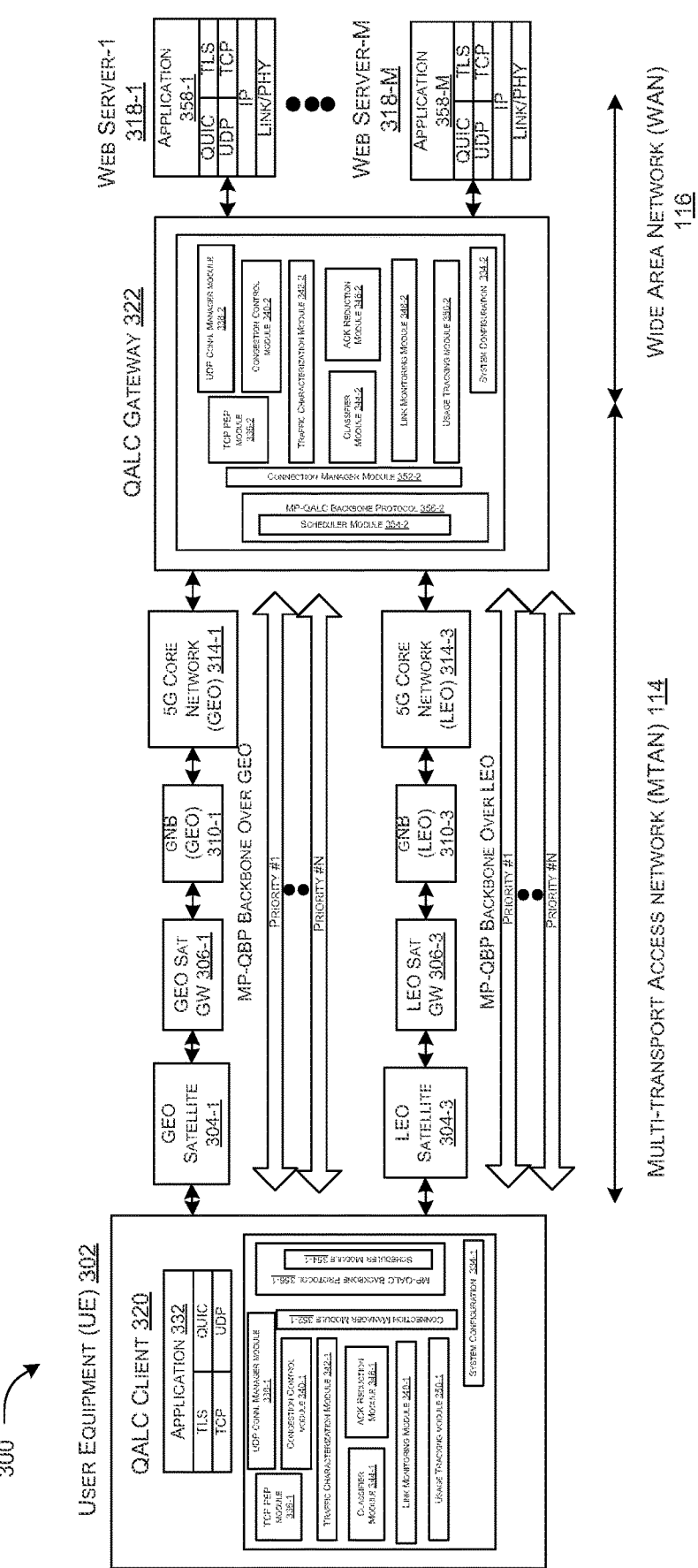
FIG. 3B illustrates an example detailed schematic representation of a user equipment (UE), a QALC gateway (i.e., traffic routing device), and a web server, such as those shown in FIG. 3A, depicting a detailed view of an OTT implementation architecture, according to an example.

FIG. 3B illustrates an example detailed schematic representation of a UE 302, a QALC gateway 322 (i.e., traffic routing device), and a web server 318, such as those shown in FIG. 3A, depicting a detailed view of the OTT implementation architecture 300, according to an example. FIG. 3B illustrates functional blocks and system components of the OTT implementation architecture 300. As an example, GEO and LEO access networks are shown in FIG. 3B. As shown, an application 332 associated with the UE 302 may communicate with application servers 358-1, . . . , 358-M, on the web servers 318-1, . . . , 318-M. The application may run over a transport layer security (TLS), over a transmission control protocol (TCP), or over quick user datagram protocol (UDP) internet connections (QUIC), or over UDP. The QALC client 320 associated with the UE 302 may receive or intercept TCP or UDP packets from the application 332 and 358.

In an embodiment, in the case of TCP packets, a TCP PEP module 336-1 associated with the QALC client 320 of the UE 302 may terminate the TCP connection locally on the UE 302. The TCP PEP module 336-1 associated with the QALC client 320 of the UE 302 may transport the payload of TCP packets to the TCP PEP module 336-2 associated with the QALC gateway 322 over MP-QBP backbones in the MTANs 114. The TCP PEP module 336-2 associated with the QALC gateway 322 may establish a TCP connection to the original web server 318 which the application on the UE 302 may need to communicate. Upon establishing the TCP connection, the TCP PEP module 336-2 may send the payload to the web server 318.

Consequently, an original TCP connection between the application 332 associated with the UE 302, and application server 358 associated with the web server 318 may be split into three connections. The connections may include a local TCP connection, a multi-path (MP) QALC (MP-QALC) backbone protocol (MP-QBP)-based connection, and a TCP connection. The local TCP connection may be between the application 332 on the UE 302 and the TCP PEP module 336-1 of the QALC client 320 associated with the UE 302. Further, the MP-QALC backbone protocol (MP-QBP) may be backbones over the MTANs 114 between the QALC client 320 on the UE 302 and the QALC gateway 322. Furthermore, the TCP connection may be between the TCP PEP module 336-2 on the QALC gateway 322 and the web server 318.

In an embodiment, in the case of the UDP, a UDP connection manager module 338-1 on the UE 302 may forward the payload of UDP packets to the QALC gateway 322 over an MP-QBP backbone in the MTAN 114. Then UDP connection manager module 338-2 on the QALC gateway 322 sends the payload to the original web server 318 which the application 332 on the UE 302 may need to communicate. Similar to the TCP, an original UDP connection between the application 332 on the UE 302 and the application server 358 on the web server 318 may be split into three connections. The three connections may include a local UDP connection, an MP-QBP backbone over MTANs connection, and a UDP connection. The local UDP connection may be between the application 332 of the UE 302 and the UDP connection manager module 338-1 at the QALC client 320 on the UE 302. Further, the MP-QBP backbone over the MTAN connection may be between the QALC client 320 on the UE 302 and the QALC gateway 322. Furthermore, the UDP connection may be between the UDP connection manager module 338-2 on the QALC gateway 322 and the web server 318.

In an embodiment, a connection manager module 352-1 associated with the QALC client 320 on the UE 302 does bookkeeping of TCP and UDP connections and transferring payloads of TCP and UDP packets between the TCP PEP module 336-1 and UDP connection manager module 338-1 at the QALC client 320 of the UE 302 and the MP-QBP backbones with appropriate headers. Similarly, the connection manager module 352-2 associated with the QALC gateway 322 does bookkeeping of the TCP connections and the UDP connections and transferring payloads of the TCP packets and the UDP packets between the TCP PEP module 336-2 and UDP connection manager module 338-2 associated with the QALC gateway 322 and the MP-QBP backbones with appropriate headers.

In an embodiment, an MP-QALC backbone protocol (MP-QBP) module 356-1 may be associated with the QALC client 320 associated with the UE 302, and an MP-QALC backbone protocol (MP-QBP) module 356-2 may be associated with the QALC gateway 322. The MP-QALC backbone protocol (MP-QBP) modules 356-1 and 356-2 may be configured to set up MP-QBP backbone connections with different priorities. Further, the modules 356-1 and 356-2 may be configured to perform scheduler services for the packets from queues of different QoS classes over the backbone connections with corresponding QoS classes. Furthermore, the modules 356-1 and 356-2 may be configured to multiplex payloads from the TCP/UDP connections with the same QoS class over a backbone connection. Additionally, the modules 356-1 and 356-2 may be configured to perform in-sequence delivery to applications 332 associated with the UE 302 and applications 356 associated with the web server 318. Furthermore, the modules 356-1 and 356-2 may be configured to provide a local recovery of network impairments over the access network, if required. Further, the modules 356-1 and 356-2 may be configured to perform congestion control to prevent user equipment 302 and web servers 318 from causing network congestion.

In an embodiment, a traffic characterization (TC) module 342-1 associated with the QALC client 320 and the traffic characterization (TC) module 342-2 associated with the QALC gateway 322 may passively monitor information on packets in both directions for a flow between the application 332 on the UE 302 and the web server 318. The TC module 342-1 and 342-2 may analyze the statistics and provides the output to an acknowledgments (ACK) reduction module 346-1 and 346-2 and a classifier module 344-1 and 344-2. Based on the information from the TC module 342-1 and 342-2, the classifier module 344-1 and 344-2 may classify packets from connections into two categories. The two categories may include a latency class, and a quality of service (QoS) class. The latency class may be based on categorizing packets belonging to latency-sensitive application layer messages transmitted over low latency transport access network. Further, the quality of service (QoS) classes may be based on categorizing into priority queues of different QoS classes to be transported over the MP-QBP backbones over the selected access network.

In an embodiment, the scheduler module 354-1 and 354-2 may select the corresponding access network and forwards the packets to the corresponding priority MP-QBP backbone queue. The selection of the access network may be based on a latency class and QoS class provided by the classifier modules 344-1 and 344-2, a current link quality provided by link monitoring modules 348-1, and 348-2, a UE battery power level, a usage status on each access network provided by a usage tracking module 350-1, and 350-2, system configuration 334-1 and 334-2, and the like.

In an embodiment, the link monitoring modules 348-1, and 348-2 may monitor link characteristics of each MTAN such as availability, RTT, PLR, ABR, and power consumption requirement if available. In an embodiment, the usage tracking modules 350-1, and 350-2 may record the number of bytes transmitted over each MTAN. In an embodiment, the ACK reduction module 346-1 at the QALC client 320 on the UE 302 may receive estimated ACK information from the TC connection and may reduce the number of QUIC acknowledgment packets to be transmitted over MTANs 114.

Figure 3C:
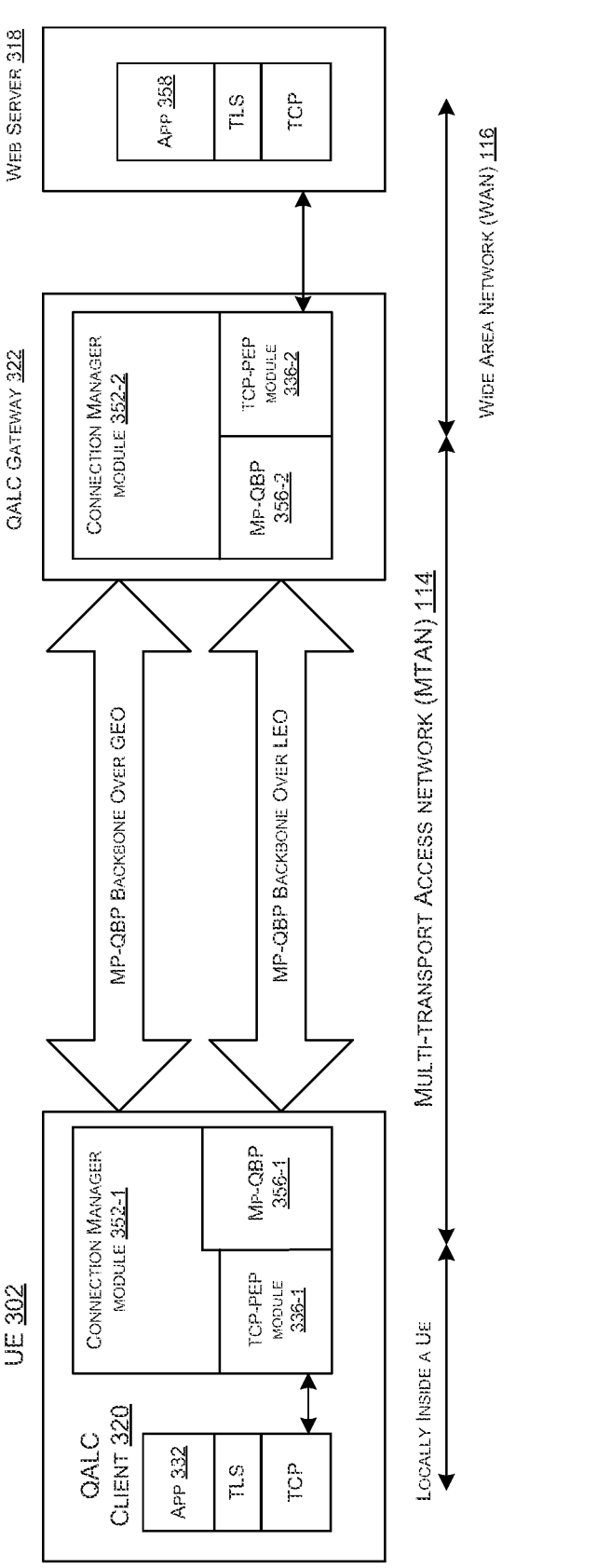
FIG. 3C illustrates an example block diagram representation of a protocol stack with a transmission control protocol (TCP) performance-enhancing proxy (PEP) module in an over-the-top (OTT) implementation architecture, according to an example.

FIG. 3C illustrates an example block diagram representation of a protocol stack with a transmission control protocol (TCP) performance-enhancing proxy (PEP) module 336 in an over-the-top (OTT) implementation architecture 300, according to an example. FIG. 3C illustrates the protocol stack in the UE 302, the QALC gateway 322, and the web server 318 for applications using TCP. The TCP-based applications may employ transport layer security (TLS) for encryption, authentication, and data integrity of application layer messages before handing over them to the TCP transport layer.

For example, if a software stack on the UE 302 may be modified to directly use MP-QBP protocol 356 using API, TLS-encrypted application layer messages may be transferred to MP-QBP 356 bypassing the TCP layer. If the software stack on the UE 302 may not be modified, the TCP connection initiated by the application 332 to the web server 318 in the internet 316 may be intercepted and terminated locally on the UE 302 by the TCP-PEP module 336-1 of the QALC client 320. The TCP connection may now be established between the TCP protocol of the application 332 and the TCP-PEP module 336-1 of the QALC client 320, instead of, the TCP connection between the TCP of the application 332 and the TCP of the web server 318 in the internet 316 Because, the TCP connection is locally set up at the UE 302, a TCP handshake may instantaneously be completed.

In an embodiment, the connection manager module 352-1 in the QALC client 320 at the UE 302 may notify the connection manager module 352-2 in the QALC gateway 322. The notification may be regarding the original TCP connection which the application 332 at the UE 302 may need to establish with the web server 318. The TCP PEP module 336-2 at the QALC gateway 322 may be informed by the connection manager module 352-2 regarding the TCP original connection. The connection manager module 352-2 may initiate a TCP handshake with the web server 318. Responding to the TCP handshake from the connection initiator by the TCP PEP module 336-1 locally and initiation of the TCP handshake by the TCP PEP module 336-2 at the other side of the access network to the web server 318 on behalf of the original connection initiator may be referred to as "handshake spoofing". Handshake spoofing accelerates data transmission at the beginning of a TCP connection.

The original TCP connection between the application 332 at the UE 302 and the application 358 at the web server 318 may now be replaced by the local TCP connection between the TCP of the application and the TCP PEP module 336-1 of the QALC client 320 at the UE 302, the MP-QBP backbones between the QALC client 320 at the UE 302 and the QALC gateway 322, and the TCP connection between the TCP PEP module 336-2 at the QALC gateway 322 and TCP of the web server 318. The TCP acknowledgments to the TCP of the application 332 were sent by the TCP PEP module 336-1 of the QALC client 320 at the UE 302 locally immediately. The TCP acknowledgments to the TCP of the web server 318 were sent by the TCP PEP module 336-2 at the QALC gateway 322. Similarly, the TCP acknowledgments from the TCP of the application 332 at the UE 302 are received by the TCP PEP module 336-1 of the QALC client 320 at the UE 302 locally immediately. The TCP acknowledgments from the TCP of the web server 318 are received by the TCP PEP module 336-2 at the QALC gateway 322. Consequently, the TCP acknowledgments may never be sent over the access networks. Usually, the TCP acknowledgments are sent from the receiver to the sender every two TCP packets. This may create congestion in the access network, especially in the return direction from the UE 302 to the 5G core network where the radio resource is constrained.

Further, unmodified end-to-end TCP with default configuration does not perform well over high round-trip-time (RTT) access networks due to a plurality of parameters. The parameters may include an insufficient initial congestion window, a slow ramp-up delay in TCP slow start, an insufficient maximum congestion window size, send buffer size and receive buffer size, an unfavorable packet loss recovery and congestion control response in case of packet loss, and a plurality of acknowledgments from the receiver to the sender. Splitting the TCP connection over the access network into two local TCP connections and one MP-QBP backbone over the access network provides significantly lower RTT and improves TCP performance dramatically over high RTT access networks. The RTT between the TCP of the application 332 and the TCP PEP module 336-1 of the QALC client 320 at the UE 302 may be minimal due to which both entities are located locally inside the same device. The RTT between the TCP PEP module 336-2 at the QALC gateway 322 and the TCP at the web server 318 may also usually be small due to a better backhaul connection to the internet 316. The RTT over the radio access network may be significantly longer and this high RTT is not experienced by the TCP of the application 358 of the web server 318 due to the use of TCP PEP module 336-1 and 336-2.

At the sender side, the TCP PEP module 336-1 of the QALC client 320 at the UE 302 and the TCP PEP module 336-2 at the QALC gateway 322 may receive the TCP packets from the sending TCP of the application 332 at the UE 302 and the sending TCP of the web server 318 respectively. Further, the TCP PEP module 336-1 of the QALC client 320 at the UE 302 and the TCP PEP module 336-2 at the QALC gateway 322 may forward the TCP packet payloads with 5-tuple information to traffic characterization modules 342-1 and 342-2 (shown in FIG. 3A) for latency and QoS classification, and to connection manager modules 352-1 and 352-2 for bookkeeping of connection information. The TCP payloads are transferred between the TCP PEP module 336-1 of the QALC client 320 at the UE 302 and the TCP PEP module 336-2 of at the QALC gateway 322 via connection manager module 352-1 and 352-2, and the MP-QBP and backbones.

At the receiving side, the TCP PEP module 336-2 at the QALC gateway 322 and the TCP PEP module 336-1 at the QALC client 320 of the UE 302 may receive the TCP payload with 5-tuples information from connection manager module 352-1 and the 352-2, which receives from the MP-QBP 356-1, and 356-2. The TCP PEP module 336-1 and 336-2 may assemble the 5-tuples information into TCP packets and forward the TCP packets in the corresponding TCP connection to the receiving TCP at the web server 318 and to the receiving TCP of the application 332 at the UE 302, respectively. For example, the 5-tuples information may include a source IP address, a source TCP/UDP port number, a destination IP address, a destination TCP/UDP port number, a protocol type such as TCP or UDP.

Figure 3D:
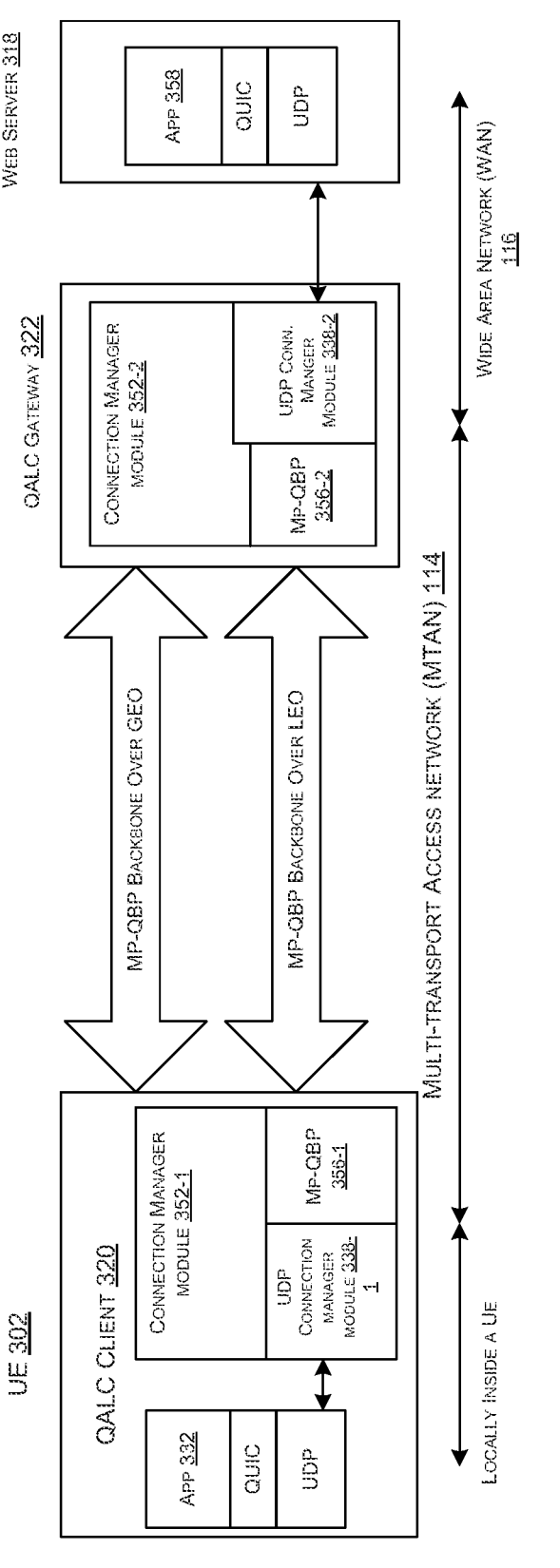
FIG. 3D illustrates an example block diagram representation of a protocol stack with a user datagram protocol (UDP) connection manager module in an over-the-top (OTT) implementation architecture, according to an example.

FIG. 3D illustrates an example block diagram representation of a protocol stack with a user datagram protocol (UDP) connection manager module 338 in an over-the-top (OTT) implementation architecture 300, according to an example. The protocol stack may be associated with the UE 302, the QALC gateway 322, and the web server 318 for applications using UDP. The quick user datagram protocol (UDP) internet connections (QUIC) may be slated to be a replacement for TCP for the web. The QUIC encrypts a majority of packet headers in addition to the encrypted packet payload. The QUIC runs over UDP, however, offers TCP features and is designed to perform better than TCP by improving the shortcomings of the TCP. The QUIC provides end-to-end reliable delivery of packets between two endpoints. Because, the QUIC encrypts its packet headers and runs over UDP, existing TCP PEPs no longer work with QUIC.

At the sender side, the UDP connection manager 338-1 and 338-2 of the QALC client 320 at the UE 302 and the QALC gateway 322 may receive UDP packets from the sending UDP of the application 332 at the UE 302 and the sending UDP at the web server 318, respectively. The UDP connection manager 338-1 may forward UDP packet payloads with 5-tuple information to the traffic characterization module 342-1 and 342-2 (shown in FIG. 3A) for latency and QoS classification and QUIC acknowledgment reduction, and the connection manager modules 352-1, and 352-2 for bookkeeping of connection information. The UDP payloads are transferred between the UDP connection manager module 338-1 of the QALC client 320 at the UE 302 and the UDP connection manager module 338-2 of the QALC gateway 322 via the connection manager module 352-1, and 352-2 and the MP-QBP 356-1, 356-2, and backbones.

At the receiving side, the UDP connection manager module 338-2 at the QALC gateway 322 and the UDP connection manager module 338-1 at the QALC client 320 at the UE 302 may receive the UDP payload with 5-tuples information from connection manager module 352-1, and 352-2, which receives from the MP-QBP 356-1 and 356-2. The UDP connection manager module 338-1 and 338-2 may assemble the UDP payload with 5-tuples information into UDP packets. Further, the UDP connection manager modules 338-1 and 338-2 may forward the UDP packets through the UDP socket to the receiving UDP at the web server 318 and the receiving UDP of the application 332 at the UE 302, respectively.

The original UDP communication between the application 332 at the UE 302 and the web server 318 may now be replaced by the local UDP connection between UDP of the application 332 and the UDP connection manager module 338-1 of the QALC client 320 at the UE 302 the MP-QBP 356-1 and 356-2 backbones between the QALC client 320 at the UE 302 and the QALC gateway 322 and the UDP communication between UDP connection manager module 338-2 at QALC gateway 322 and the UDP of the web server 318.

As shown in FIGS. 3C and 3D, the connection manager modules 352-1 and 352-2 may manage connections between the TCP PEP module 336-1 and 336-2 or the UDP connection manager module 338-1 and 338-2, and the MP-QBP 356-1 and 356-2. The TCP/UDP connection may be uniquely identified by 5-tuples information or a UE Identity (ID) and a Connection Identity ID (Conn ID). The TCP/UDP connection may be uniquely identified between the TCP/UDP of the application 332 and the TCP PEP module 336-1 or the UDP connection manager module 338-1 of the QALC client 320 at the UE 302, with the 5-tuples information from a TCP/UDP packet sent by the TCP/UDP of the application 332. Further, application TCP/UDP's source IP address is identified using a source IP address (Src IP) of an application TCP/UDP, which may usually be a private IP address. Furthermore, application TCP/UDP's destination IP address may be identified using a Destination IP address (Dst IP) of the application TCP/UDP, which may be a web server IP address on the internet 316 which is a public IP address. Additionally, application TCP/UDP's source TCP/UDP port number may be identified using a source TCP/UDP port number (Src Port) of the application TCP/UDP, which is an ephemeral port number that is changed for each new connection. Furthermore, application TCP/UDP's destination TCP/UDP port number may be identified using a destination TCP/UDP port number (Dst IP) of the application TCP/UDP's, which is a web server UDP port number which is a static well-known port number. Further, a protocol type may be identified using a protocol type such as the TCP or UDP.

Additionally, the TCP/UDP connection is uniquely identified between the TCP PEP module 336-2 or the UDP connection manager module 338-2 at the WAN side of the QALC gateway 322 facing the Internet 316, which is WAN 4-tuples information from a TCP/UDP packet sent by the QALC gateway 322. Further, a QALC Gateway's source IP address may be identified using a source IP address (Src IP) of the QALC gateway 322, which is an IP address on the Internet, a public IP address of the QALC gateway 322. Furthermore, a QALC Gateway's destination IP address may be identified using a destination IP address (Dst IP), which is a web server IP address on the Internet, a public IP address of the web server 318. Additionally, a QALC Gateway's source TCP/UDP port number may be identified using a source TCP/UDP port number (Src Port) of the QALC gateway 322, which is an ephemeral port number of QALC gateway 322 that is changed for each new connection. Further, a QALC Gateway's destination TCP/UDP port number may be identified using a destination TCP/UDP port number (Dst IP) for the QALC gateway 322, which is a web server UDP port number which is a static well-known port number. Additionally, a protocol type may be identified using a protocol type such as the TCP or the UDP.

Furthermore, the TCP/UDP connection is uniquely identified using an MP-QBP backbone at QALC client 320 at the UE 302 and at the QALC gateway 322, which is UE ID and connection ID (Conn ID). The connection Identifier (Conn ID) may include a number that uniquely identifies a TCP/UDP connection at the UE 302. The UE Identifier (ID) may include a number that uniquely identifies the UE 302.

Further, the MP-QBP with backbones over different multi-transport access networks (MTANs) 114 is shown in FIGS. 3B, 3C and 3D. The MP-QBP may be used to transport TCP/UDP payload between the UE 302 and the QALC gateway 322 over the MTANs 114. The MP-QBP may be designed to provide one or more features optimized for the MTANs 114. The features may include the capability of transmitting packets over MTANs 114 efficiently according to a QoS class, capable of accommodating a scheduler module 354-1 and 354-2, mitigating deficiencies of regular transport protocol with default configurations, multiplexing transport for efficient use of network resource, multiple priorities for different user's application QoE, in-sequence delivery, usage of dynamic Ack frequency to reduce the number of Ack over access networks.

As shown in FIG. 3B, there may be one MP-QBP backbone for each access network. The MP-QBP backbone and backbone connections in each backbone may be set up in advance between the UE 302 and the QALC gateway 322. There are "N" priority connections in each MP-backbones. Each backbone over an access network is associated with a latency class and each priority connection in a backbone belongs to a QoS class. The classifier module 344-1 and 344-2 may classify the packets to be transmitted over the MP-QBP backbones into different latency and QoS classes. The scheduler module 354-1 and 354-2 may route the packets to a backbone over an access network according to the latency class and transport them over a priority connection in the backbone according to the QoS class. The QoS class may be mapped to a 5G QoS identifier (5Q1) in a 5G network. Furthermore, the MP-QBP may be realized by using a customized version of a multipath QUIC (MP-QUIC) or a multipath TCP (MP-TCP).

The present disclosure provides a local reliable delivery of MP-QBP backbones 356-1 and 356-2 for an access network that runs over 5G and 5G provides reliable delivery at the link layer (radio link control (RLC)). The options for reliable delivery at different layers of the protocol stack may include a reliable delivery at the MP-QBP and reliable delivery at the RLC, a no reliable delivery at MP-QBP and reliable delivery at the RLC, a reliable delivery at the MP-QBP and no reliable delivery at the RLC, an end-to-end reliable delivery at the QUIC, a reliable delivery at MP-QBP and reliable delivery at the RLC, end-to-end reliable delivery at QUIC, no reliable delivery at the MP-QBP and reliable delivery at the RLC, an end-to-end reliable delivery at the QUIC, reliable delivery at the MP-QBP and no reliable delivery at the RLC, and an end-to-end reliable delivery at the QUIC, no reliable delivery at the MP-QBP and no reliable delivery at the RLC. Usually, it may not be beneficial to use reliable delivery both at the MP-QBP and at the RLC at the same time.

In an embodiment, a connection table 400 is maintained by the connection manager module 352-1 in the QALC client 320 at the UE 302 and/or at the traffic routing device, and the connection manager module 352-2 at the QALC gateway 322. An example of the connection table 400 using 4-tuple information and protocol is shown in FIG. 4A. For example, table entries of the connection table 400 may include an index 402, a UE ID 404, a connection ID (conn ID) 406, a 4-tuple information 408 at the UE 302, a WAN 4-tuple information 410, a protocol 412, an active packet transaction 414, and a state 416. The index 402 may be an index to connection information, and the UE ID 404 may be the UE identifier unique to each UE 302. Further, the Conn ID 406 may be an identifier to a connection that may be unique globally or for a given UE ID, and the 4-tuple information 408 at UE 302 may be an application for the TCP/UDP 4-tuple information at the UE 302. Furthermore, the WAN 4-tuple information 410 may be TCP/UDP 4-tuples information at a WAN interface associated with the WAN 116 of the QALC gateway 322. Additionally, the protocol 412 may be the TCP or the UDP. Furthermore, the active packet transaction 414 may be within a pre-defined interval or idle, and the state 416 may be for example handshake (HS), data transfer (DATA), and the like, and a plurality of connection information.

Figure 4B:
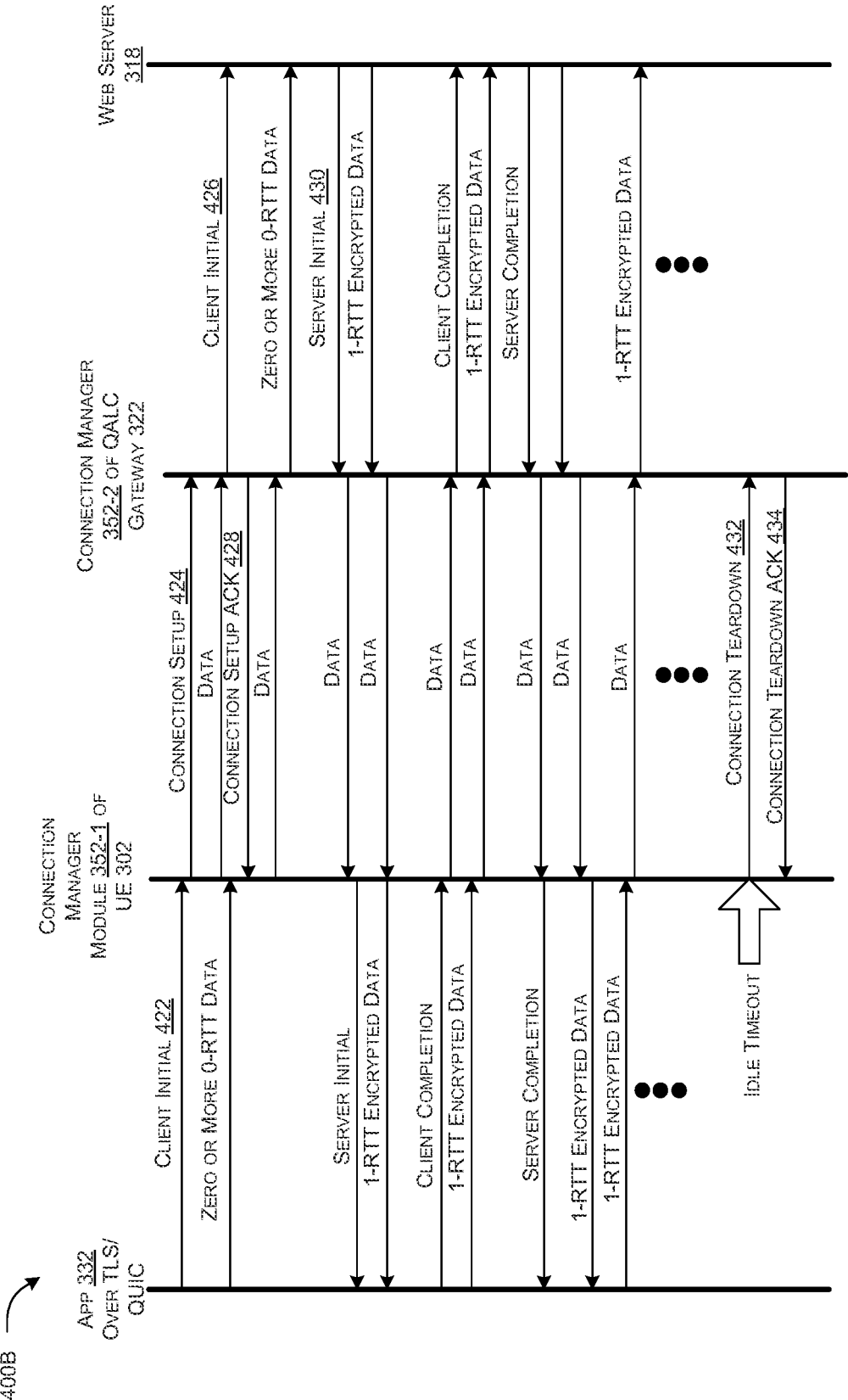
FIG. 4B illustrates an example timing diagram depicting a process of connection establishment, teardown, and data packet flows over MP-QBP backbones between a connection manager module at a UE and a connection manager at a traffic routing device in an over-the-top (OTT) implementation architecture, according to an example.

In addition, an exemplary connection establishment, a teardown, and data packet flow for APP/TLS/TCP and APP/QUIC/UDP connections over the MP-QBP backbones between the UE 302 and the QALC gateway 322 may be shown in FIG. 4B. FIG. 4B illustrates an example timing diagram 400B depicting a process of connection establishment, teardown, and data packet flows over MP-QBP backbones between a connection manager module 352-1 at a UE 302 and a connection manager module 352-2 at a traffic routing device in an over-the-top (OTT) implementation architecture, according to an example.

At step 422, when the connection manager module 352-1 at the UE 302 may receive "client initial" packets from the APP/TLS/TCP or the APP/QUIC/UDP, because client initial packets may be the first packet of the TLS/QUIC connection, there is no entry in the connection table 400. At step 424, the connection manager module 352-1 at the UE 302 may add the connection information in the connection table 400, and sends a "connection setup" message with connection information to the QALC gateway 322. After step 424, then at step 426, the UE 302 also transmits "client initial" packets as "data" packets to the QALC gateway 322. At step 428, the connection manager module 352-2 at the QALC gateway 322 may add the connection information in the connection table 400, when it receives "connection setup" and replies with "connection setup ACK" to the UE 302. Further, at step 430, the TCP PEP module 336-2 or the UDP connection manager module 338-2 at the QALC gateway 322 opens a TCP UDP socket to the web server 318. Further, the TCP PEP module 336-2 or the UDP connection manager module 338-2 at the QALC gateway 322 may add the WAN 4-tuples information 410 and the protocol 412 in the connection table 400. Further, the TCP PEP module 336-2 or the UDP connection manager module 338-2 at the QALC gateway 322 may send "client initial" packets to the web server 318. The UE 302 and the QALC gateway 322 transfer "data" packets over the MP-QBP backbones with TCP/UDP payload from packets received from the APP/TLS/TCP and the APP/QUIC/UDP at UE 302 and from the web server 318.

The TCP PEP module 336-1 or 336-2 may notify the termination of the TCP connection to the connection manager module 352-1 or 352-2 regarding the termination of the TCP connection between the TCP of the application 332 at the UE 302 and the TCP at the web server 318. Because the QUIC is an encrypted transport protocol with an encrypted transport header, it does not expose the end of a connection. The one indication to on-path devices that a QUIC flow has ended is that packets from that QUIC flow (4-tuple information 408) are no longer observed. Hence, an "idle timeout" timer may be used to detect the end of a QUIC connection. For example, the "idle timeout" may be set to "X" minutes. After a continuous idle period of "X" minutes without any packets from both directions, the connection manager module 352-1 at the UE 302 may declare that the connection has terminated. At step 432, the connection manager module 352-1 may send a "connection teardown" message to the connection manager module 352-2 at the QALC gateway 322. At step 434, the connection manager module 352-2 at the QALC gateway 322 may reply with a "connection teardown ACK" to the UE 302. Both the connection manager modules 352-1 at the UE 302 and the connection manager modules 352-2 at the QALC gateway 322 may clear the state information of the connection and remove the entry in the connection table 400.

Figure 5A:
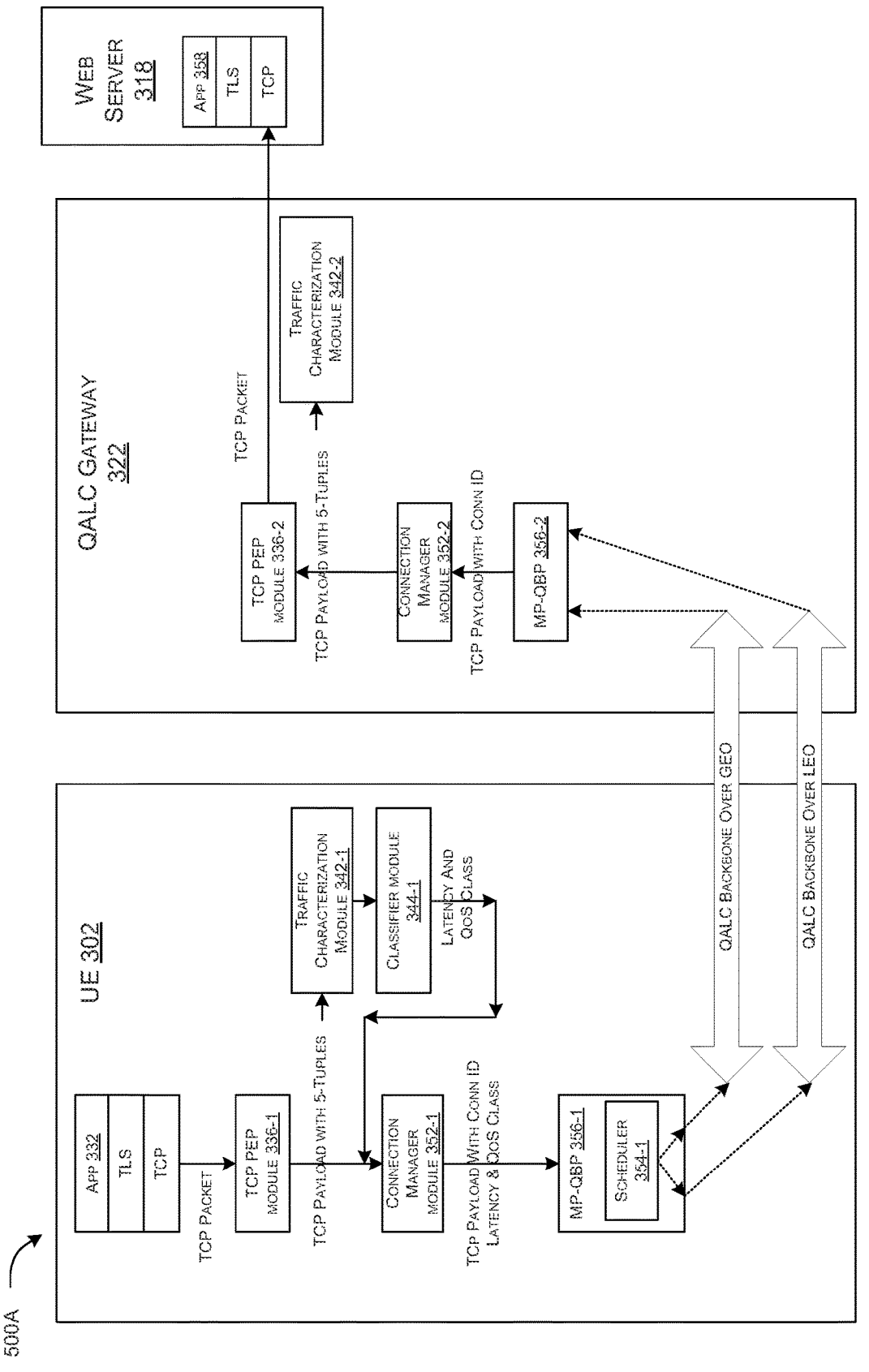
FIG. 5A illustrates an example schematic diagram representation of a TCP packet flow in a return direction from a UE to a web server in an over-the-top (OTT) implementation architecture, according to an example.
Figure 5B:
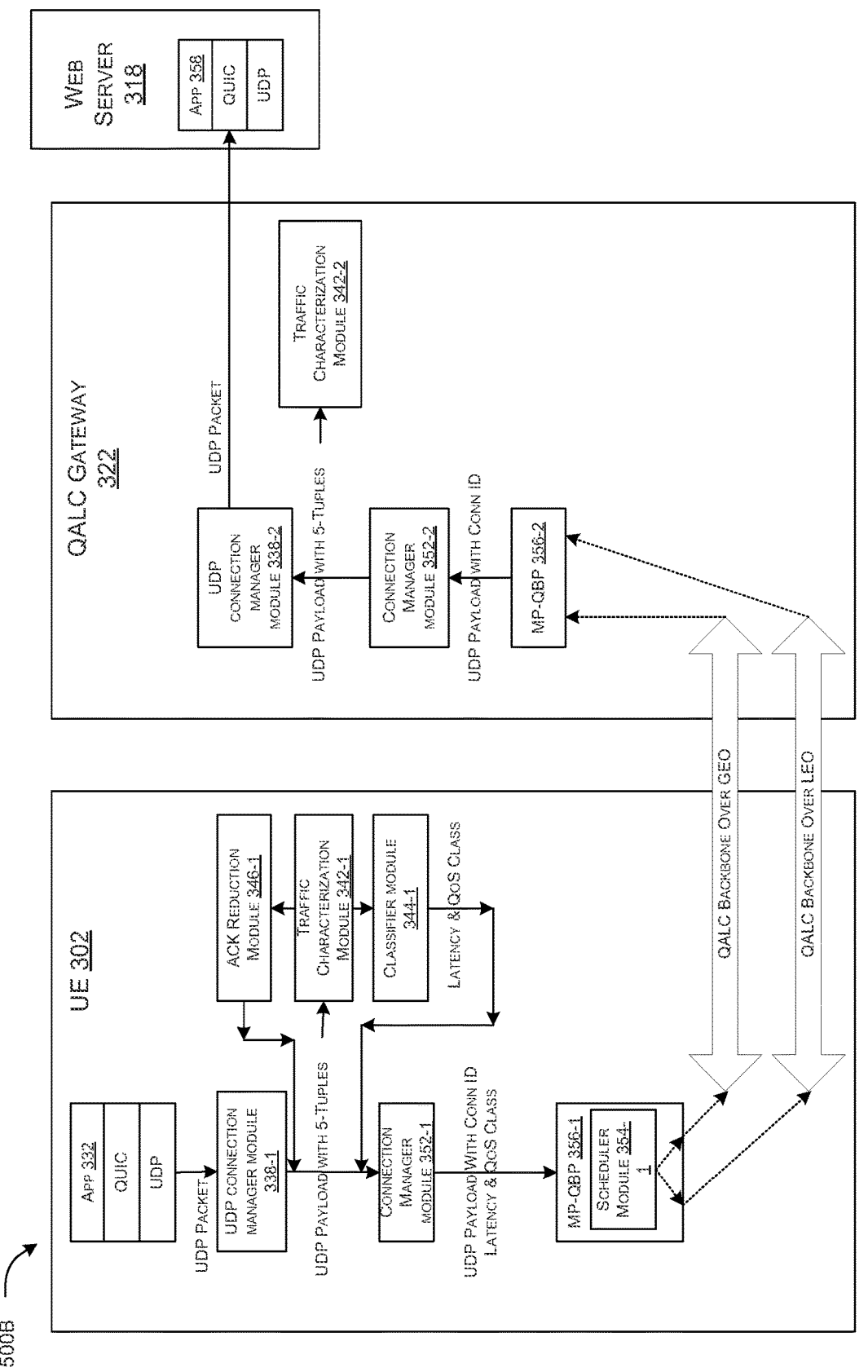
FIG. 5B illustrates an example schematic diagram representation of a UDP packet flow in a return direction from a UE to a web server in an over-the-top (OTT) implementation architecture, according to an example.

FIG. 5A illustrates an example schematic diagram representation of a TCP packet flow 500A in a return direction from the UE 302 to the web server 318 in an over-the-top (OTT) implementation architecture 300, according to an example. FIG. 5B illustrates an example schematic diagram representation of a UDP packet flow 500B in a return direction from the UE 302 to the web server 318 in an over-the-top (OTT) implementation architecture 300, according to an example.

The TCP packet flow 500A between the UE 302 and the web server 318 may provide an example of how the connection manager module 352-1 and 352-2 looks up connection information, converts and reconstructs header fields at the UE 302 and different interfaces of the QALC gateway 322. The TCP packet flow 500A in the return direction from the UE 302 to the web server 318 is shown in FIG. 5A, and the UDP packet flow 500B in the return direction from the UE 302 to the web server 318 is shown in FIG. 5B.

In an embodiment, the TCP PEP module 336-1 or the UDP connection manager module 338-1 of the QALC client 320 at the UE 302 may receive the TCP/UDP packets from the sending TCP/UDP of the application 332 at the UE 302. The TCP PEP module 336-1 or the UDP connection manager module 338-1 of the QALC client 320 at the UE 302 may forward the TCP/UDP packet payloads with 5-tuple information to the connection manager module 352-1 and traffic characterization module 342-1 for latency and QoS classification, and QUIC Ack reduction for QUIC/UDP.

In an embodiment, the connection manager module 352-1 may receive the TCP/UDP payload with 5-types from sending TCP PEP module 336-1 or the UDP connection manager module 338-1 of the QALC client 320 at the UE 302 latency and QoS class from the classifier for the TCP/UDP payload at the UE 302.

In an embodiment, the connection manager module 352-1 may receive ACK reduction information from ACK reduction module 346-1 for QUIC UDP ACKs. The connection manager module 352-1 may look up the conn ID 406 and the UE ID 404. A hash table may be maintained with a key equal to a UE 4-tuple 408 at UE 302 and the protocol 412, and a value equal to the index 402, which points to a row in the connection table 400. The index may be the output of a hash function (4-tuple 408 of the UE 302 and the protocol 412). A new entry is added to the connection table 400 when a new connection arrives. Using the connection table 400, the UE ID 404 and the conn ID 406 may be obtained from Index derived from 4-tuples 408 at the UE 302 and the protocol 412. Further, the connection manager module 352-1 may forward the TCP/UDP payloads with conn ID 406, latency, and QoS class to the MP-QBP 356-1 at the UE 302. The MP-QBP 356-1 at the UE 302 may forward TCP/UDP payloads with the conn ID 406, latency, and QoS class to the scheduler module 354-1. The scheduler module 354-1 at the UE 302 may route the packets to the MP-QBP 356-1 backbones in different access networks. Further, the MP-QBP 356-1 at the UE 302 may construct the MP-QBP packets from TCP/UDP payload with headers, which include the UE ID 404 and the conn ID 406, multiplexes the packets and transmits them over the selected MP-QBP backbone, QALC backbone over GEO or QALC backbone over LEO.

In an embodiment, the MP-QBP 356-2 at the QALC gateway 322 may receive the MP-QBP packets from the MP-QBP backbones. Further, the MP-QBP 356-2 at the QALC gateway 322 may forward the TCP/UDP payloads with the conn ID 406 and the UE ID 404 to the connection manager at the QALC gateway 322. Furthermore, the connection manager module 352-2 at the QALC gateway 322 may look up the WAN 4-tuples information 410 and the protocol 412 in the connection table 400 using the UE ID 404 and the conn ID 406. Further, the connection manager module 352-2 at the QALC gateway 322 may forward the TCP/UDP payloads with the WAN 4-tuples information 410 and the protocol 412 to the traffic characterization module 342-2 for analysis. Furthermore, the connection manager module 352-2 at the QALC gateway 322 may forward the TCP/UDP payloads with the WAN 4-tuples information 410 to the TCP PEP module 336-2 and the UDP connection manager module 338-2 according to a protocol type. Additionally, the TCP PEP module 336-2 and the UDP connection manager module 338-2 at the QALC gateway 322 route the TCP/UDP payloads to a corresponding TCP/UDP connection based on the WAN 4-tuples information 410 and the TCP/UDP packets are transmitted to the web server 318 from the WAN interface associated with the QALC gateway 322.

Figure 5C:
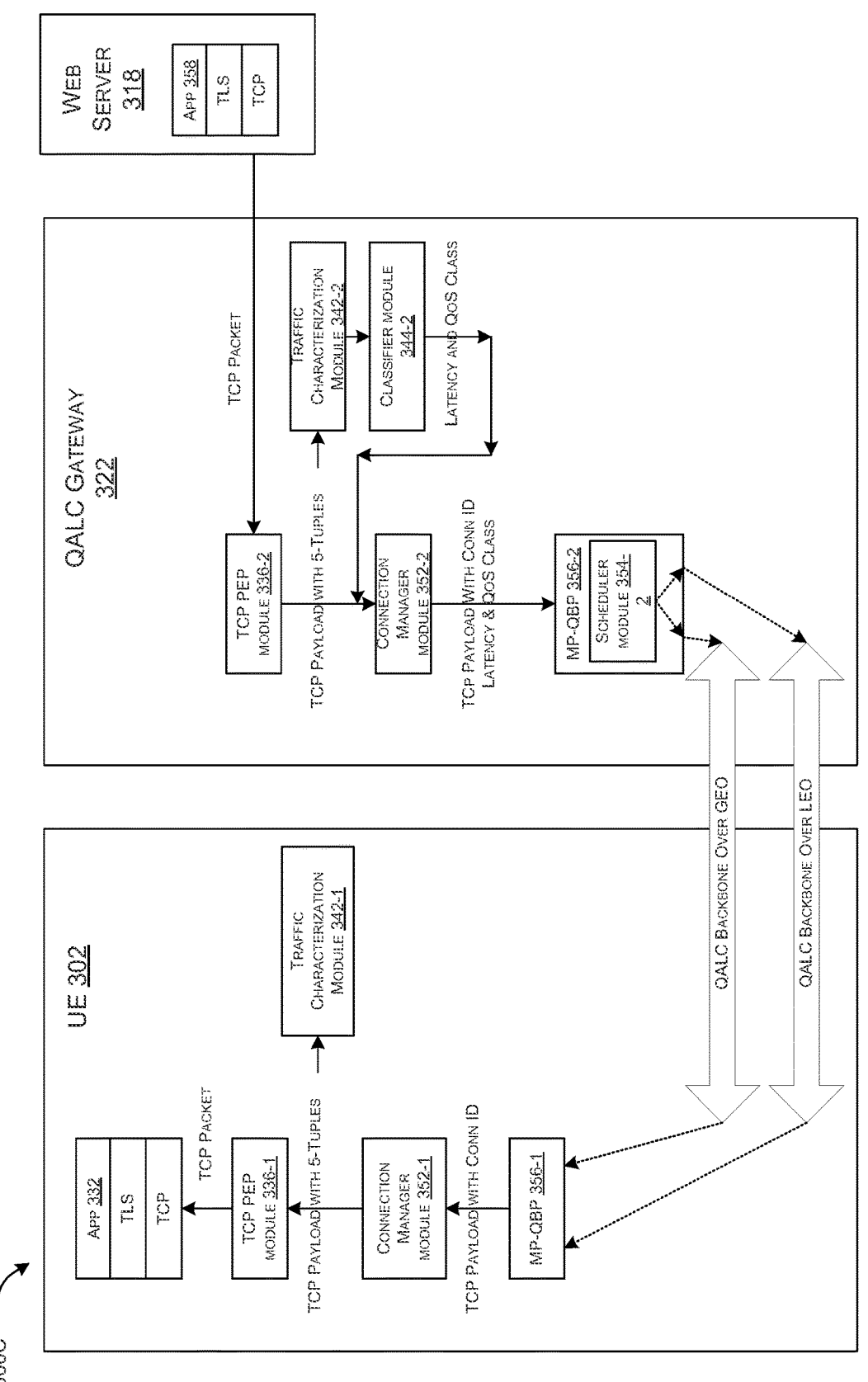
FIG. 5C illustrates an example schematic diagram representation of a TCP packet flow in a forward direction from a web server to a UE, in an over-the-top (OTT) implementation architecture, according to an example.
Figure 5D:
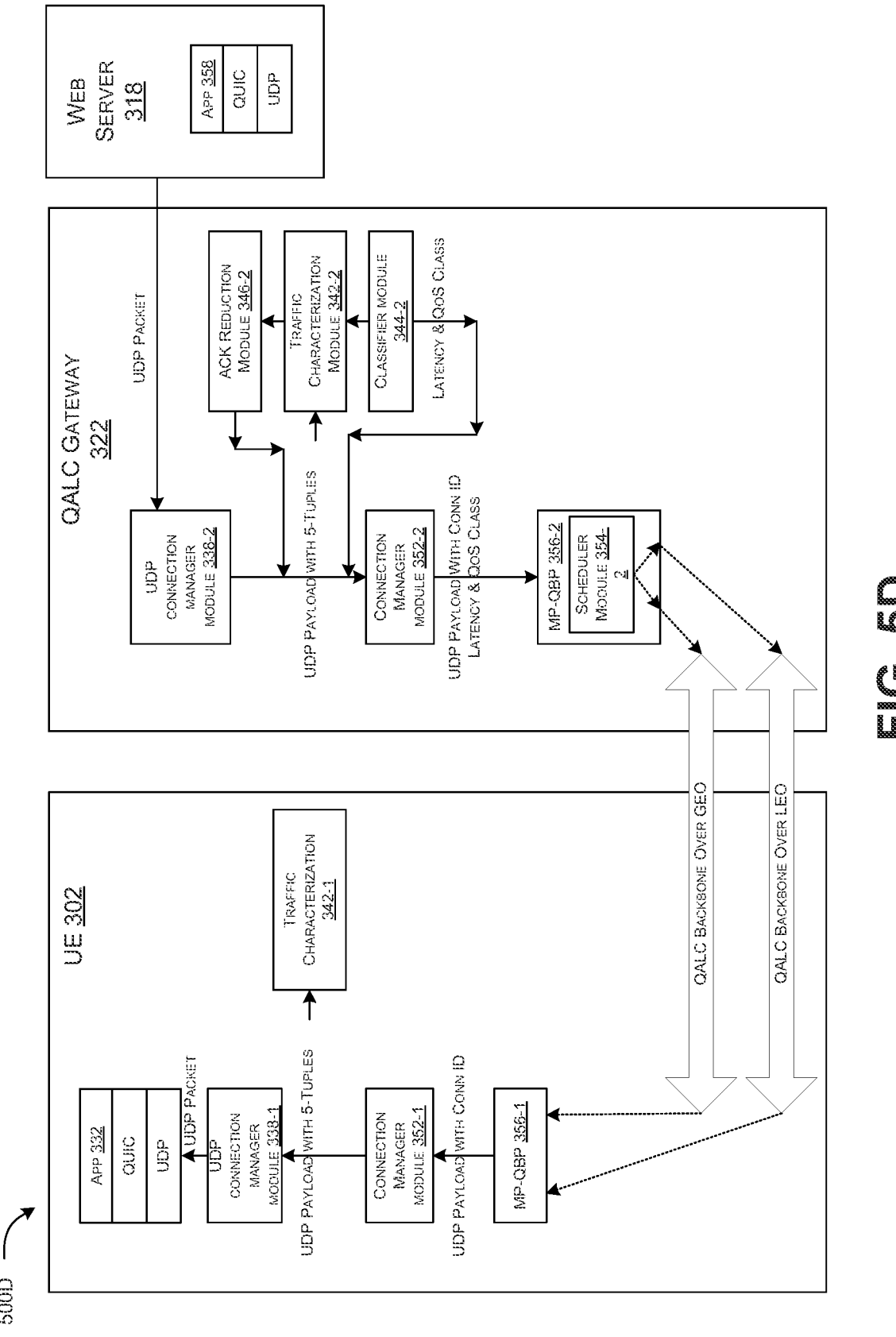
FIG. 5D illustrates an example schematic diagram representation of a UDP packet flow in a forward direction from a web server to a UE in an over-the-top (OTT) implementation architecture, according to an example.

FIG. 5C illustrates an example schematic diagram representation of a TCP packet flow 5000 in a forward direction from a web server 318 to the UE 302, in an over-the-top (OTT) implementation architecture 300, according to an example. FIG. 5D illustrates an example schematic diagram representation of a UDP packet flow 500D in a forward direction from a web server 318 to the UE 302 in an over-the-top (OTT) implementation architecture 300, according to an example.

In an embodiment, the TCP PEP module 336-2 and the UDP connection manager module 338-2 at the QALC gateway 322 may receive the TCP/UDP packets from the sending TCP/UDP at the web server 318. Further, the TCP PEP module 336-2 and the UDP connection manager module 338-2 at the QALC gateway 322 may forward the TCP/UDP packet payloads with 5-tuple information to the connection manager module 352-2 and the traffic characterization module 342-2 for latency and QoS classification, and QUIC Ack reduction for the QUIC/UDP. Furthermore, the connection manager module 352-2 may receive the TCP/UDP payload with 5-tuples from sending TCP PEP module 336-2 and the UDP connection manager module 338-2 at the QALC gateway 322 and latency and QoS class from the classifier module 344-2 for the TCP/UDP payload at the QALC gateway 322. The connection manager module 352-2 may receive ACK reduction information from the ACK reduction module 346-2 for QUIC UDP ACKs. The connection manager module 352-2 may look up the conn ID 406 and the UE ID 404 in the connection table 400. A hash table may be maintained with a key equal to the WAN 4-tuple 410 and protocol 412 and a value equal to the index 402, which points to a row in the connection table 400.

The index may be the output of the hash function (WAN 4-tuple 410 and the protocol 412). A new entry may be added to the connection table 400, when a new connection arrives. Using the connection table 400, the UE ID 404 and the conn ID 406 may be obtained from the index 402 derived from WAN 4-tuples information 410, and the protocol 412. Further, the connection manager module 352-2 may forward the TCP/UDP payload with the conn ID 406, latency, and QoS class to the MP-QBP 536-2 at the QALC gateway 322. Furthermore, the MP-QBP 536-2 at the QALC gateway 322 may forward the MP-QBP packets with the conn ID 406, latency, and QoS class to the scheduler module 354-2. The scheduler module 354-2 at the QALC gateway 322 may route the packets to the MP-QBP backbones in different access networks. The MP-QBP 356-2 at the QALC gateway 322 may construct the MP-QBP packets from the TCP/UDP payload with headers, which include the UE ID 404 and the conn ID 406. Further, the MP-QBP 356-2 at the QALC gateway 322 may multiplex the packets and transmits the multiplexed packets over the selected MP-QBP backbone.

In an embodiment, the MP-QBP 356-1 at the UE 302 may receive the MP-QBP packets with the conn ID 406 and the UE ID 404 from the MP-QBP backbones. MP-QBP 356-1 at the UE 302 may forward the TCP/UDP payloads with the conn ID 406 and the UE ID 404 to the connection manager module 352-1 at the UE 302. Furthermore, the connection manager module 352-1 at the UE 302 may look up 4-tuples information 408 of the UE 302 and protocol in the connection table 400 using the UE ID 404 and the conn ID 406. The connection manager module 352-1 at the UE 302 may forward the TCP/UDP payloads with the 4-tuples information 408 and the protocol 412 to the traffic characterization module 342-1 for analysis. Furthermore, the connection manager module 352-1 at the UE 302 may forward the TCP/UDP payloads with 4-tuples information 408 to the TCP PEP module 336-1 and the UDP connection manager module 338-1 at the UE 302 according to a type of protocol. The TCP PEP module 336-1 and the UDP connection manager module 338-1 at the UE 302 may route the TCP/UDP payloads to a corresponding TCP/UDP connection based on the 4-tuples 408 at UE 302 and TCP/UDP packets are sent to the TCP/UDP of the application 332 at the UE 302.

Figure 6A:
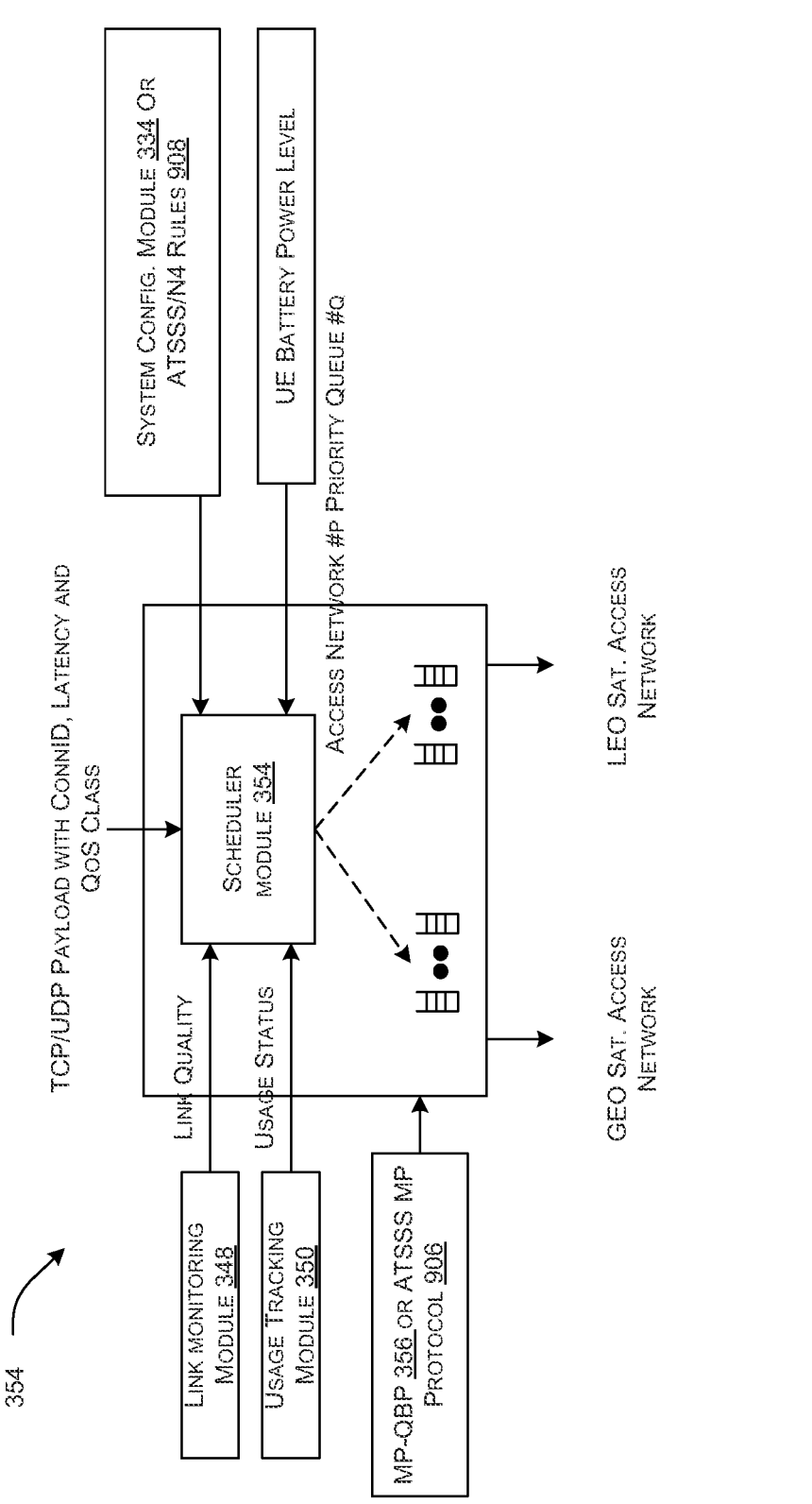
FIG. 6A illustrates an example block diagram representation of a scheduler module, according to an example.

FIG. 6A illustrates an example block diagram representation of a scheduler module, according to an example. The usage tracking modules 350-1 and 350-2 may/may not bookkeep the number of bytes transmitted per latency class per QoS class per direction (forward and return link) on each MTAN 114, usage tracking module 350-1 and 350-2 may also be configured with data allowance per period and maintains data allowance balance. Further, the usage tracking modules 350-1 and 350-2 may compute estimated per byte monetary cost (PBC). Furthermore, the usage tracking module 350-1 and 350-2 may provide usage status to the scheduler module 354 to consider the usage, allowance balance, and estimated PBC as shown in FIG. 6A. Further, the system configuration module 334 may maintain default rules, except rules, override rules, and other system configurations, which may complement or override the measurement information in the scheduler module 354. Furthermore, the system configuration module 334-1 and 334-2 may provide system configuration information to the scheduler module 354.

Figure 6B:
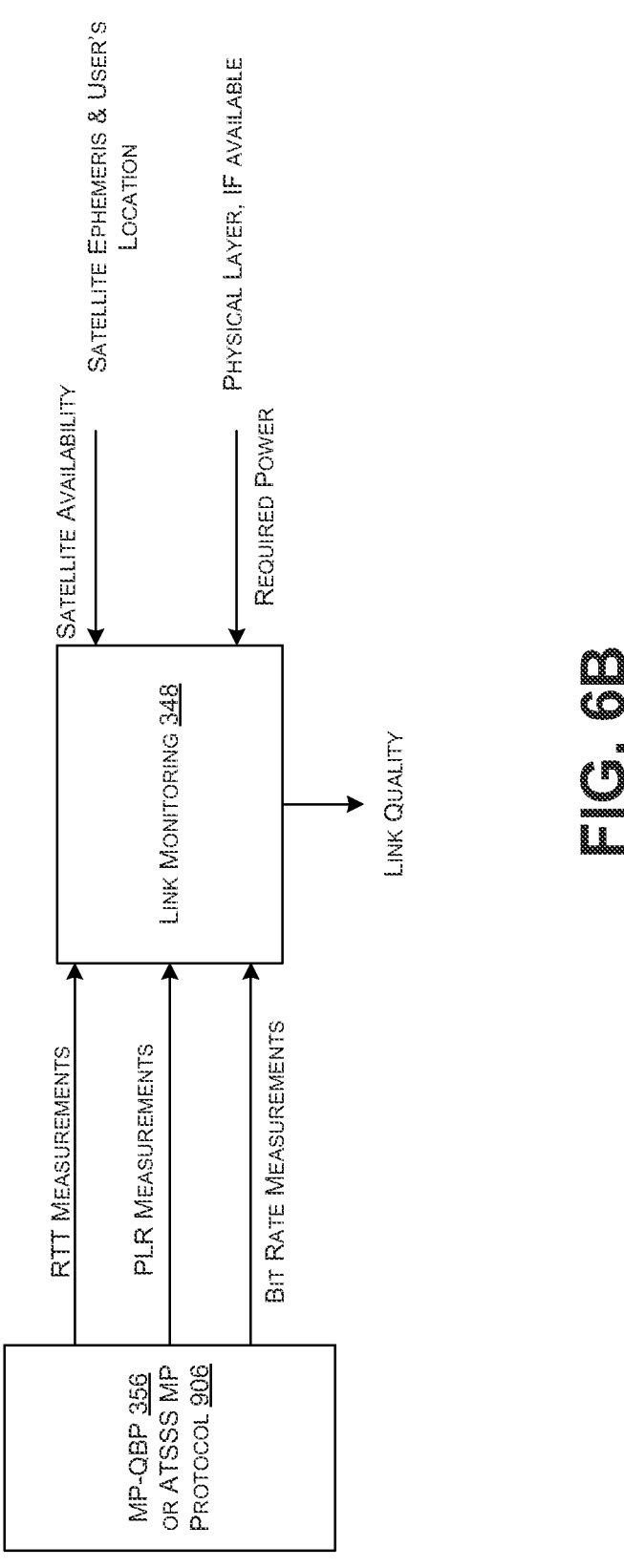
FIG. 6B illustrates an example block diagram representation of a link monitoring module, according to an example.

FIG. 6B illustrates an example block diagram representation of a link monitoring module 348, according to an example. The link monitoring module 348 may receive inputs from the MP-QBP 356, satellite and user's location information, and the physical layer and link quality output. The link monitoring module 348 may provide system configuration information to the scheduler module 354, as shown in FIG. 6A

In another example, the present disclosure may not use active measurement, which sends additional measurement probe packets in addition to the user's data. Active measurement consumes extra data usage in each access network. Further, the MP-QBP 356 provides reliable in-order delivery of data between two end points similar to transport protocols such as TCP and QUIC. Acknowledgements are sent by a receiver to a sender to acknowledge the receipt of packets positively or negatively in a reliable delivery protocol. As MP-QBP transports users' data and keep-alive messages, it computes protocol parameters and statistics continuously. Link quality metrics are derived explicitly or implicitly from transport protocol parameters and statistics. The MP-QBP 356 may be implemented to provide API (application interface) to allow the link monitoring module to read real-time value of transport protocol parameters and statistics.

For example, consider that the MP-QBP 356 uses transmission control protocol—bottleneck bandwidth and round-trip propagation time (BBR) congestion control algorithm. The RTT may be calculated continuously for each connection if data is exchanged on those connections. The BBR calculates RTT for packets exchanged on a per-connection basis and computes the exponential moving average of these measurements, referred to as SRTT (Smoothed RTT). The BBR congestion control algorithm explicitly measures RTT during Probe RTT period. Similarly, ABR may be continuously measured by BBR during Probe bandwidth (BW) period. The PLR may also be computed based on the acknowledgements from the receiver at the sender.

Further, the samples from the measurement are processed statistically to generate a statistically meaningful estimate of the RTT, ABR, and the PLR. Exponentially weighted moving average (EWMA) may be an example of well-known estimates of measurement samples as shown in equation 1 below.

$$EWMAVALUE(n)=alpha*VALUE(n)+(1-alpha)*EWMAVALUE(n-1) \quad \text{Equation 1}$$

In the above equation 1, the variable 'alpha' may be used to control how much emphasis is given to current value with respect to history.

Further, the link availability may be measured by the sender based on the acknowledgements from the receiver in MP-QBP 356. The computed link availability can also be estimated even when there is no established MP-QBP backbones or when there is no reliable measurement due to few or no data transmission on the MP-QBP backbones. For a GEO/MEO/LEO satellite system, the satellite link may not be available to the UE 302 at a certain location on the earth when the complete constellation of satellites is not in orbit for service. For example, some of the satellites have not been launched or some of the orbital locations with non-operating satellites have not been replenished yet. The computed link availability for the UE 302 may be estimated based on satellite ephemeris of a satellite constellation and a GEO location data of the UE 302. The estimate is just an approximate link availability if any satellite is visible to a UE or not. This computed link availability estimate just indicates that there is a non-zero probability of link availability, however, the link cannot be available at all due to low elevation angle and/or shadowing. The link availability may be affected not only by a mobile UE; however, it may also be affected by constantly moving LEO/MEO satellites.

In addition, there may be UE power requirements from physical layer. When the UE 302 is battery-powered, power consumption is a critical factor for consideration when there is more than one access network available. It is especially important when access networks are offered through satellites like GEO and when a battery-powered UE is at a low battery level.

Further, the MP-QBP module 356 may provide the RTT, the PLR, the ABR and measured link availability, link quality metrics per QoS per access network to the link monitoring module 348. The link monitoring module 348 may output an estimated RTT, an estimated PLR, an estimated ABR, and a measured link availability. The link quality metrics are continuously measured between the MP-QBP 356-1 at the QALC client 320 at the UE 302 and the MP-QBP 356-2 at the QALC gateway 322 in each access network. The measurement may be performed by a passive measurement from the transmission of user's data, and a passive measurement from keep-alive messages. Keep-alive messages are exchanged to keep the MP-QBP backbone alive in each access network, when there is no user's data to be transferred.

Figure 6C:
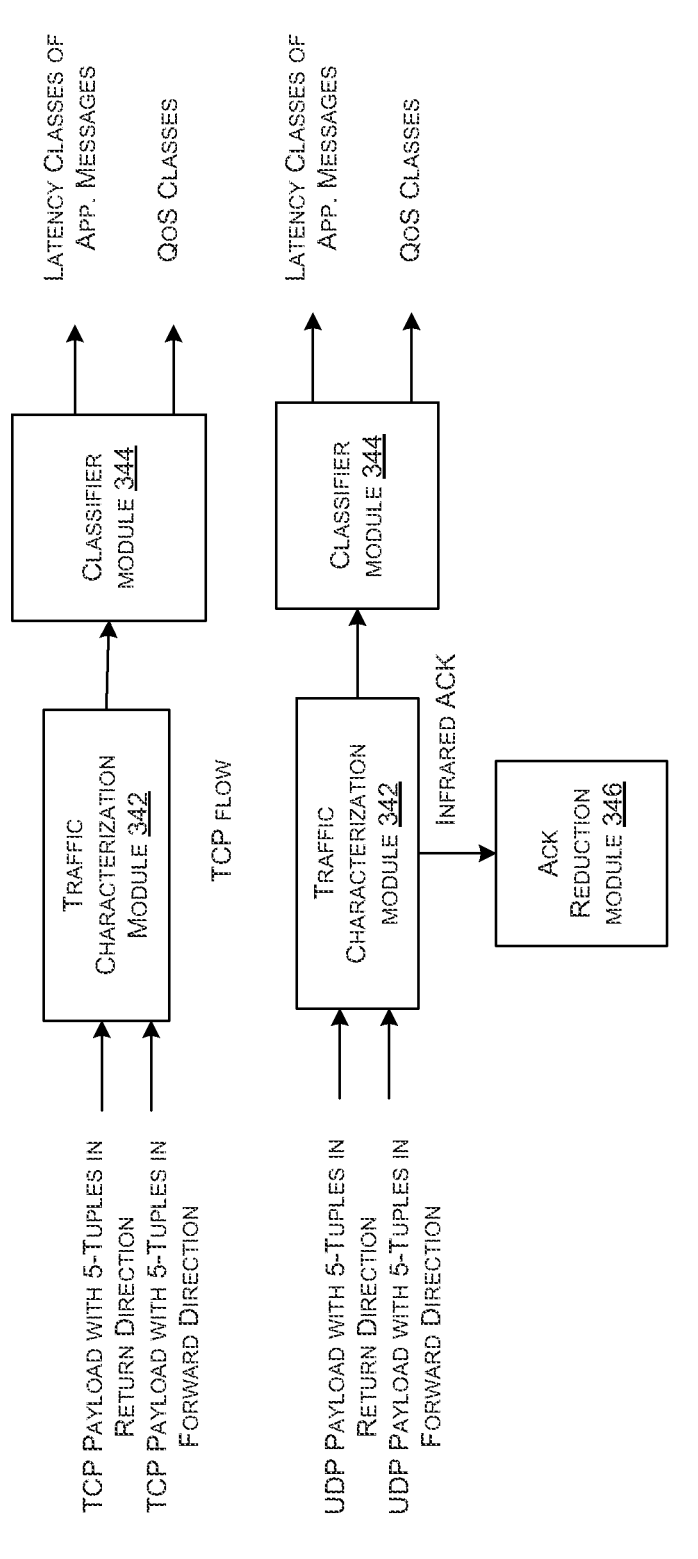
FIG. 6C illustrates an example block diagram representation of a classifier module with a traffic characterization module for a TCP flow and a UDP flow with encrypted transport protocol, according to an example.

In an embodiment, the ack reduction module 346 for QUIC may use the passive monitoring of user's data and analysis. Further, the traffic characterization module 342 may infer acknowledge packets and notify the arrival to the ack reduction module 346 as shown in FIG. 6C. The return link from the UE 302 to the QALC gateway 322 may be constrained and a high frequency of acknowledgment packets may have adverse impacts on other user's application traffic.

The actions may be taken to reduce the acknowledgment packets by the ack reduction module 346. For example, a drop "n" acks out of "m" acks within an interval of "x" seconds if "n" Acks are of bytes between "p" and "q" bytes. For example, drop one ack out of 5 Acks in a 2-second interval if the ack is less than 50 Bytes. For example, QUIC uses selective acknowledgments and smaller packets include positive acknowledgment and may be dropped due to that the acks are cumulative and the next ack carries the information contained in the previous one. Further, to bundle, cumulate "r" acks in "y" second intervals and deliver them together in one transmission to the QALC gateway 322. Additionally, a chatty transmission in the link is not desirable in radio access links in a satellite network and a mobile cellular network. Combined drop and bundle may be employed together. The action by the ACK reduction module 346 may be notified to the connection manager module 352 as depicted in FIGS. 5B and 5D.

Further, in an embodiment, a congestion control module 340 may be used to prevent end devices and web servers 318 from sending heavy traffic. A reliable delivery with ARQ between the QALC client 320 at the UE 302 and the QALC gateway 322 may require buffering of packets at the sender as well as at the receiver, and buffer size is limited. There may be a buffer overflow at the UE 302 and/or at the QALC gateway 322, when web servers 318 and/or end user's applications 332 send traffic more than the access network may accommodate. The problem is more prominent, especially at the QALC gateway 322 serving a great number of UEs. Buffering a plurality of packets incurs high queuing delay resulting in poor application performance and bad user QoE. For TCP traffic, TCP PEP module 336 at the QALC client 320 at the UE 302 and the QALC gateway 322 may reduce the receive window in its advertisement to the TCP of the application 332 at the UE 302, and the TCP at the web server 318, respectively. For UDP traffic, a plurality of approaches may be employed to prevent end points from congesting the access network. The approaches may include, an active queue management (AQM) to control the queue length or the mean time that a packet spends in a queue by "algorithmically" dropping packets instead of tail drop or head drop, an explicit congestion control (ECN) to notify end points by congestion experienced (CE) marking in the IP header instead of dropping packets, a combined active queue management (AQM) and explicit congestion notification (ECN) by marking congestion experienced (CE) first and by dropping packets if the sending rate is not reduced to a desirable level. In addition, the AQM and the ECN are applied to each of the priority queues of MP-QBP backbone connections over the MTAN 114 in the UE 302 and the QALC gateway 322.

FIG. 6C illustrates an example block diagram representation of a classifier module 344 with a traffic characterization module 342 for a TCP flow and a UDP flow with encrypted transport protocol, according to an example. The traffic characterization module 342 passively monitors information on the TCP/UDP payload with the 5-tuples in both directions for a TCP/UDP flow between the TCP/UDP of the application 332 at the UE 302 and the web server 318. The traffic characterization module 342 may analyze packet level metrics such as the payload size, the packet times, the relative packet position in two directions, and protocol-specific information. The traffic characterization module 342 may provide the results to the classifier module 344. Further, the application characteristics may be derived from the TCP/UDP payloads transmitted in both directions in the TCP/UDP flow.

Figure 7A:
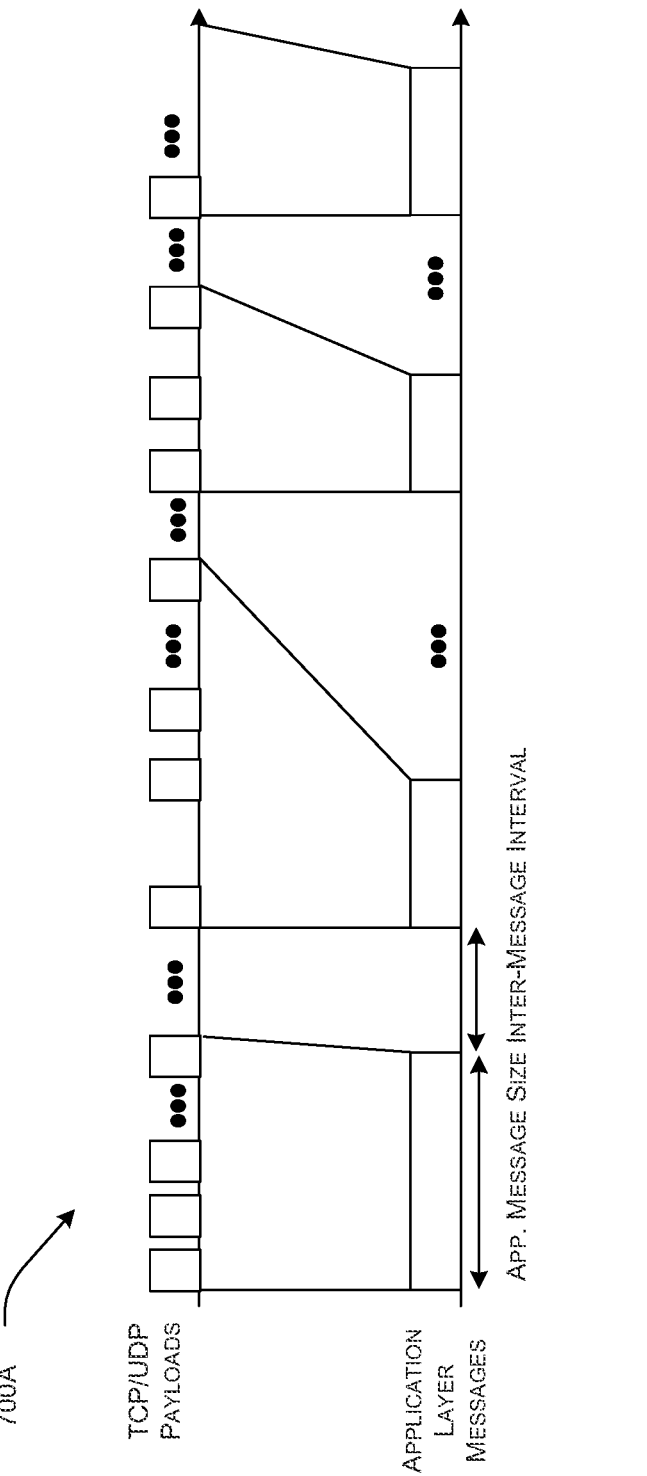
FIG. 7A illustrates an example block diagram representation of estimating application layer messages from TCP/UDP payloads, according to an example

Further, a size, a start time, and an end time of encrypted application messages may be estimated from the TCP/UDP payloads as shown in a timing diagram 700A depicted in FIG. 7A. FIG. 7A illustrates an example block diagram representation of estimating application layer messages from TCP/UDP payloads, according to an example. For example, HTTP requests and responses may be estimated from bidirectional exchanges of TCP/UDP payloads in a TCP/UDP connection. For the QUIC over UDP flows, the traffic characterization module 342 provides the results to the ACK reduction module 346. The TCP/UDP payloads may be encrypted and not visible to the traffic characterization module 342. In addition, for QUIC over UDP, the QUIC header is encrypted. The traffic characterization module 342 at the QALC client 320 at the UE 302 and the QALC gateway 322 may be either independent or cooperative/integrated.

In a MTANs 114, different access networks provide different link characteristics which include availability, the RTT, PLR, ABR, PBC, and power consumption in the UE 302. Among link quality metrics, the RTT, also known as latency, greatly affects application performance and consequently the user's QoE. Web browsing is one of the important applications used by everyone every day. Web page load time is a key metric for web performance which measure how rapidly a web page is loaded and a critical quality of experience (QoE) metrics of a user. The studies show that RTT between a web client and a web server 318 matters much more than bandwidth for rapid page load time. Improvement in page load time diminishes as the data rate increases beyond, for example, 5 Mbps at a fixed RTT, while page load times improve with the decreasing RTT at a fixed bandwidth. There are two levels of granularities for latency sensitivities, that may be considered. The first level may include a connection/flow level. For example, a DNS flow in both directions for DNS lookup is latency sensitive due to a DNS lookup being needed at the beginning of virtually every connection for a client to send a packet to a server.

Traditional DNS may be carried over UDP, however, several encrypted DNS technologies have emerged for the primary purpose of enhancing user privacy. The encrypted DNS technologies may include a DNS over transport layer security (DoT) and DNS queries over HTTPS (DoH) and DNS over QUIC (DoQ). The DoT is transmitted over TLS over TCP, DoH is over HTTP over TLS over TCP and DoQ is over QUIC over UDP.

The second level may include application message level in a connection. For example, handshake messages in both directions for a connection setup in TLS and QUIC are latency sensitive since no application data may be sent without a connection establishment. For a second example, an HTTP request in a return direction from an application client to a server is usually small and it is latency sensitive while an HTTP response in a forward direction from a server to an application client may be usually large and may require high bandwidth, and may be latency insensitive. Both latency sensitive flows and latency sensitive application messages in a flow require transport over a low latency network.

For example, different applications require different QoS requirements to provide the best QoE to a user. Examples of QoS classes include, but are not limited to, an interactive class, a streaming class, a real-time class, a bulk class, and the like. Without proper provision of differentiated service based on QoS requirement of each application, for example, IP packets from an interactive application such as online banking may get stuck behind a large number of packets from a bulk application such as a large file is downloaded. As a result, the user of an online banking application may experience a very large delay to load the page and may finally give up.

Hence, as shown in FIG. 6C, using the results from the traffic characterization module 342, the classifier module 344 may classify the TCP/UDP payloads. The classification may include a latency class of application message in a flow or a flow, and a QoS class. All the TCP/UDP payloads belonging to the application message or belonging to a flow are classified into the same latency class, and the like.

The latency class may be denoted as shown in equation 2 below.

$$\{LC(i), i=1, \ldots, L\} \hspace{2cm} \text{Equation 2}$$

In the above equation 2, where the variable LC(i) may be a latency class "i" and a total number of latency classes is "L".

Further, the QoS class may be denoted as shown in equation 3 below.

$$\{QC(i), i=1, \ldots Q\} \hspace{2cm} \text{Equation 3}$$

In the above equation 3, where the variable QC(i) may be the QoS class "i", and a total number of latency classes is "Q".

FIG. 7B illustrates an example tabular diagram representation of a mapping of application types 700B or application message types 700B to respective latency classes (LC) and respective quality of service (QC) classes, according to an example. The classification granularity of TCP/UDP payloads to LC may be described as, all TCP/UDP payloads in both directions in a TCP/UDP connection, all TCP/UDP payloads in one direction, a TCP/UDP payloads belonging to one or more application message in both directions, and a TCP/UDP payloads belonging to one or more application message in one direction. For example, there may be one classification granularity of the TCP/UDP payloads to the quality-of-service classes (QC). All the TCP/UDP payloads in a TCP/UDP connection are classified into one QC. The classifier module may be rule-based or machine-learning-based.

The classifier module 344 at the QALC client 320 at the UE 302 and the QALC gateway 322 may be either independent or cooperative/integrated. The classifier module 344 may also be located as a standalone unit at the QALC gateway 322. It may convey the classification result to the classifier module 344 at the QALC client 320 at the UE 302 as a control signal or using IP header bits in an IP data packet such as a differentiated services code point (DSCP).

In an embodiment, the scheduler module 354 may reside inside the MP-QBP module as shown in FIG. 6A. The scheduler module 354 receives inputs from the classifier module 344. The inputs may include latency class (LC), and QoS class (QC) of the arriving TCP/UDP payloads from the connection manager module 352, the link quality metrics such as measured and computed link availability, RTT, PLR, ABR, and power requirement from link monitoring module 348, usage status and PBC from usage tracking module 350, system configured rules from system configuration module 334, and a current UE power level to check if it is sufficient for required transmission power. Using the inputs, the scheduler module 354 may select an assess network and a priority queue and sends TCP/UDP payloads to the selected priority connection in the MP-QBP backbones in the selected MTAN.

Figure 7C:
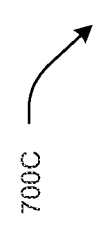
FIG. 7C illustrates a tabular diagram representation of RTTs of MTANs, mapping of latency classes (LC) to MTANs for LEO and GEO access networks, and terrestrial and GEO access networks, according to an example.

FIG. 7C illustrates a tabular diagram representation of a RTTs of MTANs 114 mapping of latency classes (LC) to MTANs 114 for LEO and GEO access networks, and terrestrial and GEO access networks, according to an example. Example of RTT of MTANs 114 and examples of mapping LC to MTAN based on RTT of MTANs 114 is shown in FIG. 7C. The mapping matches the latency sensitivity of application messages to the latency level of MTANs 114 to achieve the best user's QoE.

Figure 8:
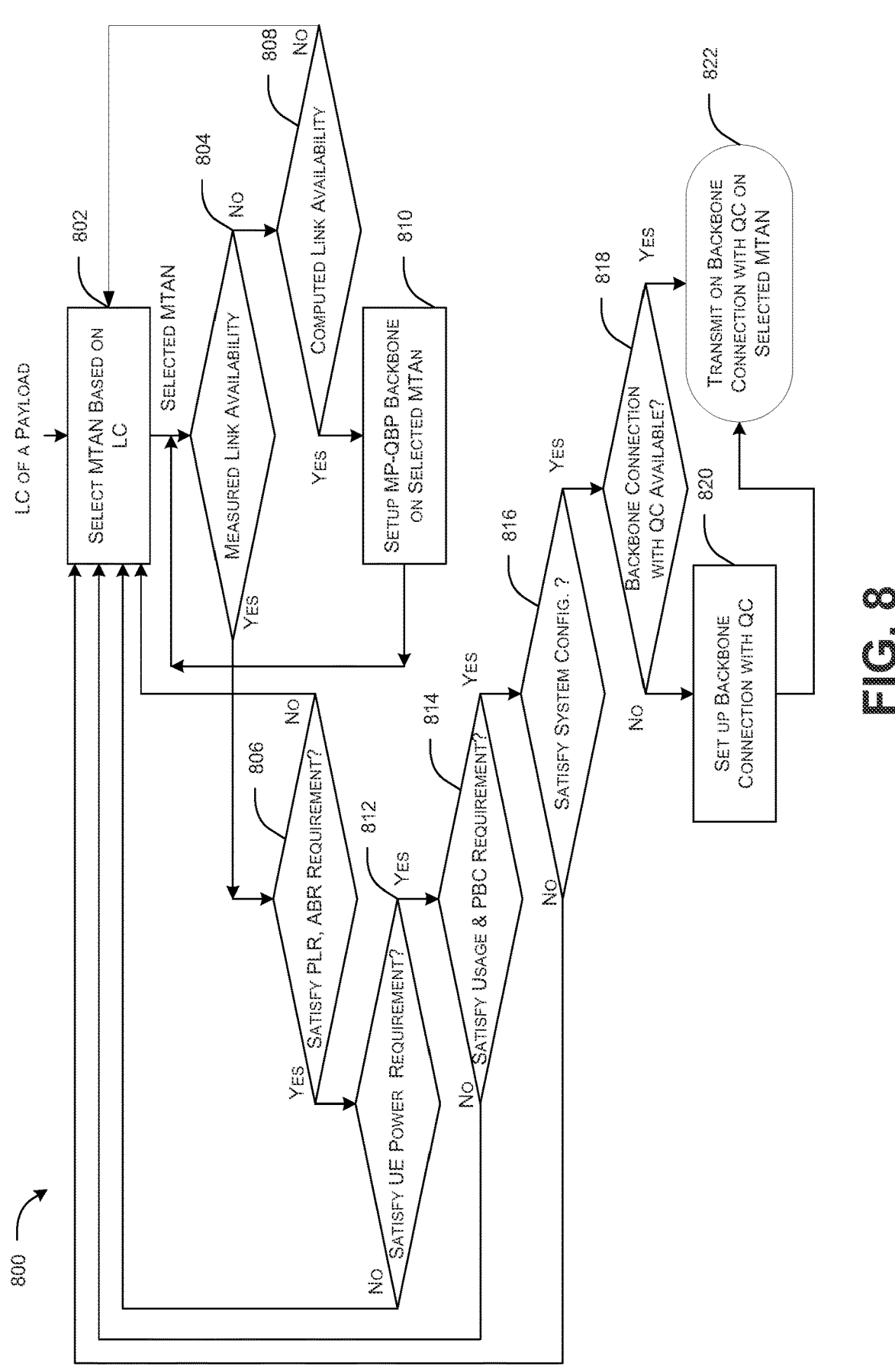
FIG. 8 illustrates an example process flow chart depicting a method for scheduling transmission of data packets belonging to application layer messages on an appropriate access network in an over-the-top (OTT) implementation architecture, according to an example.

FIG. 8 illustrates an example process flow chart depicting a method 800 for scheduling transmission of data packets belonging to application layer messages on an appropriate access network in an over-the-top (OTT) implementation architecture 300, according to an example. The method 800 provides steps of execution of the scheduler module 354 to schedule an arriving TCP/UDP payload with the LC and the QC to a priority backbone connection on a multi-transport access network (MTAN) 114. First, the scheduler module 354 may select an MTAN 114 according to latency class and RTT of MTANs 114. The selected MTAN may go through a series of requirement checks of link quality metrics, PBC, and system configuration. If, an MP-QBP backbone has not been established for an MTAN, the scheduler module 354 may set up the backbone first and measure the link availability. If the priority backbone connection corresponding to the QC required by the incoming TCP/UDP payload has not been set up, the scheduler module 354 may establish the priority backbone connection.

In an embodiment, the OTT implementation architecture 300 may identify latency sensitive application layer messages (traffic characterization module and classifier module) and schedules the transmission of the packets belonging to those application layer messages on an appropriate access network (scheduler module 354).

At step 802, the method 800 includes selecting, by the scheduler module 354, one among a plurality of MTANs 114, based on the latency class. At step 804, the method 800 includes determining, by the scheduler module 354, the availability of the measured link for the selected MTAN. If the measured link is available, then at step 806, the method 800 includes, determining, by the scheduler module 354, whether the PLR and ABR requirements are satisfied. Alternatively, if the measured link is unavailable, then at step 808, the method 800 includes determining, by the link monitoring module 348, a computed link availability. If the computed link is available, then at step 810, the method 800 includes setting up, by the MP-QBP module 356, an MP-QBP backbone connection for the selected MTAN. The process is iterated until the measured link for the selected MTAN becomes available. If the computed link is unavailable, then the loop goes back to step 802.

If the PLR, and ABR requirements are determined to be unsatisfied, then the loop goes back to step 802. Further, if the PLR, and ABR requirements are determined to be satisfied, then at step 812, the method 800 includes determining, by the scheduler module 354, whether the UE power requirement is satisfied. If the UE power requirement is determined to be unsatisfactory, then the loop goes back to step 802. If the UE power requirement is determined to be satisfied, then at step 814, the method 800 includes determining, by the scheduler module 354, whether usage and PBC requirement is satisfied. If the usage and PBC requirements are determined to be unsatisfactory, then the loop goes back to step 802.

If the usage and PBC requirement are determined to be satisfied, then at step 816, the method 800 includes determining, by the scheduler module 354, whether system configuration is satisfied. If the system configuration is determined to be unsatisfactory, then the loop goes back to step 802. If the system configuration is determined to be satisfied, then at step 818, the method 800 includes determining, by the scheduler module 354, whether a backbone connection with QC is available. If the backbone connection with QC is unavailable, then at step 820, the method 800 includes setting up, by the MP-QBP module 356, a new MP-QBP backbone connection with the QoS class (QC). Alternatively, if the backbone connection with QC is available, then at step 822, the method 800 includes transmitting the data packets on the MP-QBP backbone connection with the QC on the selected MTAN.

Figure 9A:
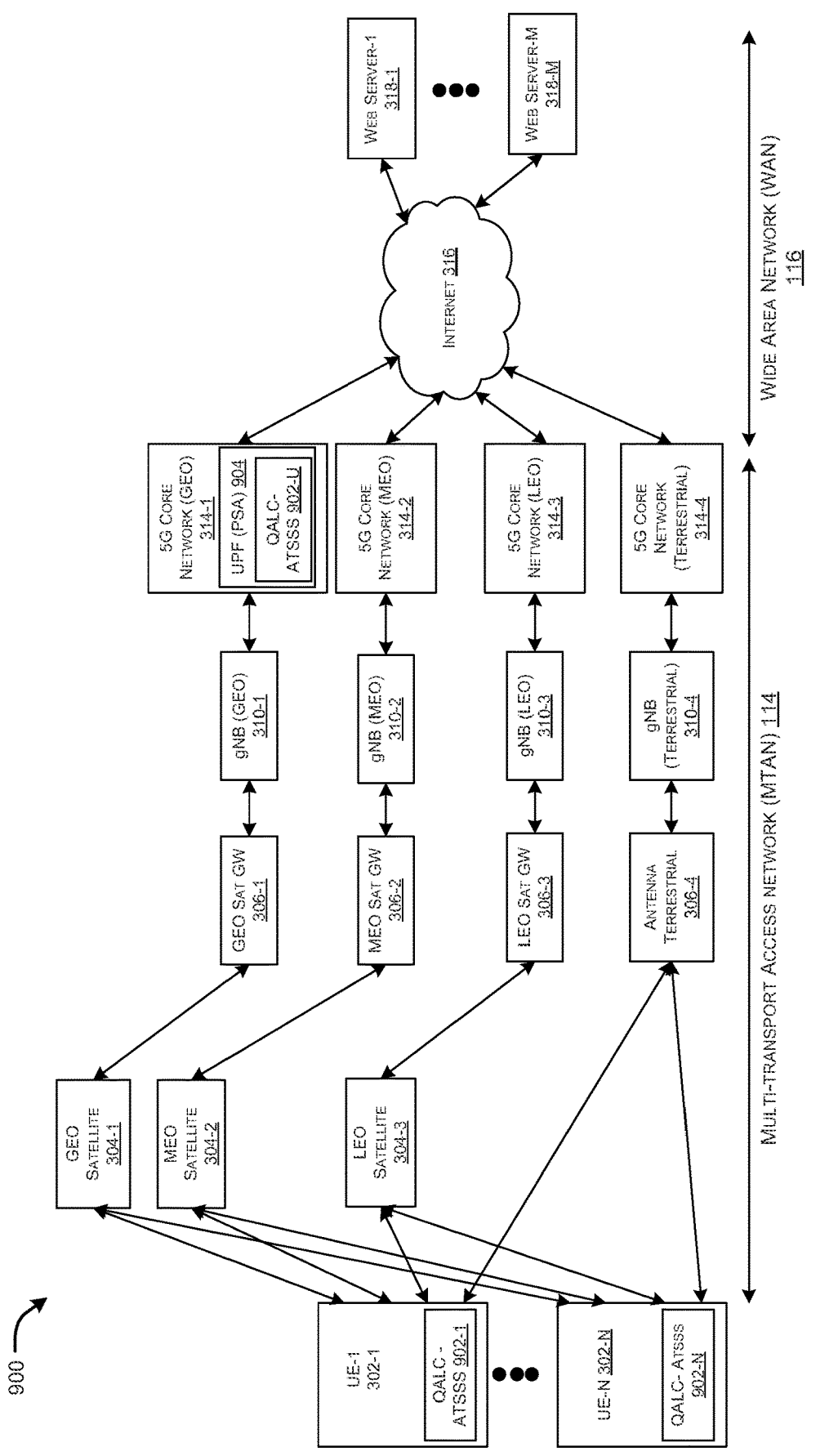
FIG. 9A illustrates an example detailed schematic representation of a communication network capable of providing a quality of experience (QoE)-aware transmission of data packets over multi-transport access networks using QALC-capable access traffic steering, switch, and splitting (ATSSS) implementation architecture, according to an example.

FIG. 9A illustrates an example detailed schematic representation of a communication network capable of providing a quality of experience (QoE)-aware transmission of data packets over multi-transport access networks using QALC-capable access traffic steering, switch, and splitting (ATSSS) implementation architecture 900, according to an example.

According to FIG. 9A, the example communication network may be a QALC-capable ATSSS architecture 900. The QALC-capable ATSSS architecture 900 includes a QALC-ATSSS module 902-1, 902-2, . . . , 902-N, in the UE 302 and QALC-ATSSS module 902-U in a PDU session anchor (PSA) User Plane Function (UPF) unit 904 (also referred herein as PSA UPF module) in a 5G core network, respectively. In an embodiment, the UE 302, and the PSA UPF unit 904 in the 5G core include an ATSSS protocol and software, that are QALC-capable. In the QALC-capable ATSSS architecture 900, the ATSSS protocol and the software residing in the UE 302 and the PSA UPF unit 904 are modified to support QALC capabilities. Typically, in 3GPP TS 23.501 Version 18.1.0, clause 5.32 discloses an ATSSS functionality in a 3GPP standard based system. The ATSSS functionality includes three types of steering functionalities. The steering functionalities may include an MPTCP functionality for a TCP traffic, an MP-QUIC functionality for a UDP traffic, and an ATSSS low layer (LL) functionality for all types of traffic below IP layer. In an embodiment, the MP-QUIC ATSSS steering functionality may be used for both TCP and UDP applications. The MP-QBP in the over-the-top (OTT) implementation architecture 300 may be replaced by MP-QUIC ATSSS steering functionality in the QALC-capable ATSSS architecture 900.

In an embodiment, the QALC-capable ATSSS architecture 900 includes a plurality of UE 302-1, 302-2, . . . , 302-N communicatively coupled to a plurality of 5G core networks via a plurality of multi-transport access networks (MTANs) 114. The plurality of UEs 302 is installed with multi-transport capability having multiple access network interfaces. The multiple access network interfaces are connected to non-terrestrial networks (NTN) such as GEO satellite 304-1, MEO satellite 304-2, LEO satellite 304-3 networks, and the terrestrial network 306-4. Each NTN networks are composed of GEO/MEO/LEO satellite 304-1/304-2/304-3, Gateway (GW) 306-1, 306-2, 306-3, gNB 310-1, 310-2, 310-3, and 310-4, and the plurality of 5G core networks 314-1, 314-2, 314-3, and 314-4. The terrestrial network includes a radio frequency (RF) antenna 306-4, a gNB 310-4, and a 5G core network 314-4. The plurality of 5G core networks is connected to the plurality of web servers 318-1, 318-2, . . . , 318-M through the internet 316. The plurality of UEs 302 may communicate with the plurality of web servers 318 via multi-transport access networks (MTANs) 114 and a wide area network (WAN) 116A. The plurality of UEs 302 includes QALC-ATSSS module 902-1, . . . , 902-M. Further, the plurality of 5G core networks includes the QALC-ATSSS module 902-U within the PSA UPF unit 904. The QALC-ATSSS module 902-U may correspond to the system 104, 204, and the QALC-ATSSS client 902 as shown in the figures above and below.

In an embodiment, the communication path between the plurality of UEs 302 and the plurality of web servers 318 includes two segments. Firstly, the plurality of UEs 302 is connected to the plurality of 5G core network via a plurality of multi-transport access networks (MTANs) 114. Secondly, the plurality of 5G core network 314 is connected to the plurality of web servers 318 using the WAN 116A. The plurality of MTANs (GEO, MEO, LEO, and terrestrial) 114 includes different link characteristics such as availability, RTT, PLR, ABR, PBC, and UE power consumption requirements. In an embodiment, one endpoint of the plurality of MTANs 114 includes the plurality of UEs 302. The other endpoint of the plurality of MTANs 114 includes PSA UPF unit 904 in the plurality of 5G core networks, which is further connected to the plurality of web servers 318 via the WAN 116A.

In an embodiment, the QALC-capable ATSSS architecture 900 may be configured to determine the multi-transport capabilities of the access traffic steering, switching, and splitting (ATSSS) protocol and the software associated with the plurality of UEs 302. The multi-transport capabilities support quality of experience (QoE)-aware transmission. In case, it is determined that the access traffic steering, switching, and splitting (ATSSS) protocol and the software associated with the plurality of UEs 302 support the multi-transport capabilities, then the QALC-capable ATSSS architecture 900 may be configured to deploy the traffic routing device as a user plane function (UPF) module 902-U within the telecommunication network. The traffic routing device functions as an intermediate node between the plurality of UEs 302 and the plurality web servers 318, which implements the QALC-capable ATSSS architecture 900, as shown in detail in FIG. 9C. Alternatively, in case it is determined that the access traffic steering, switching, and splitting (ATSSS) protocol and the software associated with the plurality of UEs 302 do not support the multi-transport capabilities. The QALC-capable ATSSS architecture 900 is configured to deploy the traffic routing device as a gateway between the telecommunication network and the plurality web servers 318 using the WAN 116A, similar to OTT architecture 300 described above.

Further, the QALC-capable ATSSS architecture 900 is configured to perform a plurality of steering functions for at least one of transmission control protocol (TCP) applications and user datagram protocol (UDP) applications within the plurality of UEs 302. Furthermore, the QALC-capable ATSSS architecture 900 is configured to modify one of a data plane, a control plane, and a management plane of the telecommunication network to support the multi-transport capabilities for the quality of experience (QoE)-aware transmission. Additionally, the QALC-capable ATSSS architecture 900 is configured to modify scheduling capabilities in the telecommunication network, based on the modified one of a data plane, the control plane, and the management plane.

Figure 9B:
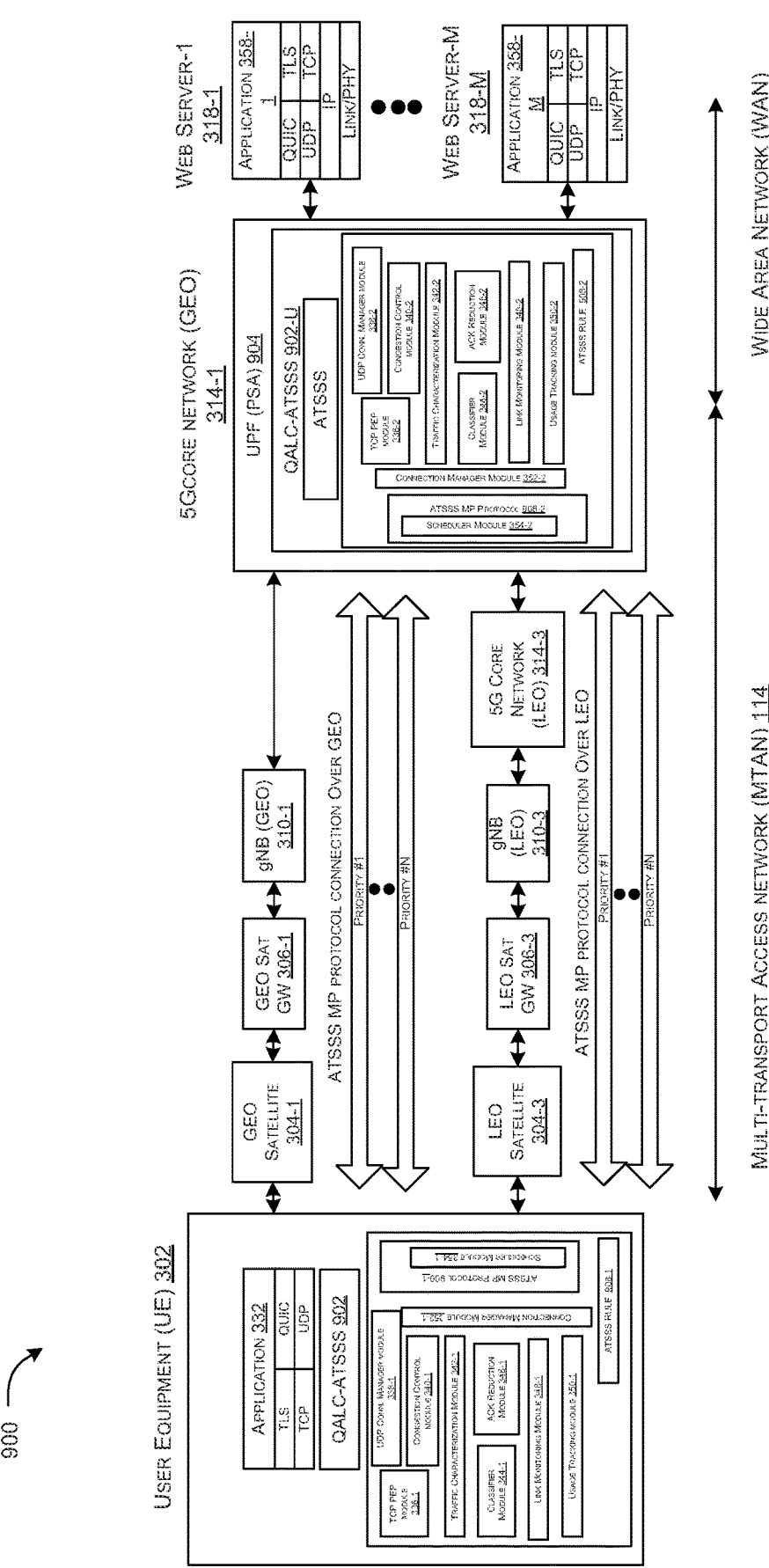
FIG. 9B illustrates an example block diagram representation of a user equipment, a 5G core network, and a web server, such as those shown in FIG. 9A, depicting a detailed view of functional components within the quality of experience (QoE)-aware transmission over the multi-transport module in a QALC-capable ATSSS architecture, according to an example.

FIG. 9B illustrates an example block diagram representation of user equipment 302, a 5G core network 314, and a web server 318, such as those shown in FIG. 9A, depicting a detailed view of functional components within the quality of experience (QoE)-aware transmission over the multi-transport module in a QALC-capable ATSSS architecture 900, according to an example. Although in FIG. 9B, non-terrestrial networks (NTN) such as GEO and LEO access networks are shown, a person skilled in the art may understand that this is an application for any other kind of NTN network. The PSA UPF unit 904 may be in any 5G core network, such as GEO, MEO, LEO, or terrestrial networks. In a preferred embodiment, the PSA UPF unit 904 may be in a GEO 5G core network. The GEO 5G core network includes the QALC-ATSSS module 902-U. The QALC-ATSSS module 902-U in the PSA UPF unit 904 replaces the QALC gateway 322 in the OTT architecture 300 and performs the functionalities by customizing the 3GPP standard ATSSS to provide the QALC capabilities. The QALC-ATSSS module 902-U may be an aggregation point of traffic from the UE 302 and a distribution point of traffic from the web server 318.

The QALC-ATSSS module 902 may include sub-modules that are needed similar to those shown in the OTT architecture 300 as shown in FIG. 3B. The QALC-ATSSS module 902 includes a TCP PEP module 336-1, a UDP connection manager module 338-1, a congestion control module 340-1, a traffic characterization module 342-1, a classifier module 344-1, a scheduler module 354-1, an ACK reduction module 346-1, a link monitoring module 348-1, a usage tracking module 350-1, MP-QBP module 356 and a connection manager module 352-1.

In an embodiment, several functions in the OTT architecture 300 are replaced in the QALC-capable ATSSS architecture 900. For example, the MP-QBP in the OTT architecture 300 is replaced with MPQUIC ATSSS steering functionality. The ATSSS MP protocol is shown in FIG. 9B is an MPQUIC ATSSS steering functionality specified in the 3GPP TS 23.501 v18.1.0. In an embodiment, the ATSSS steering functionality applies to all steering, switching, and splitting traffic functions, and is not limited to "steering" only. The MPQUIC ATSSS steering functionality is used for carrying both TCP and UDP applications over the radio access network. However, the 3GPP standard specifies that MPQUIC ATSSS steering functionality is used for steering, switching, and splitting UDP traffic between the UE 302 and the PSA UPF unit 904.

Further, in the QALC-capable ATSSS architecture 900, the 3GPP ATSSS data plane (MPQUIC steering functionality), control plane, and management plane are customized to support QALC capabilities. Furthermore, the scheduling function in the MPQUIC ATSSS steering functionality is customized with the scheduler module 354-1.

In an embodiment, an original TCP connection between the application 332 on the UE 302 and the application server on the web server 318 is split into three connections. Firstly, as a local TCP connection between the application 332 on the UE 302 and the TCP PEP module 336-1 at the QALC-ATSSS module 902 on the UE 302. Secondly, as an MPQUIC ATSSS steering functionality over MTANs 114 between the UE 302 and the PSA UPF unit 904. Lastly, as a TCP connection between the TCP PEP module 336-2 on the QALC-ATSSS module 902-U on PSA UPF unit 904 and the web server 318.

In an alternate embodiment, similar to the TCP, an original UDP connection between the application 332 on the UE 302 and the application server on the web server 318 may be split into three connections. Firstly, as a local UDP connection between the application 332 on the UE 302 and the UDP connection manager module 338-1 at the QALC-ATSSS module 902 on the UE 302. Secondly, as MPQUIC ATSSS steering functionality over MTANs 114 between the UE 302 and the PSA UPF unit 904. Lastly, as a UDP connection between the UDP connection manager module 338-2 on the QALC-ATSSS module 902-U on PSA UPF unit 904 and the web server 318.

The ATSSS steering functionality MPQUIC by the QALC-ATSSS module 902 on the UE 302 and on PSA UPF unit 904 over MTANs 114 between the UE 302 and the PSA UPF unit 904 performs a plurality of functions. The functions include setting up connections with different priorities. Further, the scheduler functions include servicing the data packets from queues of different QoS classes over the MP backbone connection with the corresponding QoS class. Furthermore, the functions include multiplexing the data packets from connections with the same QoS class over a connection. Furthermore, the functions include in-sequence delivering to applications on the UE 302 and the web server 318 using a datagram transport mode 1 and a stream transport mode. Additionally, the functions include providing a local recovery of network impairments over the MTANs 114 using stream transport mode, if required. Further, the QALC-ATSSS module 902 within the 5G core performs similar functions as that of QALC client 320 within the QALC gateway 322 and the second QoE aware transmission over multi-transport module 210 within the system 104A. Further, the QALC-ATSSS module 902 on the UE 302 performs a similar function as the QALC client 320 within the UE 302 and the first QoE aware transmission over multi-transport module 208 within the UE 302.

In an embodiment, the congestion control module 340-1 and 340-2 is configured to provide congestion control to prevent the UEs 302 and web servers 318 from causing network congestion.

The traffic characterization (TC) module 342 is configured to passively monitor information on the data packets in both directions for a flow between the application on the UE 302 and the web server 318. The TC module 342 is further configured to analyze the statistics and provide the output to the ACK reduction module 346 and the classifier module 344. The TC module 342 passively monitors information on TCP/UDP payload with 5-tuples in both directions for a TCP/UDP flow between the TCP/UDP of an application at the UE 302 and the web server 318. The TC module 342 at the QALC-ATSSS module 902 at the UE 302 and the UPF (PSA) 904 may be either independent or cooperative/integrated. Based on the information from the TC module 342, the classifier module 344 in the QALC-ATSSS module 902 at the UE 302 and the PSA UPF unit 904 are configured to classify the data packets from connections into two categories, namely latency classes (LC) and Quality of Service (QoS) classes. The LC classes include the data packets belonging to latency-sensitive application layer messages that are transmitted over low latency transport access network. In the quality of service (QoS) classes, the data packets that are added into priority queues of different QoS classes are transported over the corresponding priority ATSSS MP-QUIC connections over the selected MTAN. The classifier module 344 at the UE 302 and the PSA UPF unit 904 may be either independent or cooperative/integrated.

The classifier module 344-2 may also be located as a standalone unit at the PSA UPF unit 904. The classifier module 344-2 may convey the classification result to the classifier module 344-1 at the UE 302 as a control signal or using IP header bits in an IP data packet such as differentiated services code point (DSCP).

The connection manager module 352 may be configured to manage connections between the TCP PEP module 336 or the UDP connection manager module 338 and the MP-QUIC ATSSS steering functionality. An example of the connection table 400 and an example of table lookup is shown in FIG. 4A also applies to the QALC-capable ATSSS architecture 900, in the same manner. An example of connection establishment, teardown, and data packet flows is depicted in FIG. 4B also applies to the QALC-capable ATSSS architecture 900 in the same manner. The connection manager module 352-1, and 352-2 resides in the QALC-ATSSS module 902 at the UE 302 and at the PSA UPF unit 904, respectively. The data packets are transferred over MPQUIC ATSSS steering functionality.

The scheduler module 354 is configured to select the appropriate MTAN and forwards the data packets to the priority queues based on the set of traffic/network/UE parameters and conditions. The set of parameters/condition includes the latency class and the QoS class provided by the classifier module 344, current link quality provided by the link monitoring module 348, the UE battery power level, a usage status on each access network provided by the usage tracking module 350 and the ATSSS rule 908. The scheduler module 354 resides inside the ATSSS MP protocol module 906. The description of the scheduler module 354 in the OTT architecture 300 may apply in the same way except for MP-QPB, replaced by ATSSS MP protocol 906, and system configured rules from system configuration module, replaced by ATSSS/N4 rules 908. Using the inputs, the scheduler module 354 selects an access network and a priority queue and sends TCP/UDP payloads to the ATSSS MP protocol connections.

The link monitoring module 348 is configured to monitor link characteristics of each MTAN 114 such as availability, RTT, PLR, ABR, and power consumption requirement if available. In an alternate embodiment, the functions of link monitoring module 348 may be implemented in the ATSSS performance measurement function (PMF). The description of the link monitoring module 348 in the OTT architecture 300 is applicable in the same way here by replacing MP-QBP with ATSS MP protocol 906 with ATSSS steering functionality MP-QUIC. The estimated RTT, estimated PLR, estimated ABR and measured link availability may be obtained from MP-QUIC.

The usage tracking module 350 is the same as that disclosed in the OTT architecture 300 and performs a similar functionality. The usage tracking module 350 is configured to record the number of bytes transmitted over each MTAN 114. The ACK reduction module 346 at the QALC-ATSSS module 902 at the UE 302 is configured to receive estimated ACK information from the TC module 342-1 and may reduce the number of QUIC ACK packets to be transmitted over the MTANs 114. The ACK reduction module 346 for QUIC is configured to notify to the connection manager module 352 as depicted in FIGS. 11B and 11D.

In an embodiment, the access network runs over the 5G core network and the 5G core network provides reliable delivery at the link layer (radio link control (RLC)). In an embodiment, a stream transport mode in MP-QUIC provides reliability and in-order delivery with re-transmission.

In an embodiment, during MA PDU establishment, the session management function (SMF) provides ATSSS rules 908 to the UE 302 and N4 rules to the PSA UPF unit 904 as provided in the 3GPP specification. The ATSSS rules 908-2 for the UPF are known as N4 rules. The ATSSS rules 908 in the QALC-capable ATSSS architecture 900 may replace system configuration in the OTT architecture 300.

In an embodiment, below are exemplary requirements for the 5G core network and the UE functions. The ATSSS rules 908 and N4 rules are enhanced to support values for QALC-ATSSS steering functionality and QALC-ATSSS steering mode. The Access and Mobility Management Function (AMF) supports QALC-ATSSS. The Session Management Function (SMF) may determine whether the UE 302 supports the QALC-ATSSS steering functionality and indicate this to Policy Control Function (PCF). Further, the SMF may create ATSSS/N4 rules that apply the QALC-ATSSS steering functionality, based on the Policy and charging control (PCC) rules received from PCF. Furthermore, the SMF may select a UPF that supports QALC-ATSSS steering functionality. The PCF may create PCC rules using the QALC-ATSSS steering functionality. The UPF may implement QALC-ATSSS. Further, the UPF may support the QALC-ATSSS steering functionality for steering the TCP/UDP flows indicated in the received N4 rules. For each TCP/UDP flow, it should apply the transport mode indicated in the received N4 rules. The UE 302 implements the QALC-ATSSS. The UE 302 may indicate in the PDU session establishment request that it supports the QALC-ATSSS steering functionality. The UE 302 may support the QALC-ATSSS steering functionality for steering the TCP/UDP flows indicated by the received ATSSS rules 908. For each TCP/UDP flow, the UE 302 applies the transport mode indicated in the received ATSSS rules 908.

Figure 9C:
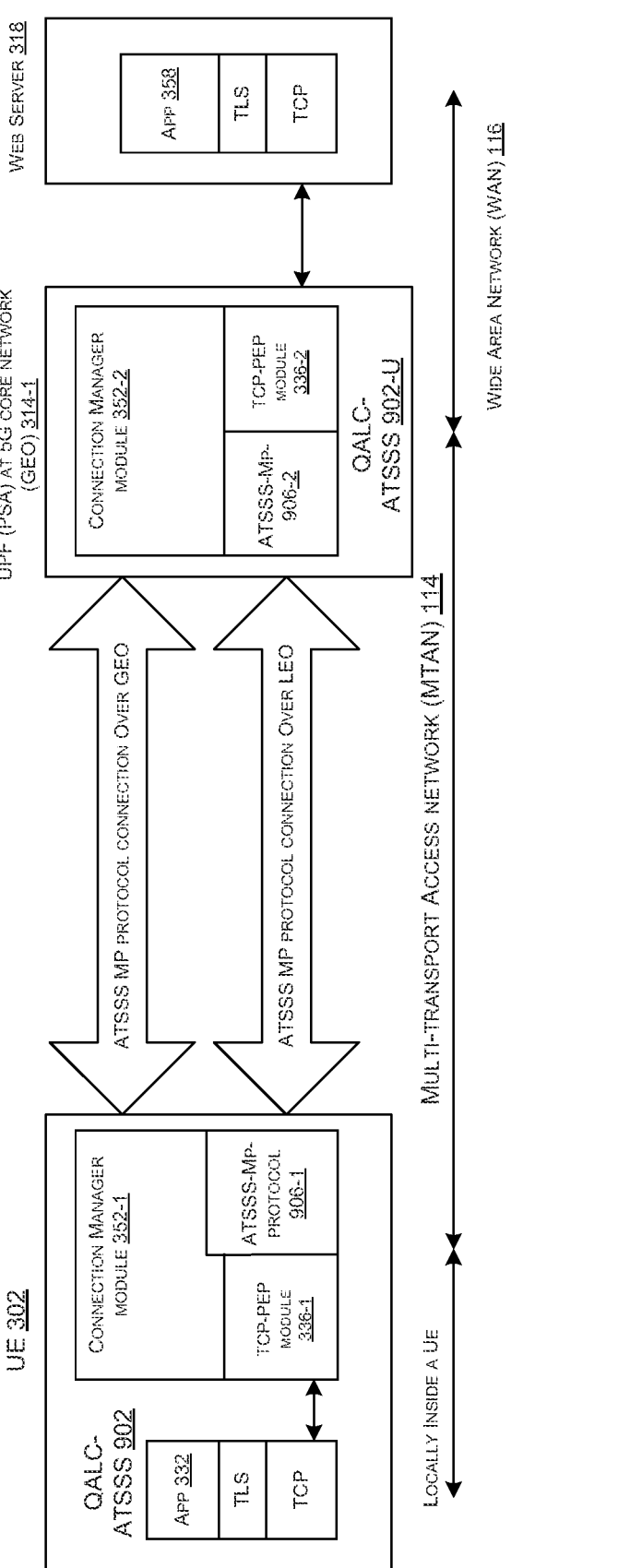
FIG. 9C illustrates an example block diagram representation of a protocol stack with transmission control protocol (TCP)-performance enhancing proxy (PEP) module in a QALC-capable ATSSS architecture, according to an example.

FIG. 9C illustrates an example block diagram representation of a protocol stack with transmission control protocol (TCP)-performance enhancing proxy (PEP) module 336 in a QALC-capable ATSSS architecture 900, according to an example. According to FIG. 9C, the protocol stack in the UE 302, the PSA UPF unit 904 and the web server 318 for applications using TCP are disclosed. The TCP PEP module 336 functions in the QALC-capable ATSSS architecture 900 are the same as that in the OTT architecture 300 shown in FIG. 3C.

The original TCP connection between application 332 at the UE 302 and application 358 at the web server 318 is replaced by the local TCP connection between the TCP of the application 332 and the TCP PEP module 336-1 of the QALC-ATSSS module 902 at the UE 302. The MP-QUIC ATSSS steering functionality over MTANs between the UE 302 and the PSA UPF unit 904 and the TCP connection between TCP PEP module 336-2 at the PSA UPF unit 904 and the TCP of the web server 318.

The TCP payloads are transferred between the TCP-PEPs of the QALC-ATSSS module 902 at the UE 302 and that at the PSA UPF unit 904 via a connection manager module 352 and the MP-QUIC ATSSS steering functionality.

In an embodiment, the QALC-ATSSS module 902 at the UE 302 and the PSA UPF unit 904 include ATSSS MP protocol 906-1, 906-2 connections over different multi-transport access networks (MTANs) 114. The ATSSS MP protocol 906 is an MP-QUIC ATSSS steering functionality. The ATSSS feature enables a multi-access PDU connectivity service, which may exchange PDUs between the UE 302 and a data network by simultaneously using more than one 3GPP access network. The multi-access PDU connectivity service is realized by establishing a multi-access PDU (MA PDU) session, a PDU session that may have user plane resources on two access networks. The MP-QUIC ATSSS steering functionality connections are used to transport TCP/UDP payload between the UE 302 and the PSA UPF unit 904 over the MTANs 114. The MP-QUIC ATSSS steering functionality requires one MP-QUIC connection per QoS class and each TCP/UDP flow may be transferred via one unique QUIC stream on the MP-QUIC connection associated with the QoS class. The MP-QUIC ATSSS steering functionality requires "n" MPQUIC connections on each MTAN for "n" QoS classes. Each ATSSS MP protocol 906 connection over an access network is associated with a latency class and each priority connection in an access network belongs to a QoS class.

The classifier module 344 is configured to classify the data packets to be transmitted over the ATSSS MP protocol 906 connection into different latency and QoS classes. The scheduler module 354 routes the data packets to an ATSSS MP protocol 906 connection over an access network according to the latency class and transport them over a priority connection in the ATSSS MP protocol 906 connection according to the QoS class. The QoS class may be mapped to a 5G QoS identifier (5Q1) in the 5G core network.

Figure 9D:
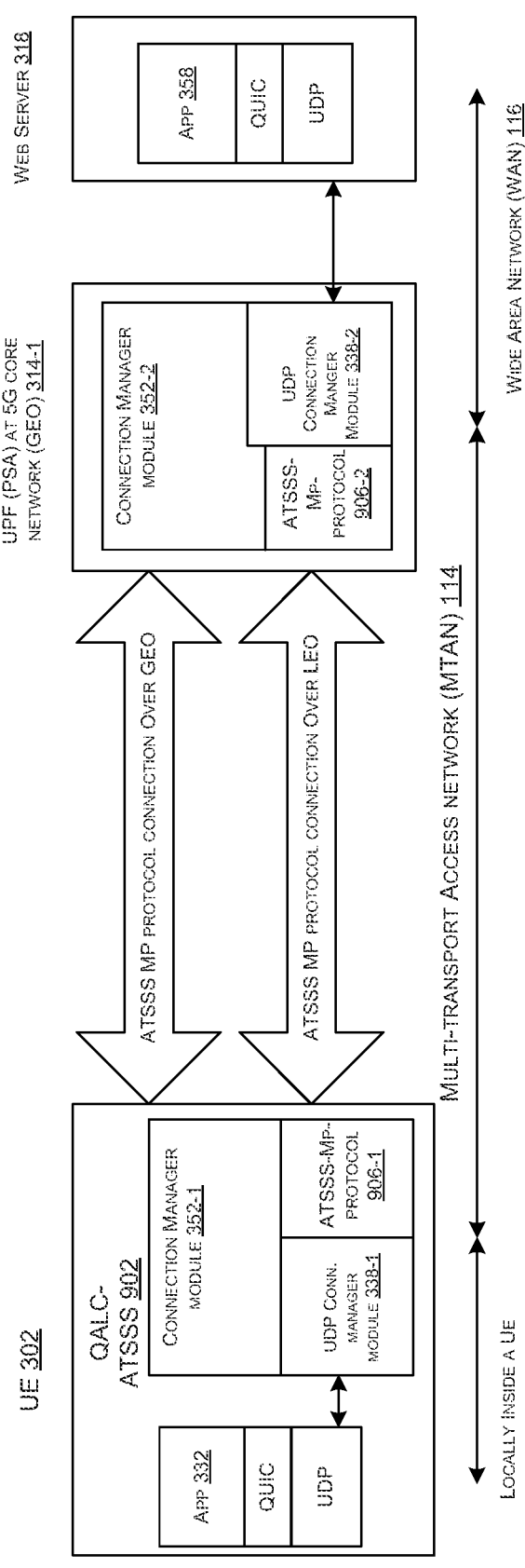
FIG. 9D illustrates an example block diagram representation of a protocol stack with a user datagram protocol (UDP)-manager module in a QALC-capable ATSSS architecture, according to an example.

FIG. 9D illustrates an example block diagram representation of a protocol stack with a user datagram protocol (UDP)-manager module in a QALC-capable ATSSS architecture 900, according to an example. According to FIG. 9D, the protocol stack in the UE 302, the PSA UPF unit 904 and the web server 318 for applications using UDP is depicted. The UDP connection manager module 338 in the QALC-capable ATSSS architecture 900 functions in the same way as that in the OTT architecture as shown in FIG. 3D.

The UDP payloads are transferred between the UDP connection manager module 338 of the QALC-ATSSS module 902 at the UE 302 and that at the PSA UPF unit 904 via the connection manager module 352, and the MP-QUIC ATSSS steering functionality. The original UDP communication between application 332 at the UE 302 and application 358 at the web server 318 is replaced by the local UDP connection between the UDP of the application 332 and the UDP connection manager module 338-1 of QALC-ATSSS module 902 at the UE 302. The MP-QUIC ATSSS steering functionality over the MTANs 114 between the UE 302 and the PSA UPF unit 904 and the UDP communication between the UDP connection manager module 338-2 at the PSA UPF unit 904 and UDP of the web server 318.

Figure 10:
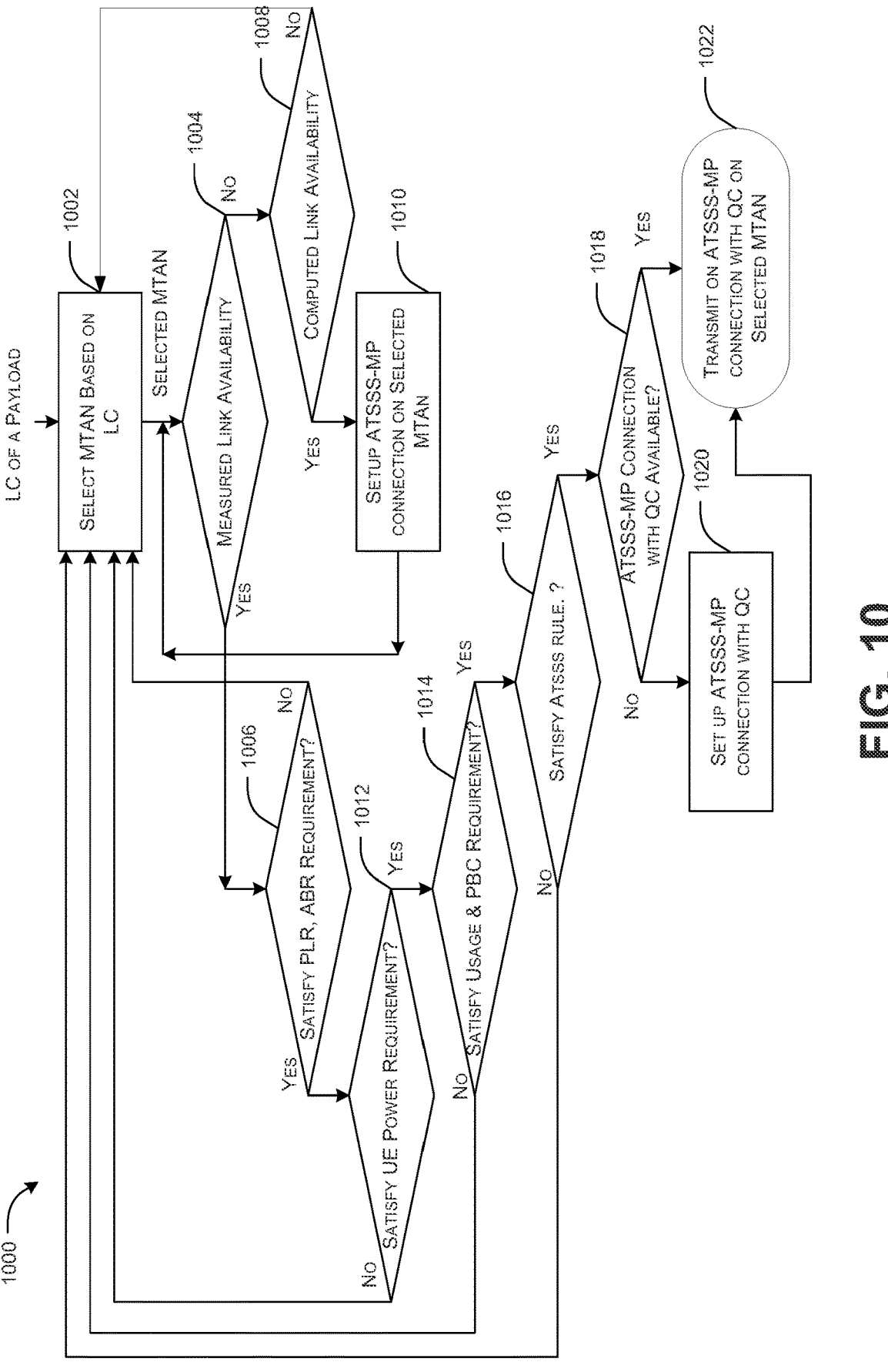
FIG. 10 illustrates an example process flow chart depicting a method for scheduling transmission of data packets belonging to application layer messages on an appropriate access network in a QALC-capable ATSSS architecture, according to an example.

FIG. 10 illustrates an example process flow chart depicting a method 1000 for scheduling transmission of data packets belonging to application layer messages on an appropriate access network in a QALC-capable ATSSS architecture 900, according to an example. FIG. 10 depicts an example flow chart for the scheduler module to schedule an arriving TCP/UDP payload with the LC and the QC to a priority ATSSS MP protocol 906, MP-QUIC, connection on a multi-transport access network. First, the scheduler module 354 may select an MTAN according to the latency class and RTT of MTANs 114. Then the scheduler module 354 may analyze a series of requirement checks of link quality metrics, PBC, and ATSSS rules 908. If an MP-QUIC has not been established for an MTAN, the scheduler module 354 sets up the MP-QUIC connection first and measures the link availability. If the priority MP-QUIC connection corresponding to the QC required by the incoming TCP/UDP payload has not been set up, the scheduler module 354 may establish the priority backbone connection. One of the key features is the process of identification of latency-sensitive application layer messages (traffic characterization module 342 and classifier module 344) and scheduling the transmission of the data packets belonging to those application layer messages on an appropriate (such as for example, but not limited to, a lower latency) access network (scheduler module 354).

At step 1002, the method 1000 includes selecting, by the scheduler module 354, one among a plurality of MTANs 114, based on the latency class. At step 1004, the method 1000 includes determining, by the scheduler module 354, the availability of the measured link for the selected MTAN 114. If the measured link is available, then at step 1006, the method 1000 includes, determining, by the scheduler module 354, whether the PLR and ABR requirements are satisfied. Alternatively, if the measured link is unavailable, then at step 1008, the method 1000 includes determining, by link monitoring module 348, a computed link availability. If the computed link is available, then at step 1010, the method 1000 includes setting up, by the ATSSS MP Protocol module 906, an ATSSS-MP connection for the selected MTAN. The process is iterated until the measured link for the selected MTAN becomes available. If the computed link is unavailable, then the loop goes back to step 1002.

If the PLR, and ABR requirements are determined to be unsatisfied, then the loop goes back to step 1002. Further, if the PLR and ABR requirements are determined to be satisfied, then at step 1012, the method 1000 includes determining, by the scheduler module 354, whether the UE power requirement is satisfied. If the UE power requirement is determined to be unsatisfactory, then the loop goes back to step 1002. If the UE power requirement is determined to be satisfied, then at step 1014, the method 1000 includes determining, by the scheduler module 354, whether usage and PBC requirement is satisfied. If the usage and PBC requirement are determined to be unsatisfactory, then the loop goes back to step 1002. If the usage and PBC requirement are determined to be satisfied, then at step 1016, the method 1000 includes determining, by the scheduler module 354, whether the ATSSS rule 908 is satisfied.

If the ATSSS rule 908 is determined to be unsatisfactory, then the loop goes back to step 1002. If the ATSSS rule 908 is determined to be satisfied, then at step 1018, the method 1000 includes determining, by the scheduler module 354, whether a backbone connection with QC is available. If the backbone connection with QC is unavailable, then at step 1020, the method 1000 includes setting up, by the ATSSS MP Protocol module 906, a new ATSSS-MP connection with the QC. Alternatively, if the backbone connection with QC is available, then at step 1022, the method 1000 includes transmitting the data packets on the ATSSS-MP connection with the QC on the selected MTAN.

Figure 11A:
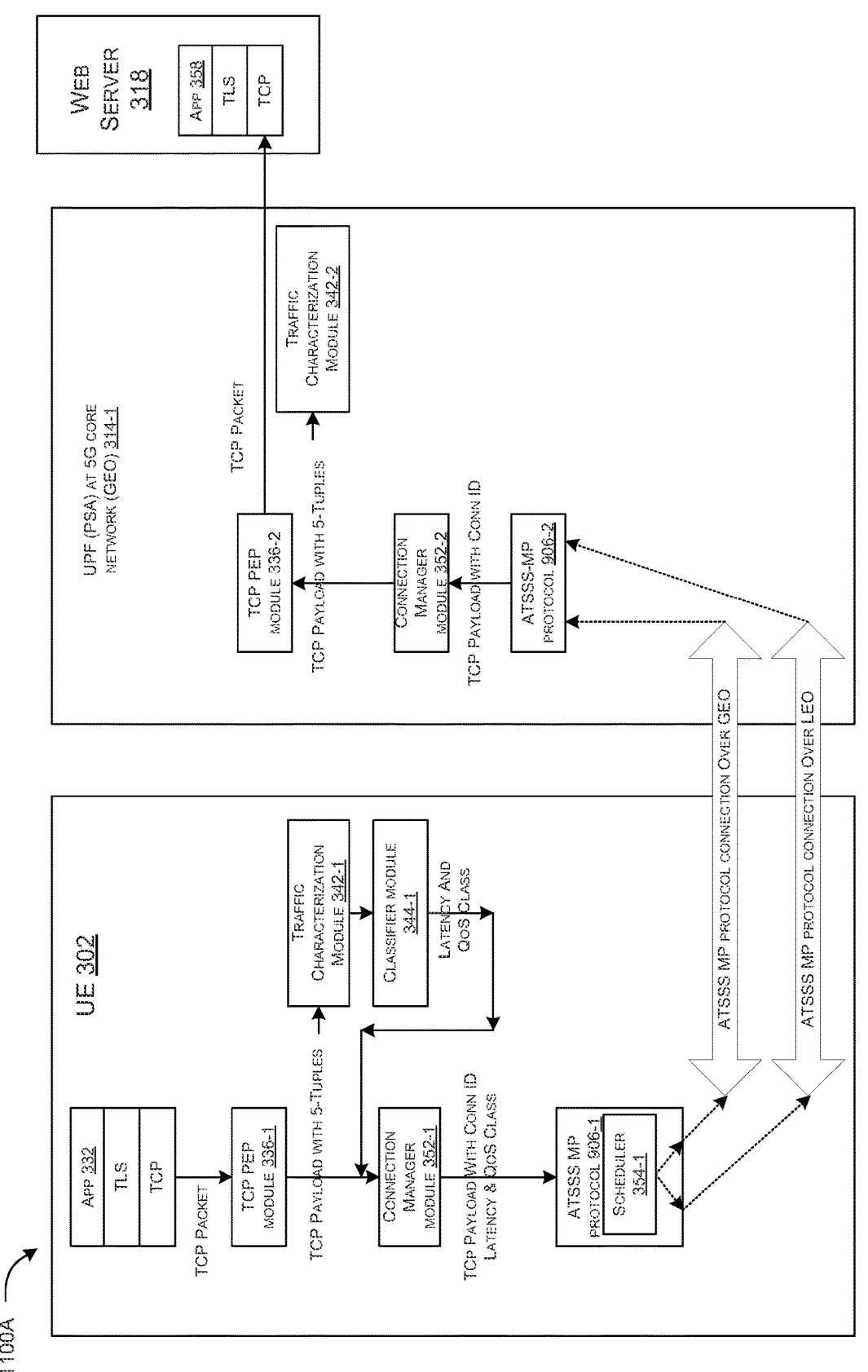
FIG. 11A illustrates an example schematic diagram representation of a TCP packet flow in a return direction from a UE to a web server in a QALC-capable ATSSS architecture, according to an example.
Figure 11B:
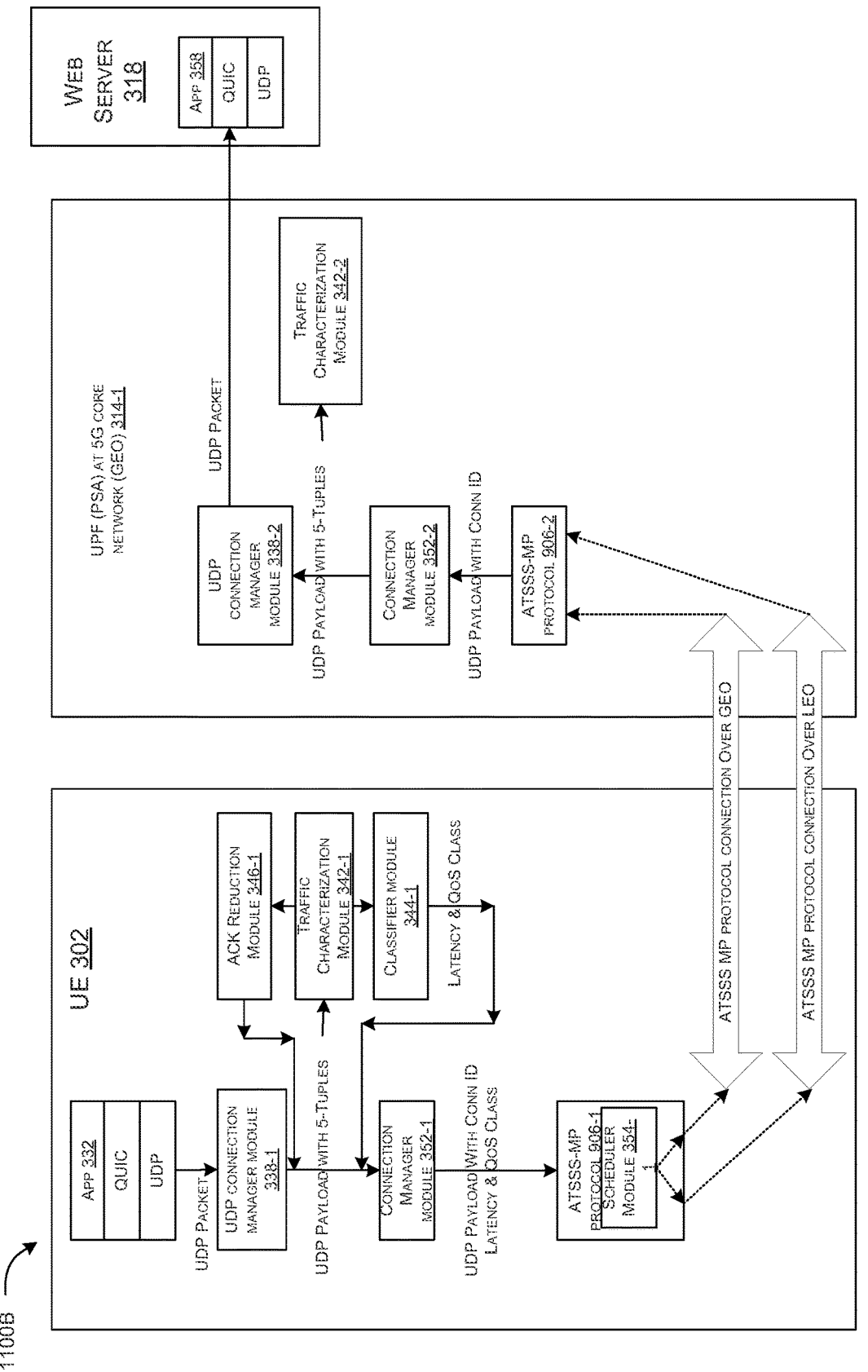
FIG. 11B illustrates an example schematic diagram representation of a UDP packet flow in a return direction from a UE to a web server in a QALC-capable ATSSS architecture, according to an example.

FIG. 11A illustrates an example schematic diagram representation of an exemplary TCP packet flow 1100A in a return direction from a UE 302 to a web server 318 in a QALC-capable ATSSS architecture 900, according to an example. According to FIG. 11A, an example of how the connection manager looks up connection information, converts and reconstructs header fields at the UE 302, and different interfaces of the 5G core network is disclosed. FIG. 11A depicts packet flow in the return direction from the UE 302 to the web server 318 for TCP protocol. The description for FIG. 5A applies to the QALC-capable ATSSS architecture 900 in the same way by replacing the QALC gateway 322, the MP-QBP 356, and QLAC backbone with PSA UPF unit 904, ATSSS MP protocol 906, and ATSSS MP protocol connection, respectively.

FIG. 11B illustrates an example schematic diagram representation of a UDP packet flow 11001B in a return direction from a UE 302 to a web server 318 in a QALC-capable ATSSS architecture 900, according to an example. FIG. 11B depicts packet flow in the return direction from the UE 302 to the web server 318 for UDP protocol. The description for FIG. 5B applies to the QALC-capable ATSSS architecture 900 in the same way by replacing the QALC gateway 322, MP-QBP 356, and QLAC backbone with a PSA UPF unit 904, an ATSS MP protocol 906 and ATSSS MP protocol connection respectively.

Figure 11C:
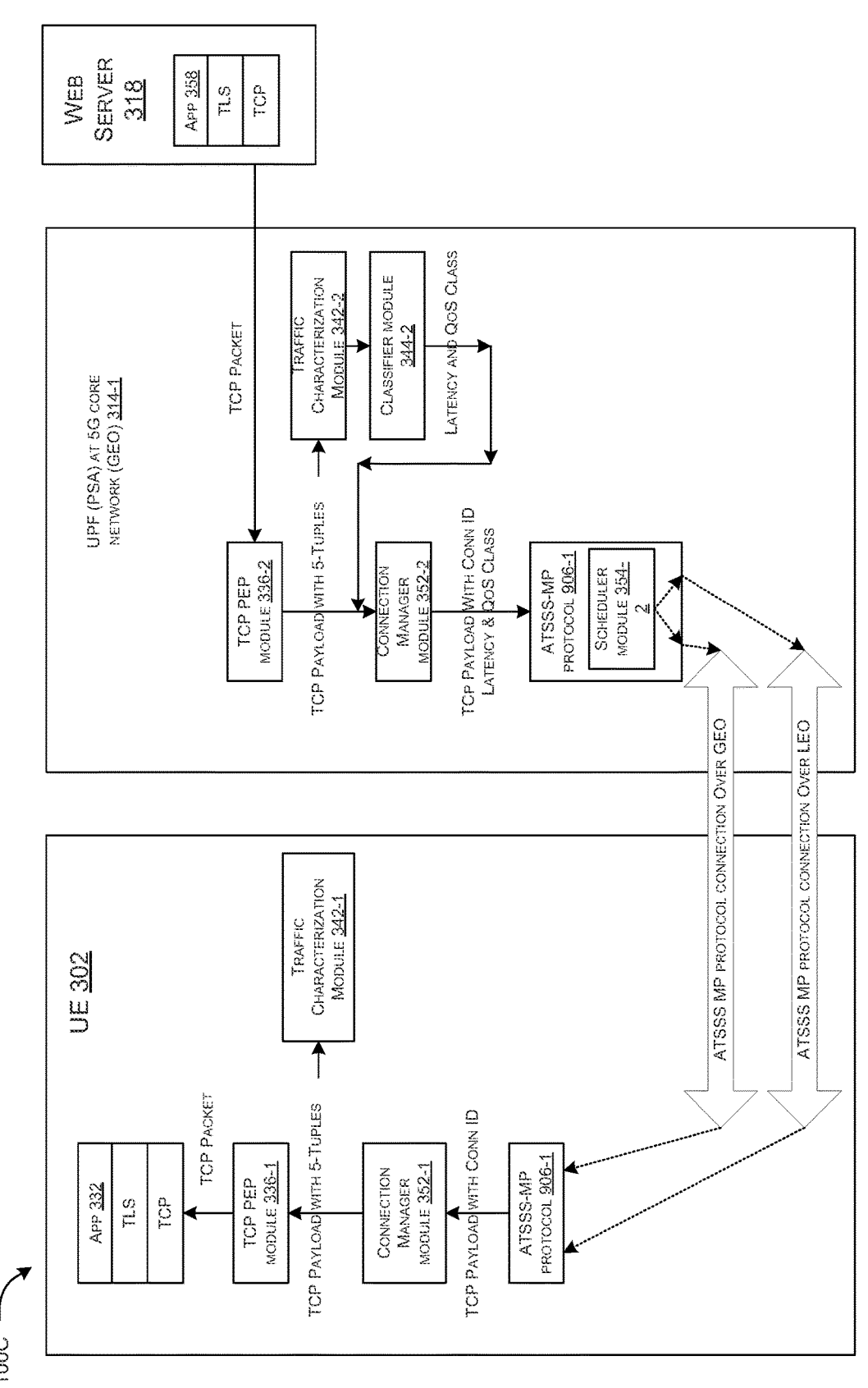
FIG. 11C illustrates an example schematic diagram representation of a TCP packet flow in a forward direction from a web server to a UE, in a QALC-capable ATSSS architecture, according to an example.
Figure 11D:
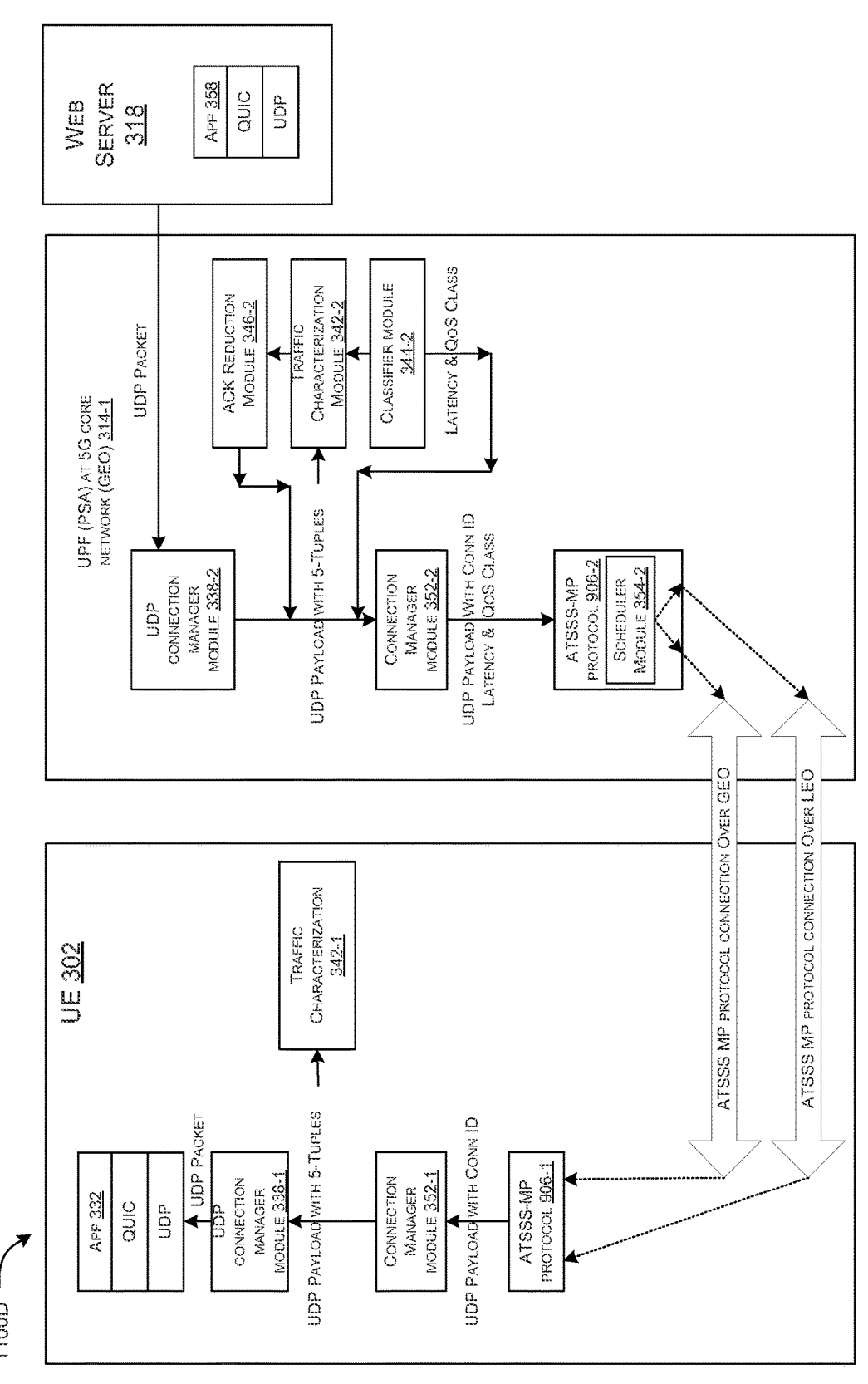
FIG. 11D illustrates an example schematic diagram representation of a UDP packet flow in a forward direction from a web server to a UE in a QALC-capable ATSSS architecture, according to an example.

FIG. 11C illustrates an example schematic diagram representation of TCP packet flow 1100C in a forward direction from a web server 318 to a UE 302, in a QALC-capable ATSSS architecture 900, according to an example. FIG. 11C depicts packet flow in the forward direction from the web server 318 to the UE 302 for TCP protocol. The description for FIG. 5C applies to the QALC-capable ATSSS architecture 900 in the same way by replacing the QALC gateway 322, the MP-QBP 356, and the QLAC backbone with PSA UPF unit 904, the ATSS MP protocol 906 and the ATSSS MP protocol connection respectively.

FIG. 11D illustrates an exemplary schematic diagram representation of a UDP packet flow 1100D in a forward direction from a web server 318 to a UE 302 in a QALC-capable ATSSS architecture 900, according to an example. FIG. 11D depicts a UDP packet flow 1100D in the forward direction from the web server 318 to the UE 302 for UDP protocol. The description of FIG. 5D applies to the QALC-capable ATSSS architecture 900 in the same way by replacing the QALC gateway 322, the MP-QBP 356, and the QLAC backbone with a PSA UPF unit 904, the ATSS MP protocol 906, and the ATSSS MP protocol connection respectively.

FIG. 12 illustrates an exemplary flow diagram representation of a method 1200 of quality of experience (QoE)-aware transmission over multi-transport, according to an example. The disclosed method may be performed by one or more components of the system 104A, 104B, 204A, 204B, and 204C along with the components 102A, 106B, 202A, and 202B respectively disclosed herein. For example, with reference to FIG. 2C, the steps disclosed herein may be performed by a processor 222. In yet another example, some of the steps disclosed herein may be performed by the source nodes 102A, and 102B, the destination nodes 106A and 106B, the UE 202A and 202B, or the web server 206A and 206B.

At block 1202, the method 1200 may include receiving, by the processor 222, a request for transmitting a data packet from the source node 202 to a destination node 206 in a wireless communication network. The source node 202 may be connected to the destination node 206 via a plurality of multi-transport access networks (MTANs) 114.

At block 1204, the method 1200 may include determining, by the processor 222, the payload data of the data packet and n-tuple information associated with the data packet based on the received request.

At block 1206, the method 1200 may include analyzing, by the processor 222, packet-level metrics associated with the determined payload data of the data packet based on the determined n-tuple information.

At block 1208, the method 1200 may include classifying, by the processor 222, the data packet into a latency class (LC) and a quality of Service (QoS) class based on the analyzed packet level metrics.

At block 1210, the method 1200 may include determining, by the processor 222, an appropriate multi-transport access network (MTAN) among the plurality of MTANs 114 and an appropriate priority traffic class for transmitting the data packet to the destination node 206, based on a set of parameter traffic/network/UE parameters and condition associated with the data packet.

At block 1212, the method 1200 may include establishing, by the processor 222, a multi-path (MP) backbone connection with the destination node 206 using the determined appropriate MTAN and the appropriate priority traffic class.

At block 1214, the method 1200 may include transmitting, by the processor 222, the data packet to the destination node 206 through the established MP backbone connection.

The order in which the method 1200 is described is not intended to be construed as a limitation, and any number of the described method blocks may be combined or otherwise performed in any order to implement the method 1200 or an alternate method. Additionally, individual blocks may be deleted from the method 1200 without departing from the spirit and scope of the ongoing description. Furthermore, the method 1200 may be implemented in any suitable hardware, software, firmware, or a combination thereof, that exists in the related art or that is later developed. The method 1200 describes, without limitation, the implementation of the systems 104A, 104B, 204A, and 204B along with along with the components 102A, 106B, 202A, and 202B respectively. A person of skill in the art will understand that method 1200 may be modified appropriately for implementation in various manners without departing from the scope and spirit of the ongoing description.

The present disclosure includes a computer system which may be part of or any one of the systems 104A, 104B, 204A, and 204B, of the network architecture 100A, 100B. 200A, and 200B along with the components 102A, 106B, 202A, and 202B respectively to perform the functions and features described herein. The computer system may include, among other things, an interconnect, a processor, a multimedia adapter, a network interface, a system memory, and a storage adapter. The computer system or a computing environment is a processing environment comprising a combination of hardware and software elements with network resources capable of performing the method steps as disclosed herein.

One of the ordinary skills in the art will appreciate that techniques consistent with the ongoing description are applicable in other contexts as well without departing from the scope of the ongoing description.

The present disclosure provides a system for identifying acknowledgments (ACKs) and may reduce the ACKS, if there are plurality of ACKs. The system for congestion control to prevent end devices and web servers from sending too much traffic is further disclosed. The system may cover both TCP and UDP protocols with encrypted traffic. The system may be applied to encrypted transport protocols such as a quick user datagram protocol (UDP) internet connection (QUIC).

Furthermore, the system is capable of prioritizing the quality of experience (QoE)-aware transmission of data packets over multi-transport access network(s) (MTANs). The system includes a traffic characterization module and a classifier module that considers application layer messages, and utilizes application message-based classification. Moreover, access network parameters, such as satellite ephemeris data, are employed in link monitoring to determine link availability and condition for scheduling data over multi-transport access paths. The system selects the access network and QoS class priority queue based on latency requirements of application layer messages in a flow, QoS requirements, link quality, usage status, and system configuration. Further, the system uses multiplexed transport for efficient use of network resources. Furthermore, the system uses multiple priorities for different users' application QoE. The system further provides local recovery of network impairments if necessary.

The present disclosure employs access network parameters such as satellite ephemeris data in link monitoring to determine the link availability and condition for scheduling over multi-transport access paths.

As mentioned above, what is shown and described with respect to the systems and methods above are illustrative. While examples described herein are directed to configurations as shown, it should be appreciated that any of the components described or mentioned herein may be altered, changed, replaced, or modified, in size, shape, and numbers, or material, depending on application or use case, and adjusted for managing handoff.

It should also be appreciated that the systems and methods, as described herein, may also include, or communicate with other components not shown. For example, these may include external processors, counters, analyzers, computing devices, and other measuring devices or systems. This may also include middleware (not shown) as well. The middleware may include software hosted by one or more servers or devices. Furthermore, it should be appreciated that some of the middleware or servers may or may not be needed to achieve functionality. Other types of servers, middleware, systems, platforms, and applications not shown may also be provided at the back end to facilitate the features and functionalities of the testing and measurement system.

Moreover, single components may be provided as multiple components, and vice versa, to perform the functions and features described herein. It should be appreciated that the components of the system described herein may operate at partial or full capacity, or they may be removed entirely. It should also be appreciated that analytics and processing techniques described herein with respect to the optical measurements, for example, may also be performed partially or in full by other various components of the overall system.

It should be appreciated that data stores may also be provided to the apparatuses, systems, and methods described herein, and may include volatile and/or nonvolatile data storage that may store data and software or firmware including machine-readable instructions. The software or firmware may include subroutines or applications that perform the functions of the measurement system and/or run one or more applications that utilize data from the measurement or other communicatively coupled systems.

The various components, circuits, elements, components, and interfaces, may be any number of mechanical, electrical, hardware, network, or software components, circuits, elements, and interfaces that serves to facilitate communication, exchange, and analysis of data between any number of or combination of equipment, protocol layers, or applications. For example, the components described herein may each include a network or communication interface to communicate with other servers, devices, components, or network elements via a network or other communication protocol.

Although examples are directed to wireless/satellite communication systems, it should be appreciated that the systems and methods described herein may also be used in other various systems and other implementations. For example, these may include other various telecommunication tests and measurement systems. There may be numerous applications in cable or optical communication networks, not to mention fiber sensor systems that could employ the systems and methods as well.

It should be appreciated that the systems and methods described herein may also be used to help provide, directly or indirectly, measurements for distance, angle, rotation, speed, position, wavelength, transmissivity, and/or other related tests and measurements.

What has been described and illustrated herein are examples of the implementation along with some variations. The terms, descriptions, and figures used herein are set forth by way of illustration only and are not meant as limitations. Many variations are possible within the scope of the implementations, which are intended to be defined by the following claims and their equivalents, in which all terms are meant in their broadest reasonable sense unless otherwise indicated.

What is claimed is:

1. A system comprising:
a processor; and
a memory operatively coupled with the processor, wherein the memory comprises processor-executable instructions, which on execution, cause the processor to:
receive a request for transmitting a data packet from a source node to a destination node in a wireless communication network, the source node being connected to the destination node via a plurality of multi-transport access networks (MTANs);
determine payload data of the data packet and n-tuple information associated with the data packet, based on the received request;
analyze packet level metrics associated with the determined payload data of the data packet based on the determined n-tuple information;
classify the data packet into a latency class (LC) and a Quality of Service (QoS) class based on the analyzed packet level metrics;

determine an appropriate multi-transport access network (MTAN) among the plurality of MTANs and an appropriate priority traffic class for transmitting the data packet to the destination node, based on a set of parameters, wherein the set of parameters comprise at least one of a link availability value, a packet loss rate (PLR), an available bit rate (ABR), a user equipment (UE) power, a usage level, a per byte monetary cost (PBC), and system configuration parameters;
establish a multi-path (MP) backbone connection with the destination node using the determined appropriate MTAN and the appropriate priority traffic class; and
transmit the data packet to the destination node through the established MP backbone connection.

2. The system of claim 1, wherein the processor is to:
receive the data packet from the source node through the established MP backbone connection;
retrieve corresponding connection identifier (ID) associated with the data packet, by mapping the connection identifier (ID) with stored local connection information and established MP backbone connection information in a connection table;
determine n-tuple information, and a protocol identifier associated the established MP backbone connection based on a source node identifier, the retrieved corresponding connection ID, from the connection table; and
forward the received data packet from at least one of a performance enhancing proxy (PEP) module and a user datagram protocol (UDP) connection manager module to an application of the destination node, the PEP module or the UDP connection manager module being connected to the application of the destination node using one of a local connection and a wide area network connection.

3. The system of claim 1, wherein, to determine the payload data of the data packet and the n-tuple information associated with the data packet, the processor is to:
establish a local connection between an application of the source node and a performance enhancing proxy (PEP) module or a user datagram protocol (UDP) connection manager module of the source node; and
determine the n-tuple information associated with the data packet based on the received request and a type of connection established between the application of the source node and the PEP module or the UDP connection manager module, wherein the n-tuple information comprises one of a source internet protocol (IP) address, a source application protocol port number, a destination IP address, a destination application protocol port number, and a protocol type.

4. The system of claim 1, wherein, to analyze the packet level metrics associated with the determined payload data of the data packet, the processor is to:
monitor a bi-directional information on the payload data along with the n-tuple information for an application data flow between the application at the source node and an application at the destination node; and
analyze the packet level metrics associated with the determined payload data of the data packet based on the n-tuple information and the monitored bi-directional information, wherein the packet level metrics comprise one of a payload size, a data packet time stamp, a relative packet position in a plurality of directions and a protocol-specific information.

5. The system of claim 1, wherein the processor is to:

establish a multiplexed MP backbone connection with a plurality of priority levels between an application of the source node and a performance enhancing proxy (PEP) module or a user datagram protocol (UDP) connection manager module of the source node, wherein each of the selected MTAN comprises the plurality of priority levels;

assigning the data packet with a corresponding QoS class based on the plurality of priority levels;

generate a plurality of muti-path backbone protocol packets with headers based on the payload data of a plurality of data packets;

multiplex the generated plurality of muti-path backbone protocol packets with a specific QoS class over the established MP backbone connection;

determining whether the plurality of muti-path backbone protocol packets are in order for transmission;

re-ordering the plurality of muti-path backbone protocol packets upon determining that the plurality of muti-path backbone protocol packets are out of order for transmission; and transmit the plurality of re-ordered muti-path backbone protocol packets in sequence to the traffic routing device using the established MP backbone connection, wherein the established MP backbone connection with network impairments are recovered locally and wherein the MP backbone connection queues are controlled to prevent overflow of the muti-path backbone protocol packets.

6. The system of claim 1, wherein, to determine the appropriate multi-transport access network (MTAN) among the plurality of MTANs, the processor is to:

obtain a latency class (LC) associated with the determined payload data based on the classification of the data packet;

determine the set of parameters comprising at least one of the link availability value, the packet loss rate (PLR), the available bit rate (ABR), the user equipment (UE) power, the usage level, the per byte monetary cost (PBC), and the system configuration parameters;

map, the set of parameters with a predefined threshold parameters; and select respective MTAN as the appropriate MTAN among the plurality of MTANs based on the mapping of the set of parameters with the predefined threshold parameters.

7. The system of claim 1, wherein the processor is to:

monitor a plurality of link characteristics associated with each of the plurality of MTANs;

record a number of data bytes of the data packet transmitted over the each of the plurality of MTANs based on the monitored plurality of link characteristics;

receive estimated acknowledgment (ACK) packets from the destination node; and modify a number of ACK packets to be transmitted over the plurality of MTANs to the source node based on the received estimated ACK packets.

8. A method comprising:

receiving, by a processor, a request for transmitting a data packet from a source node to a destination node in a wireless communication network, the source node being connected to the destination node via a plurality of multi-transport access networks (MTANs);

determining, by the processor, payload data of the data packet and n-tuple information associated with the data packet based on the received request;

analyzing, by the processor, packet level metrics associated with the determined payload data of the data packet based on the determined n-tuple information;

classifying, by the processor, the data packet into a latency class (LC) and a Quality of Service (QoS) class based on the analyzed packet level metrics;

determining, by the processor, an appropriate multi-transport access network (MTAN) among the plurality of MTANs and an appropriate priority traffic class for transmitting the data packet to the destination node based on a set of parameters, wherein the set of parameters comprise at least one of a link availability value, a packet loss rate (PLR), an available bit rate (ABR), a user equipment (UE) power, a usage level, a per byte monetary cost (PBC), and system configuration parameters;

establishing, by the processor, a multi-path (MP) backbone connection with the destination node using the determined appropriate MTAN and the appropriate priority traffic class; and transmitting, by the processor, the data packet to the destination node through the established MP backbone connection.

9. The method of claim 8, further comprising:

receiving, by the processor, the data packet from the source node through the established MP backbone connection;

retrieving, by the processor, corresponding connection identifier (ID) associated with the data packet, by mapping the connection identifier (ID) with stored local connection information and established MP backbone connection information in a connection table;

determining, by the processor, n-tuple information, and a protocol identifier associated the established MP backbone connection based on a source node identifier, the retrieved corresponding connection ID, from the connection table; and forwarding, by the processor, the received data packet from at least one of a performance enhancing proxy (PEP) module a user datagram protocol (UDP) connection manager module to an application of the destination node, the PEP module or the UDP connection manager module being connected to the application of the destination node using one of a local connection and a wide area network connection.

10. The method of claim 8, wherein determining the payload data of the data packet and the n-tuple information associated with the data packet comprises:

establishing, by the processor, a local connection between an application of the source node and a performance-enhancing proxy module or a user datagram protocol (UDP) connection manager module of the source node; and determining, by the processor, the n-tuple information associated with the data packet based on the received request and a type of connection established between the application of the source node and the performance-enhancing proxy module or a user datagram protocol (UDP) connection manager module, wherein the n-tuple information comprises one of: a source internet protocol (IP) address, a source application protocol port number, a destination IP address, a destination application protocol port number, and a protocol type.

11. The method of claim 8, wherein analyzing the packet level metrics associated with the determined payload data of the data packet comprises:

monitoring, by the processor, bi-directional information on the payload data along with the n-tuple information for an application data flow between the application at the source node and an application at the destination node; and analyzing, by the processor, the packet level metrics associated with the determined payload data of the data packet based on the n-tuple information and the monitored bi-directional information, wherein the packet level metrics comprise one of a payload size, a data packet time stamp, a relative packet position in a plurality of directions and a protocol-specific information.

12. The method of claim 8, further comprising:

establishing, by the processor, a multiplexed MP backbone connection with a plurality of priority levels between an application of the source node and a performance enhancing proxy (PEP) module or a user datagram protocol (UDP) connection manager module of the source node, wherein each of the selected MTAN comprises the plurality of priority levels;

assigning, by the processor, the data packet with a corresponding QoS class based on the plurality of priority levels;

generating, by the processor, a plurality of muti-path backbone protocol packets with headers based on the payload data of a plurality of data packets;

multiplexing, by the processor, the generated plurality of muti-path backbone protocol packets with a specific QoS class over the established MP backbone connection;

determining, by the processor, whether the plurality of muti-path backbone protocol packets are in order for transmission;

re-ordering, by the processor, the plurality of muti-path backbone protocol packets upon determining that the plurality of muti-path backbone protocol packets are out-of order for transmission; and transmitting, by the processor, the plurality of re-ordered muti-path backbone protocol packets in sequence to the traffic routing device using the established MP backbone connection, wherein the established MP backbone connection with network impairments are recovered locally and wherein the MP backbone connection queues are controlled to prevent overflow of the muti-path backbone protocol packets.

13. The method of claim 8, wherein determining the appropriate multi-transport access network (MTAN) among the plurality of MTANs comprises:

obtaining, by the processor, a latency class (LC) associated with the determined payload data based on the classification of the data packet;

determining, by the processor, the set of parameters comprising at least one of the link availability value, the packet loss rate (PLR), the available bit rate (ABR), the user equipment (UE) power, the usage level, the per byte monetary cost (PBC), and the system configuration parameters;

mapping, by the processor, the set of parameters with a predefined threshold parameters; and selecting, by the processor, respective MTAN as the appropriate MTAN among the plurality of MTANs, based on the mapping of the set of parameters with the predefined threshold parameters.

14. The method of claim 8, further comprising:

monitoring, by the processor, a plurality of link characteristics associated with each of the plurality of MTANs;

recording, by the processor, a number of data bytes of the data packet transmitted over the each of the plurality of MTANs based on the monitored plurality of link characteristics;

receiving, by the processor, an estimated acknowledgement (ACK) packets from the destination node; and modifying, by the processor, a number of ACK packets to be transmitted over the plurality of MTANs to the source node based on the received estimated ACK packets.

15. A system comprising:

a plurality of web servers to communicate with a plurality of user equipment (UEs) using a wide area network (WAN) and multi-transport access networks (MTANs);

a traffic routing device communicatively coupled to the plurality of web servers and the plurality of UEs, the traffic routing device being connected to the plurality of web servers using the WAN, and connected to the plurality of UEs using the MTANs, the traffic routing device is to:

route a plurality of data packets between the plurality of UEs and the plurality of web servers, using MTANs and the WAN based on a set of parameters, wherein the set of parameters comprise at least one of a link availability value, a packet loss rate (PLR), an available bit rate (ABR), a user equipment (UE) power, a usage level, a per byte monetary cost (PBC), and system configuration parameters; and the plurality of UEs communicatively coupled to the plurality of web servers via the traffic routing device, the plurality of UEs is to exchange the plurality of data packets with the plurality of web servers via the traffic routing device.

16. The system of claim 15, wherein the system is to:

determining multi-transport capabilities of an access traffic steering, switching, and splitting (ATSSS) protocol and a software associated with the plurality of UEs, wherein the multi-transport capabilities support quality of experience (QoE)-aware transmission;

deploy the traffic routing device as a user plane function (UPF) module within a telecommunication network based on the determined multi-transport capabilities of the ATSSS protocol and the software, the traffic routing device functions as an intermediate node between the plurality of UEs and the plurality web servers;

perform a plurality of steering functions for at least one of transmission control protocol (TCP) applications and user datagram protocol (UDP) applications within the plurality of UEs;

modify one of a data plane, a control plane, and a management plane of the telecommunication network to support the multi-transport capabilities for the quality of experience (QoE)-aware transmission; and modify scheduling capabilities in the telecommunication network, based on the modified one of the data plane, the control plane, and the management plane.

17. The system of claim 16, wherein the system is to:

deploy the traffic routing device as a gateway between the telecommunication network and the plurality web servers using the WAN, based on the determined multi-transport capabilities of the ATSSS protocol and the software.

18. The system of claim 15, wherein the plurality of UEs comprise a Quality of Experience (QoE)-aware transmission over a multi-transport module, and the plurality of UEs function as a source node and the traffic routing device functions as a destination node, the QoE-aware transmission over a multi-transport module is to:

establish a local connection between an application within the plurality of UEs and a performance-enhancing proxy (PEP) module or a user datagram protocol (UDP) connection manager module associated with the plurality of UEs;

determine a payload data of the plurality of data packets and n-tuple information associated with the plurality of data packets;

analyze packet level metrics associated with the determined payload data of the plurality of data packets based on the determined n-tuple information;

classify the plurality of data packets into a latency class (LC) and a Quality of Service (QoS) class based on the analyzed packet level metrics;

determine an appropriate multi-transport access network (MTAN) among the plurality of MTANs and an appropriate priority traffic class for transmitting the plurality of data packets to the traffic routing system based on the set of parameters;

establish a multi-path (MP) backbone connection with the traffic routing system using the determined appropriate MTAN and the appropriate priority traffic class; and transmit the plurality of data packets to the traffic routing device through the established MP backbone connection.

19. The system of claim 18, wherein to transmit the plurality of data packets to the traffic routing device using the established MP backbone connection, the QoE-aware transmission over a multi-transport module is to:

generate a plurality of muti-path backbone protocol packets with headers based on the payload data of the plurality of data packets;

multiplex the generated plurality of muti-path backbone protocol packets with a specific QoS class over the established MP backbone connection; and transmit the plurality of multiplexed muti-path backbone protocol packets to the traffic routing device using the established MP backbone connection.

20. The system of claim 16, wherein the traffic routing device comprises a QoE-aware transmission over a multi-transport module, and the plurality of UEs functions as a source node and the traffic routing device functions as a destination node, the QoE-aware transmission over a multi-transport module at the traffic routing device end is to:

receive the plurality of data packets from the plurality of UEs through an established MP backbone connection;

determine a payload data, a source node identifier, and a connection ID associated with the received plurality of data packets;

extract the n-tuple information associated with the received plurality of data packets based on the determined payload data, the source node identifier, and the connection ID; and forward the received plurality of data packets to an application of the plurality of web servers using the WAN.

* * * * *